(12) United States Patent
Zheng et al.

(10) Patent No.: US 12,071,142 B2
(45) Date of Patent: *Aug. 27, 2024

(54) METHOD AND SYSTEM FOR PERSONALIZED DRIVING LANE PLANNING IN AUTONOMOUS DRIVING VEHICLES

(71) Applicant: PlusAI, Inc., Cupertino, CA (US)

(72) Inventors: Hao Zheng, Saratoga, CA (US); David Wanqian Liu, Los Altos, CA (US); Timothy Patrick Daly, Jr., San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,893

(22) Filed: Mar. 7, 2022

(65) Prior Publication Data

US 2022/0185295 A1 Jun. 16, 2022

Related U.S. Application Data

(63) Continuation of application No. 15/856,728, filed on Dec. 28, 2017, now Pat. No. 11,299,166, which is a
(Continued)

(51) Int. Cl.
*B60W 40/09* (2012.01)
*B60W 30/12* (2020.01)
(Continued)

(52) U.S. Cl.
CPC ............ *B60W 40/09* (2013.01); *B60W 30/12* (2013.01); *B60W 30/18163* (2013.01);
(Continued)

(58) Field of Classification Search
CPC ............ G01C 21/3484; G01C 21/3602; G01C 21/3658; B60W 40/09; B60W 30/12;
(Continued)

(56) References Cited

U.S. PATENT DOCUMENTS

| 5,184,303 A | 2/1993 | Link |
| 5,483,446 A * | 1/1996 | Momose ............ F16H 61/0213 701/1 |

(Continued)

FOREIGN PATENT DOCUMENTS

| AU | 2017100444 A4 | 5/2017 |
| CN | 101011967 A | 8/2007 |

(Continued)

OTHER PUBLICATIONS

International Preliminary Report on Patentability mailed Jul. 2, 2020 for International Application No. PCT/IB2017/058086.

(Continued)

*Primary Examiner* — Angelina M Shudy
(74) *Attorney, Agent, or Firm* — Sheppard Mullin Richter & Hampton LLP

(57) ABSTRACT

The present teaching relates to method, system, medium, and implementation of lane planning in an autonomous vehicle. Sensor data are received that capture ground images of a road the autonomous vehicle is on. Based on the sensor data, a current lane of the road that autonomous vehicle is currently occupying is detected. Information indicating presence of a passenger in the vehicle is obtained and used to retrieve a personalized lane control model related to the passenger. Lane control for the autonomous vehicle is planned based on the detected current lane and self-aware capability parameters in accordance with the personalized lane control model. The self-aware capability parameters are used to predict operational capability of the autonomous vehicle with respect to a current location of the autonomous vehicle. The personalized lane control model is generated based on recorded human driving data.

20 Claims, 40 Drawing Sheets

Related U.S. Application Data continuation of application No. 15/845,294, filed on Dec. 18, 2017, now Pat. No. 11,273,836.

(51) Int. Cl.
*B60W 30/18* (2012.01)
*G01C 21/34* (2006.01)
*G01C 21/36* (2006.01)
*G05D 1/00* (2006.01)
*B60W 40/08* (2012.01)

(52) U.S. Cl.
CPC ..... *G01C 21/3484* (2013.01); *G01C 21/3602* (2013.01); *G01C 21/3658* (2013.01); *G05D 1/0088* (2013.01); *G05D 1/0212* (2013.01); *G05D 1/0246* (2013.01); *B60W 2040/0872* (2013.01); *B60W 2040/089* (2013.01)

(58) Field of Classification Search
CPC ... B60W 30/18163; B60W 2040/0872; B60W 2040/089; B60W 60/00; B60W 2050/0028; B60W 2050/0029; B60W 2540/043; B60W 2540/30; B60W 2556/50; B60W 50/0097; G05D 1/0088; G05D 1/0212; G05D 1/0246; G05D 2201/0213; G06V 20/588; G06V 20/56
See application file for complete search history.

(56) References Cited

U.S. PATENT DOCUMENTS

| | | | |
|---|---|---|---|
| 5,517,412 A | 5/1996 | Unoura | |
| 5,559,491 A | 9/1996 | Stadler | |
| 5,801,763 A | 9/1998 | Suzuki | |
| 5,896,129 A | 4/1999 | Murphy et al. | |
| 6,487,501 B1 | 11/2002 | Jeon | |
| 6,577,334 B1 | 6/2003 | Kawai et al. | |
| 6,748,301 B1 | 6/2004 | Ryu | |
| 6,859,728 B2 | 2/2005 | Sakamoto et al. | |
| 6,980,098 B2 | 12/2005 | Shinada et al. | |
| 7,155,376 B2 * | 12/2006 | Yang | G08G 1/0129 701/532 |
| 7,265,657 B2 | 9/2007 | Nishida et al. | |
| 7,418,372 B2 * | 8/2008 | Nishira | B60K 31/0008 703/2 |
| 7,797,108 B2 | 9/2010 | Grimm | |
| 7,930,096 B2 | 4/2011 | Kubota et al. | |
| 8,190,363 B2 | 5/2012 | Tomita et al. | |
| 8,465,621 B2 * | 6/2013 | Vaders | D21D 5/00 162/23 |
| 8,634,980 B1 | 1/2014 | Urmson et al. | |
| 8,744,744 B2 * | 6/2014 | Takagi | G01S 17/89 701/301 |
| 8,780,195 B1 | 7/2014 | Rubin | |
| 8,849,494 B1 | 9/2014 | Herbach et al. | |
| 8,862,299 B2 | 10/2014 | Ricci | |
| 8,874,301 B1 | 10/2014 | Rao et al. | |
| 8,965,621 B1 * | 2/2015 | Urmson | G01S 17/86 701/23 |
| 9,008,890 B1 | 4/2015 | Herbach et al. | |
| 9,090,261 B2 | 7/2015 | Kitagishi et al. | |
| 9,103,688 B2 | 8/2015 | Pivonka | |
| 9,146,127 B2 * | 9/2015 | Bank | G01C 21/34 |
| 9,221,396 B1 | 12/2015 | Zhu et al. | |
| 9,274,525 B1 | 3/2016 | Ferguson et al. | |
| 9,315,191 B2 | 4/2016 | Morimoto | |
| 9,371,099 B2 | 6/2016 | Lagassey | |
| 9,429,943 B2 | 8/2016 | Wilson et al. | |
| 9,430,882 B2 | 8/2016 | Ho | |
| 9,443,153 B1 | 9/2016 | Gupta et al. | |
| 9,493,130 B2 | 11/2016 | Penilla et al. | |
| 9,582,004 B2 | 2/2017 | Rothoff et al. | |
| 9,594,373 B2 | 3/2017 | Solyom et al. | |
| 9,672,734 B1 | 6/2017 | Ratnasingam | |
| 9,721,472 B2 | 8/2017 | Jain et al. | |
| 9,760,806 B1 | 9/2017 | Ning et al. | |
| 9,776,644 B2 | 10/2017 | Chun et al. | |
| 9,816,827 B1 | 11/2017 | Slusar | |
| 9,902,401 B2 | 2/2018 | Stein et al. | |
| 9,933,781 B1 * | 4/2018 | Bando | B60W 10/20 |
| 9,970,780 B2 | 5/2018 | Bai et al. | |
| 9,989,964 B2 | 6/2018 | Berntorp et al. | |
| 10,011,281 B1 | 7/2018 | Kang et al. | |
| 10,031,523 B2 | 7/2018 | Ricci et al. | |
| 10,059,343 B2 | 8/2018 | Hoare et al. | |
| 10,073,965 B2 | 9/2018 | Jantz et al. | |
| 10,077,056 B1 * | 9/2018 | Fields | B60W 50/0098 |
| 10,197,631 B2 | 2/2019 | Barfield, Jr. et al. | |
| 10,229,229 B2 | 3/2019 | Matsumura | |
| 10,254,759 B1 | 4/2019 | Faust et al. | |
| 10,259,458 B2 | 4/2019 | Yoo et al. | |
| 10,275,664 B2 | 4/2019 | Mullen | |
| 10,324,463 B1 * | 6/2019 | Konrardy | G01S 19/39 |
| 10,324,464 B2 * | 6/2019 | Hatano | B60W 40/09 |
| 10,406,978 B2 | 9/2019 | Zheng et al. | |
| 10,467,488 B2 | 11/2019 | Sicconi et al. | |
| 10,503,988 B2 * | 12/2019 | Cordell | G01S 19/485 |
| 10,507,839 B2 | 12/2019 | Altmannshofer et al. | |
| 10,563,993 B1 * | 2/2020 | Ho | G06Q 30/0284 |
| 10,572,717 B1 | 2/2020 | Zhu et al. | |
| 10,579,070 B1 * | 3/2020 | Konrardy | G05B 23/0245 |
| 10,599,144 B2 | 3/2020 | Zheng et al. | |
| 10,671,076 B1 | 6/2020 | Kobilarov et al. | |
| 10,675,985 B2 * | 6/2020 | Matsuo | B60L 58/32 |
| 10,687,031 B2 | 6/2020 | Imomoto et al. | |
| 10,692,371 B1 * | 6/2020 | Nix | G07C 5/008 |
| 10,699,580 B1 | 6/2020 | Gross | |
| 10,705,525 B2 | 7/2020 | Smolyanskiy et al. | |
| 10,710,590 B2 | 7/2020 | Zheng et al. | |
| 10,710,610 B2 | 7/2020 | Hiramatsu et al. | |
| 10,733,673 B1 | 8/2020 | Slusar | |
| 10,752,244 B2 | 8/2020 | Buburuzan et al. | |
| 10,769,525 B2 * | 9/2020 | Redding | G06N 5/01 |
| 10,860,023 B2 | 12/2020 | Di Cairano et al. | |
| 10,867,455 B2 | 12/2020 | Segal et al. | |
| 10,936,886 B2 | 3/2021 | Ganguli et al. | |
| 10,957,064 B2 | 3/2021 | Ganguli et al. | |
| 10,960,838 B2 | 3/2021 | Sobhany | |
| 10,994,741 B2 * | 5/2021 | Zhou | G06N 5/04 |
| 11,042,155 B2 | 6/2021 | Zheng et al. | |
| 11,091,172 B2 * | 8/2021 | Mori | B60W 30/18 |
| 11,119,483 B2 * | 9/2021 | Kadin | G06N 3/006 |
| 11,130,497 B2 | 9/2021 | Zhou et al. | |
| 11,243,532 B1 * | 2/2022 | Levihn | B60W 60/0011 |
| 11,260,852 B2 | 3/2022 | Rahimi et al. | |
| 11,273,836 B2 * | 3/2022 | Zheng | G01C 21/3658 |
| 11,279,362 B2 * | 3/2022 | Kuwahara | B60W 40/04 |
| 11,299,166 B2 * | 4/2022 | Zheng | G01C 21/3602 |
| 11,328,210 B2 | 5/2022 | Mondello et al. | |
| 11,373,466 B2 | 6/2022 | Golov | |
| 11,378,956 B2 * | 7/2022 | Zhang | G05D 1/0268 |
| 11,392,796 B2 | 7/2022 | Curewitz et al. | |
| 11,404,075 B1 | 8/2022 | Lakhani et al. | |
| 11,410,475 B2 | 8/2022 | Golov | |
| 11,449,048 B2 * | 9/2022 | Harihara Subramanian | G05D 1/0016 |
| 11,458,974 B2 | 10/2022 | McNew | |
| 11,468,285 B1 * | 10/2022 | Tang | G06V 10/255 |
| 11,507,093 B2 * | 11/2022 | Kang | G05D 1/0088 |
| 11,584,379 B2 * | 2/2023 | Misu | G05D 1/0088 |
| 11,643,092 B2 * | 5/2023 | Doemling | B60W 50/0097 701/300 |
| 11,648,935 B2 * | 5/2023 | Sierra | B60W 40/04 701/23 |
| 11,798,407 B1 * | 10/2023 | Wang | G08G 1/017 |
| 11,874,808 B1 | 1/2024 | Kondal et al. | |
| 11,945,440 B2 * | 4/2024 | Censi | B60W 30/18159 |
| 11,945,445 B1 | 4/2024 | Maleitzke | |
| 11,948,082 B2 * | 4/2024 | Yan | G06V 20/584 |
| 2002/0062207 A1 * | 5/2002 | Faghri | G08G 1/00 703/8 |
| 2002/0116156 A1 | 8/2002 | Remboski et al. | |

(56) References Cited

U.S. PATENT DOCUMENTS

| | | |
|---|---|---|
| 2002/0129353 A1 | 9/2002 | Williams et al. |
| 2002/0135618 A1 | 9/2002 | Maes et al. |
| 2002/0188404 A1 | 12/2002 | Jeon |
| 2003/0001732 A1* | 1/2003 | Furusho .............. G06V 20/63 |
| | | 348/148 |
| 2003/0048000 A1 | 3/2003 | Harter et al. |
| 2003/0060949 A1 | 3/2003 | Letang et al. |
| 2003/0072471 A1* | 4/2003 | Otsuka ................ G06V 10/44 |
| | | 382/103 |
| 2003/0103650 A1 | 6/2003 | Otsuka et al. |
| 2004/0107030 A1* | 6/2004 | Nishira ............. B60W 50/08 |
| | | 348/148 |
| 2004/0122639 A1 | 6/2004 | Qiu |
| 2005/0080565 A1* | 4/2005 | Olney ............. B60K 31/0008 |
| | | 340/903 |
| 2005/0134117 A1 | 6/2005 | Ito et al. |
| 2005/0240328 A1 | 10/2005 | Shirato et al. |
| 2006/0025966 A1 | 2/2006 | Kanamaru |
| 2006/0089765 A1 | 4/2006 | Pack et al. |
| 2007/0010938 A1 | 1/2007 | Kubota et al. |
| 2007/0142995 A1* | 6/2007 | Wotlermann ...... B60K 31/0008 |
| | | 701/96 |
| 2007/0276599 A1 | 11/2007 | Ogawa |
| 2008/0084283 A1* | 4/2008 | Kalik .................. B60Q 9/00 |
| | | 701/301 |
| 2008/0186154 A1 | 8/2008 | Haug |
| 2008/0195280 A1 | 8/2008 | Deng et al. |
| 2009/0005929 A1 | 1/2009 | Nakao et al. |
| 2009/0040037 A1 | 2/2009 | Schraga |
| 2009/0216399 A1 | 8/2009 | Ishikawa |
| 2009/0234552 A1* | 9/2009 | Takeda .................. G08G 1/167 |
| | | 701/1 |
| 2010/0014714 A1 | 1/2010 | Zhang et al. |
| 2010/0030466 A1 | 2/2010 | Rogers et al. |
| 2010/0052948 A1* | 3/2010 | Vian ................ G08G 5/0021 |
| | | 340/963 |
| 2010/0131148 A1* | 5/2010 | Camhi ............... B60W 40/09 |
| | | 701/31.4 |
| 2010/0209892 A1* | 8/2010 | Lin ................... G09B 19/167 |
| | | 434/71 |
| 2010/0211270 A1* | 8/2010 | Chin ................ B60W 40/09 |
| | | 701/44 |
| 2010/0250001 A1 | 9/2010 | Hodgkins et al. |
| 2011/0205045 A1 | 8/2011 | Pilutti et al. |
| 2011/0231063 A1 | 9/2011 | Kim |
| 2011/0320163 A1* | 12/2011 | Markkula ......... B60W 40/072 |
| | | 702/150 |
| 2012/0070804 A1* | 3/2012 | Pang .................. G09B 9/02 |
| | | 434/29 |
| 2012/0083964 A1 | 4/2012 | Montemerlo et al. |
| 2012/0105613 A1 | 5/2012 | Weng et al. |
| 2012/0191343 A1* | 7/2012 | Haleem ............ G08G 1/0969 |
| | | 701/431 |
| 2012/0221341 A1 | 8/2012 | Rodemer |
| 2012/0268260 A1* | 10/2012 | Miller ............... G08G 1/166 |
| | | 340/435 |
| 2012/0271500 A1 | 10/2012 | Tsimhoni et al. |
| 2012/0316730 A1 | 12/2012 | Zhang et al. |
| 2013/0009761 A1 | 1/2013 | Horseman |
| 2013/0179023 A1* | 7/2013 | Schmidt ............ B60W 50/16 |
| | | 701/23 |
| 2013/0206495 A1 | 8/2013 | Westbrook |
| 2013/0231824 A1 | 9/2013 | Wilson et al. |
| 2013/0302756 A1* | 11/2013 | Takeuchi ............ B60W 30/18 |
| | | 434/64 |
| 2013/0332165 A1 | 12/2013 | Beckley et al. |
| 2014/0005923 A1* | 1/2014 | Bank ................ G01C 21/3617 |
| | | 701/424 |
| 2014/0074480 A1 | 3/2014 | Gratk et al. |
| 2014/0195213 A1 | 7/2014 | Kozloski et al. |
| 2014/0223384 A1 | 8/2014 | Graumann |
| 2014/0309913 A1* | 10/2014 | Ricci ................ H04W 4/40 |
| | | 701/117 |
| 2015/0049016 A1 | 2/2015 | Sinha et al. |
| 2015/0050922 A1 | 2/2015 | Ramalingham et al. |
| 2015/0062168 A1 | 3/2015 | Ng-Thow-Hing et al. |
| 2015/0088374 A1 | 3/2015 | Yopp et al. |
| 2015/0104757 A1 | 4/2015 | Moncrief et al. |
| 2015/0145664 A1 | 5/2015 | You et al. |
| 2015/0149017 A1* | 5/2015 | Attard ............. B60W 30/18163 |
| | | 701/23 |
| 2015/0158486 A1* | 6/2015 | Healey ................ B60W 30/16 |
| | | 701/23 |
| 2015/0161454 A1* | 6/2015 | Han ................... G06V 30/422 |
| | | 382/104 |
| 2015/0166069 A1 | 6/2015 | Engelman et al. |
| 2015/0175172 A1 | 6/2015 | Truong |
| 2015/0241231 A1 | 8/2015 | Abramson et al. |
| 2015/0246673 A1 | 9/2015 | Tseng et al. |
| 2015/0254008 A1 | 9/2015 | Tal et al. |
| 2015/0266455 A1 | 9/2015 | Wilson |
| 2015/0284008 A1* | 10/2015 | Tan .................... B60W 30/12 |
| | | 701/28 |
| 2015/0284010 A1 | 10/2015 | Beardsley et al. |
| 2015/0336587 A1* | 11/2015 | Inoue ............... B60W 10/184 |
| | | 701/1 |
| 2015/0336588 A1 | 11/2015 | Ebner |
| 2016/0001781 A1 | 1/2016 | Fung et al. |
| 2016/0026180 A1* | 1/2016 | Tsimhoni ............ G05D 1/0061 |
| | | 701/23 |
| 2016/0026182 A1 | 1/2016 | Boroditsky et al. |
| 2016/0039356 A1 | 2/2016 | Talwar et al. |
| 2016/0063858 A1 | 3/2016 | Schmudderich et al. |
| 2016/0068103 A1 | 3/2016 | McNew et al. |
| 2016/0103499 A1 | 4/2016 | Yamamoto et al. |
| 2016/0148059 A1* | 5/2016 | Kawano ............. G06V 20/588 |
| | | 382/104 |
| 2016/0167653 A1 | 6/2016 | Malone et al. |
| 2016/0171320 A1 | 6/2016 | Nagata et al. |
| 2016/0231743 A1* | 8/2016 | Bendewald ....... B60W 60/0051 |
| 2016/0264131 A1 | 9/2016 | Chan et al. |
| 2016/0307056 A1 | 10/2016 | Schiek et al. |
| 2016/0327949 A1 | 11/2016 | Wilson et al. |
| 2016/0358477 A1 | 12/2016 | Ansari |
| 2016/0363935 A1 | 12/2016 | Shuster et al. |
| 2016/0364990 A1 | 12/2016 | Khaghani et al. |
| 2016/0378112 A1 | 12/2016 | Ljubuncic et al. |
| 2017/0008521 A1* | 1/2017 | Braunstein ................ G01S 5/16 |
| 2017/0010618 A1 | 1/2017 | Shashua et al. |
| 2017/0015318 A1 | 1/2017 | Scofield et al. |
| 2017/0031361 A1 | 2/2017 | Olson et al. |
| 2017/0052034 A1 | 2/2017 | Magazinik et al. |
| 2017/0057507 A1 | 3/2017 | Gordon et al. |
| 2017/0057516 A1 | 3/2017 | Gordon et al. |
| 2017/0088143 A1 | 3/2017 | Goldman-Shenhar et al. |
| 2017/0096164 A1 | 4/2017 | Sun et al. |
| 2017/0109644 A1 | 4/2017 | Nariyambut et al. |
| 2017/0113627 A1 | 4/2017 | Ding |
| 2017/0113801 A1 | 4/2017 | Brunaux et al. |
| 2017/0120448 A1 | 5/2017 | Lee et al. |
| 2017/0123419 A1 | 5/2017 | Levinson et al. |
| 2017/0123423 A1 | 5/2017 | Sako et al. |
| 2017/0136842 A1 | 5/2017 | Anderson et al. |
| 2017/0146362 A1 | 5/2017 | Bai et al. |
| 2017/0158225 A1* | 6/2017 | Brown .............. B62D 15/021 |
| 2017/0168689 A1 | 6/2017 | Goldman-Shenhar et al. |
| 2017/0169208 A1 | 6/2017 | Jantz et al. |
| 2017/0176195 A1 | 6/2017 | Rajagopalan et al. |
| 2017/0192437 A1 | 7/2017 | Bier et al. |
| 2017/0200061 A1* | 7/2017 | Julian ................ G06V 10/764 |
| 2017/0210379 A1* | 7/2017 | Obata ............. B60W 30/18163 |
| 2017/0217428 A1 | 8/2017 | Tan et al. |
| 2017/0217446 A1 | 8/2017 | Halder |
| 2017/0225677 A1 | 8/2017 | Yoshida et al. |
| 2017/0234689 A1 | 8/2017 | Gibson et al. |
| 2017/0240096 A1 | 8/2017 | Ross et al. |
| 2017/0241794 A1* | 8/2017 | Koo .................... G08G 1/09623 |
| 2017/0262790 A1 | 9/2017 | Khasis |
| 2017/0267177 A1 | 9/2017 | Nariyambut Murali et al. |
| 2017/0267256 A1 | 9/2017 | Minster et al. |
| 2017/0284823 A1 | 10/2017 | McNew et al. |
| 2017/0286785 A1 | 10/2017 | Schaffer et al. |

(56) References Cited

U.S. PATENT DOCUMENTS

| | | |
|---|---|---|
| 2017/0297564 A1* | 10/2017 | Xi .................. B60W 30/18145 |
| 2017/0297586 A1* | 10/2017 | Li ..................... B60W 50/0097 |
| 2017/0297588 A1 | 10/2017 | Doshi |
| 2017/0305434 A1 | 10/2017 | Ratnasingam |
| 2017/0316625 A1 | 11/2017 | Stefan et al. |
| 2017/0320500 A1 | 11/2017 | Yoo et al. |
| 2017/0329330 A1* | 11/2017 | Hatano ................ G05B 19/414 |
| 2017/0349099 A1 | 12/2017 | Kunze et al. |
| 2017/0357257 A1 | 12/2017 | Yang et al. |
| 2017/0364070 A1 | 12/2017 | Oba |
| 2017/0364083 A1* | 12/2017 | Yang ..................... B60W 30/12 |
| 2017/0369052 A1* | 12/2017 | Nagy ..................... B60W 30/09 |
| 2017/0369072 A1* | 12/2017 | Huber ................... B60W 30/09 |
| 2017/0370744 A1 | 12/2017 | Miyajima |
| 2018/0009445 A1* | 1/2018 | Nishi .................... G05D 1/0221 |
| 2018/0011488 A1* | 1/2018 | Nishi .................... G05D 1/0088 |
| 2018/0022350 A1 | 1/2018 | McNew |
| 2018/0032082 A1* | 2/2018 | Shalev-Shwartz ....... G06N 3/00 |
| 2018/0035606 A1 | 2/2018 | Burdoucci |
| 2018/0043901 A1 | 2/2018 | Kim et al. |
| 2018/0052000 A1 | 2/2018 | Larner et al. |
| 2018/0052458 A1* | 2/2018 | Tsuji .................. B60W 30/143 |
| 2018/0058875 A1* | 3/2018 | Wan .................... G01C 21/3641 |
| 2018/0067488 A1* | 3/2018 | Pollach .................... G06N 7/01 |
| 2018/0074493 A1 | 3/2018 | Prokhorov et al. |
| 2018/0074497 A1* | 3/2018 | Tsuji ............... B60W 30/18163 |
| 2018/0075309 A1 | 3/2018 | Sathyanarayana et al. |
| 2018/0089563 A1* | 3/2018 | Redding ................ G06N 3/006 |
| 2018/0093676 A1 | 4/2018 | Emura et al. |
| 2018/0105185 A1* | 4/2018 | Watanabe ............... B60K 35/10 |
| 2018/0105186 A1* | 4/2018 | Motomura ........... G05D 1/0088 |
| 2018/0113461 A1 | 4/2018 | Potnis et al. |
| 2018/0120843 A1 | 5/2018 | Berntorp et al. |
| 2018/0130347 A1 | 5/2018 | Ricci et al. |
| 2018/0135998 A1 | 5/2018 | Paramasivam et al. |
| 2018/0141562 A1 | 5/2018 | Singhal et al. |
| 2018/0141568 A1 | 5/2018 | Singhal et al. |
| 2018/0148036 A1* | 5/2018 | Gaither ............ B60W 30/1882 |
| 2018/0154899 A1 | 6/2018 | Tiwari et al. |
| 2018/0157957 A1 | 6/2018 | Ambeck-Madsen et al. |
| 2018/0162409 A1 | 6/2018 | Altmannshofer et al. |
| 2018/0164879 A1 | 6/2018 | Moffat et al. |
| 2018/0170392 A1 | 6/2018 | Yang et al. |
| 2018/0186372 A1 | 7/2018 | Shimizu et al. |
| 2018/0194280 A1* | 7/2018 | Shibata .............. G01C 21/3484 |
| 2018/0194354 A1 | 7/2018 | Takeda |
| 2018/0197440 A1 | 7/2018 | Ramachandra et al. |
| 2018/0201273 A1 | 7/2018 | Xiao et al. |
| 2018/0257682 A1 | 9/2018 | Brooks et al. |
| 2018/0259956 A1 | 9/2018 | Kawamoto |
| 2018/0267558 A1 | 9/2018 | Tiwari et al. |
| 2018/0281787 A1* | 10/2018 | Shiota ...................... B60T 7/12 |
| 2018/0281807 A1 | 10/2018 | Minegishi et al. |
| 2018/0281812 A1 | 10/2018 | Tochioka et al. |
| 2018/0284766 A1 | 10/2018 | Minegishi et al. |
| 2018/0284767 A1 | 10/2018 | Minegishi et al. |
| 2018/0284774 A1 | 10/2018 | Kawamoto |
| 2018/0292824 A1* | 10/2018 | Kazemi ................ G05D 1/0221 |
| 2018/0292830 A1* | 10/2018 | Kazemi ............... G01C 21/3453 |
| 2018/0300964 A1 | 10/2018 | Lakshamanan et al. |
| 2018/0307902 A1 | 10/2018 | Arai et al. |
| 2018/0312168 A1 | 11/2018 | Li |
| 2018/0316625 A1 | 11/2018 | Xu et al. |
| 2018/0357409 A1 | 12/2018 | Jantz et al. |
| 2018/0362049 A1 | 12/2018 | Avireddi et al. |
| 2019/0012909 A1* | 1/2019 | Mintz .................. G08G 1/0112 |
| 2019/0022347 A1 | 1/2019 | Wan et al. |
| 2019/0035275 A1 | 1/2019 | Nishi |
| 2019/0047578 A1 | 2/2019 | Swan et al. |
| 2019/0047584 A1 | 2/2019 | Donnelly |
| 2019/0049967 A1 | 2/2019 | Lim et al. |
| 2019/0049981 A1* | 2/2019 | Fischer ................ G05D 1/0088 |
| 2019/0051172 A1 | 2/2019 | Stenneth et al. |
| 2019/0064801 A1* | 2/2019 | Frazzoli ................ G05D 1/0061 |
| 2019/0064804 A1* | 2/2019 | Frazzoli ............. B60W 60/0059 |
| 2019/0102656 A1 | 4/2019 | Kwant et al. |
| 2019/0102689 A1* | 4/2019 | Lassoued ............... G07C 5/008 |
| 2019/0113929 A1 | 4/2019 | Mukadam et al. |
| 2019/0120640 A1* | 4/2019 | Ho ..................... G01C 21/3461 |
| 2019/0129422 A1 | 5/2019 | Nojoumian |
| 2019/0135434 A1 | 5/2019 | Zhang et al. |
| 2019/0138024 A1 | 5/2019 | Liang et al. |
| 2019/0138691 A1 | 5/2019 | Hu et al. |
| 2019/0143992 A1* | 5/2019 | Sohn ..................... B60W 40/09 701/23 |
| 2019/0147254 A1* | 5/2019 | Bai ........................ G06N 3/045 |
| 2019/0147255 A1* | 5/2019 | Homayounfar ... G06F 18/24143 382/104 |
| 2019/0155291 A1* | 5/2019 | Heit ..................... G05D 1/0088 701/23 |
| 2019/0164007 A1* | 5/2019 | Liu ........................ G06V 20/54 |
| 2019/0168760 A1 | 6/2019 | Ryne et al. |
| 2019/0180502 A1 | 6/2019 | Englard et al. |
| 2019/0180527 A1 | 6/2019 | Segal et al. |
| 2019/0184875 A1 | 6/2019 | Gomez et al. |
| 2019/0184878 A1 | 6/2019 | Milner et al. |
| 2019/0185010 A1 | 6/2019 | Ganguli et al. |
| 2019/0185011 A1 | 6/2019 | Zheng et al. |
| 2019/0185012 A1 | 6/2019 | Zheng et al. |
| 2019/0185013 A1 | 6/2019 | Zhou et al. |
| 2019/0187700 A1 | 6/2019 | Zheng et al. |
| 2019/0187705 A1 | 6/2019 | Ganguli et al. |
| 2019/0187706 A1 | 6/2019 | Zhou et al. |
| 2019/0187707 A1 | 6/2019 | Zheng et al. |
| 2019/0187708 A1 | 6/2019 | Zheng et al. |
| 2019/0188467 A1* | 6/2019 | Armeni ................. B60W 40/09 |
| 2019/0196487 A1* | 6/2019 | Akiyama ........ B60W 30/18163 |
| 2019/0212749 A1* | 7/2019 | Chen ..................... G06N 20/00 |
| 2019/0213429 A1 | 7/2019 | Sicconi et al. |
| 2019/0220028 A1 | 7/2019 | Anderson |
| 2019/0228571 A1 | 7/2019 | Atsmon |
| 2019/0235497 A1* | 8/2019 | Glebov ............. G01C 21/3667 |
| 2019/0241198 A1* | 8/2019 | Mori ......................... G08G 1/16 |
| 2019/0243459 A1 | 8/2019 | Imaizumi et al. |
| 2019/0258251 A1 | 8/2019 | Ditty et al. |
| 2019/0265712 A1 | 8/2019 | Satzoda et al. |
| 2019/0265713 A1* | 8/2019 | Zhou ..................... B60W 30/16 |
| 2019/0266418 A1* | 8/2019 | Xu ......................... G06V 10/764 |
| 2019/0266489 A1 | 8/2019 | Hu et al. |
| 2019/0291728 A1 | 9/2019 | Shalev-Shwartz et al. |
| 2019/0291745 A1 | 9/2019 | Sikorski et al. |
| 2019/0294167 A1 | 9/2019 | Kutila et al. |
| 2019/0299978 A1 | 10/2019 | Balakrishnan et al. |
| 2019/0302768 A1* | 10/2019 | Zhang ................... G05D 1/0088 |
| 2019/0311715 A1 | 10/2019 | Pfeffinger et al. |
| 2019/0318267 A1 | 10/2019 | Zhang et al. |
| 2019/0318740 A1 | 10/2019 | Takiguchi et al. |
| 2019/0322287 A1* | 10/2019 | Escrig-Monferrer ....................... B60W 30/18163 |
| 2019/0324553 A1 | 10/2019 | Liu et al. |
| 2019/0329763 A1* | 10/2019 | Sierra Gonzalez ... B60W 30/09 |
| 2019/0332109 A1* | 10/2019 | Kolouri ................ G06V 20/58 |
| 2019/0333381 A1 | 10/2019 | Shalev-Shwartz et al. |
| 2019/0344797 A1 | 11/2019 | Palanisamy et al. |
| 2019/0346844 A1* | 11/2019 | Chen .................. G05B 13/0265 |
| 2019/0361439 A1 | 11/2019 | Zeng et al. |
| 2019/0369637 A1 | 12/2019 | Shalev-Shwartz et al. |
| 2019/0370580 A1 | 12/2019 | Aoi et al. |
| 2020/0005060 A1 | 1/2020 | Martin et al. |
| 2020/0019165 A1 | 1/2020 | Levandowski et al. |
| 2020/0026362 A1 | 1/2020 | Kim et al. |
| 2020/0031361 A1 | 1/2020 | Soliman |
| 2020/0031371 A1 | 1/2020 | Soliman |
| 2020/0033868 A1 | 1/2020 | Palanisamy et al. |
| 2020/0033869 A1 | 1/2020 | Palanisamy et al. |
| 2020/0057487 A1 | 2/2020 | Sicconi et al. |
| 2020/0064839 A1 | 2/2020 | Oyama |
| 2020/0065711 A1 | 2/2020 | Clement et al. |
| 2020/0075006 A1 | 3/2020 | Chen |
| 2020/0079524 A1 | 3/2020 | Escobar et al. |
| 2020/0081442 A1* | 3/2020 | Kizumi .................... G01C 21/34 |
| 2020/0089245 A1* | 3/2020 | Yadmellat .......... G01C 21/3446 |
| 2020/0094815 A1 | 3/2020 | Tan et al. |
| 2020/0097754 A1 | 3/2020 | Tawari et al. |

(56) References Cited

U.S. PATENT DOCUMENTS

| | | |
|---|---|---|
| 2020/0101974 A1 | 4/2020 | Ha et al. |
| 2020/0116499 A1 | 4/2020 | Jung et al. |
| 2020/0139973 A1* | 5/2020 | Palanisamy ............ G08G 1/167 |
| 2020/0139989 A1* | 5/2020 | Xu ....................... B60W 10/20 |
| 2020/0150773 A1 | 5/2020 | Son et al. |
| 2020/0160069 A1 | 5/2020 | Sathyanarayana et al. |
| 2020/0160168 A1* | 5/2020 | Yang ....................... G06N 3/006 |
| 2020/0174490 A1* | 6/2020 | Ogale ..................... G06N 3/084 |
| 2020/0192307 A1* | 6/2020 | Wee ...................... G06N 20/00 |
| 2020/0207353 A1 | 7/2020 | Chen et al. |
| 2020/0210717 A1* | 7/2020 | Hou ......................... G06T 7/70 |
| 2020/0225676 A1 | 7/2020 | Telpaz et al. |
| 2020/0242421 A1 | 7/2020 | Sobhany et al. |
| 2020/0244430 A1 | 7/2020 | Karabinis |
| 2020/0255014 A1 | 8/2020 | Meroux et al. |
| 2020/0264900 A1* | 8/2020 | Cheriton ................ G16H 50/20 |
| 2020/0278685 A1 | 9/2020 | Jang et al. |
| 2020/0317449 A1 | 10/2020 | Baijens et al. |
| 2020/0339123 A1* | 10/2020 | Ozay ............. B60W 30/18163 |
| 2020/0377082 A1 | 12/2020 | Nassouri et al. |
| 2021/0004017 A1 | 1/2021 | Colgate et al. |
| 2021/0009115 A1* | 1/2021 | Ohmura ..................... B60T 8/92 |
| 2021/0009133 A1 | 1/2021 | McNew |
| 2021/0056863 A1* | 2/2021 | Stefanescu ............. G06N 3/006 |
| 2021/0061294 A1* | 3/2021 | Doemling .............. G06N 3/045 |
| 2021/0064033 A1* | 3/2021 | Telpaz ................... G06N 20/00 |
| 2021/0078611 A1 | 3/2021 | Hayes et al. |
| 2021/0080950 A1* | 3/2021 | Tran ....................... B60Q 5/005 |
| 2021/0097315 A1 | 4/2021 | Carruthers et al. |
| 2021/0107494 A1 | 4/2021 | Silver |
| 2021/0114619 A1* | 4/2021 | Mimura ........... B60W 60/0013 |
| 2021/0165409 A1 | 6/2021 | Berntorp et al. |
| 2021/0166325 A1* | 6/2021 | Shalev-Shwartz ..... G06Q 10/00 |
| 2021/0173402 A1* | 6/2021 | Chang ............. B60W 30/18163 |
| 2021/0188316 A1* | 6/2021 | Marchetti-Bowick ....................... B60W 60/00274 |
| 2021/0237776 A1 | 8/2021 | Hashimoto et al. |
| 2021/0245770 A1 | 8/2021 | Zhou et al. |
| 2021/0253128 A1 | 8/2021 | Nister et al. |
| 2021/0256846 A1 | 8/2021 | McErlean et al. |
| 2021/0271988 A1* | 9/2021 | Bouton .................... G06N 3/08 |
| 2021/0323570 A1 | 10/2021 | Yasui |
| 2021/0364307 A1* | 11/2021 | Kracun .................. G06N 20/00 |
| 2021/0380139 A1 | 12/2021 | Taveira et al. |
| 2021/0403038 A1* | 12/2021 | Horigome ............ B62D 15/025 |
| 2022/0074758 A1* | 3/2022 | Sameer ............ G08G 1/096775 |
| 2022/0101726 A1 | 3/2022 | Fields et al. |
| 2022/0109705 A1 | 4/2022 | Verbeke et al. |
| 2022/0185296 A1 | 6/2022 | Zheng et al. |
| 2022/0187837 A1* | 6/2022 | Tebbens .............. G06F 16/2246 |
| 2022/0244061 A1 | 8/2022 | Mellinger et al. |
| 2022/0269290 A1 | 8/2022 | Dadkhah Tehrani et al. |
| 2022/0297719 A1 | 9/2022 | Mittal et al. |
| 2022/0315000 A1 | 10/2022 | Wray et al. |
| 2022/0324449 A1 | 10/2022 | Shi |
| 2022/0350336 A1* | 11/2022 | Gyllenhammar .... G05D 1/0221 |
| 2022/0364870 A1* | 11/2022 | Wang ................. G01C 21/3476 |
| 2023/0055066 A1 | 2/2023 | Asadi et al. |
| 2023/0110730 A1* | 4/2023 | Chen .................... G06V 20/588 382/104 |
| 2023/0114577 A1 | 4/2023 | Sameer |
| 2023/0142461 A1* | 5/2023 | Hoel ........................ G06N 7/01 701/23 |
| 2023/0143946 A1* | 5/2023 | Konrardy ............... G06N 20/00 701/23 |
| 2023/0144209 A1* | 5/2023 | Cai ........................... G06T 5/20 348/148 |
| 2023/0159025 A1* | 5/2023 | Tummala ............. G08G 1/0965 701/26 |
| 2023/0192095 A1 | 6/2023 | Liu et al. |
| 2023/0202490 A1 | 6/2023 | Marzorati et al. |
| 2023/0219564 A1 | 7/2023 | Baumann et al. |
| 2023/0278582 A1 | 9/2023 | Zhang et al. |
| 2023/0282210 A1 | 9/2023 | Bond et al. |
| 2023/0294514 A1 | 9/2023 | Moharty et al. |
| 2023/0322234 A1* | 10/2023 | Wang .................... B60W 30/12 701/1 |
| 2023/0347940 A1* | 11/2023 | Longo ............. B60W 60/00274 |
| 2023/0351228 A1* | 11/2023 | Hazard ..................... G06N 5/04 |
| 2023/0382395 A1* | 11/2023 | Makita ................. B60W 40/08 |
| 2024/0119682 A1 | 4/2024 | Rudman et al. |
| 2024/0132060 A1* | 4/2024 | Newman .............. G05D 1/0214 |

FOREIGN PATENT DOCUMENTS

| | | | |
|---|---|---|---|
| CN | 101165509 A | | 4/2008 |
| CN | 101596903 A | | 12/2009 |
| CN | 103646298 A | * | 3/2014 |
| CN | 103985250 A | | 8/2014 |
| CN | 104331953 A | | 2/2015 |
| CN | 104890595 A | | 9/2015 |
| CN | 104973071 A | | 10/2015 |
| CN | 105593640 A | | 5/2016 |
| CN | 105974920 A | | 9/2016 |
| CN | 106197449 A | | 12/2016 |
| CN | 106649983 A | | 5/2017 |
| CN | 106767874 A | | 5/2017 |
| CN | 106915354 A | | 7/2017 |
| CN | 106960600 A | | 7/2017 |
| CN | 106989752 A | | 7/2017 |
| CN | 106990714 A | | 7/2017 |
| CN | 107200020 A | | 9/2017 |
| CN | 107207013 A | | 9/2017 |
| CN | 107223101 A | | 9/2017 |
| CN | 107340772 A | | 11/2017 |
| DE | 10 2015 215 079 A | | 2/2017 |
| DE | 10 2016 122 402 A1 | | 5/2017 |
| EP | 2 369 299 A1 | | 9/2011 |
| EP | 2 916 190 A1 | | 9/2015 |
| EP | 2915718 A1 | | 9/2015 |
| EP | 3272611 B1 | * | 7/2019 ............. B60K 35/00 |
| GB | 2546565 A | | 7/2017 |
| JP | 2007176396 A | | 7/2007 |
| JP | 2008275575 A | | 11/2008 |
| KR | 101795250 B1 | | 11/2017 |
| WO | 2016012867 A1 | | 1/2016 |
| WO | 2016/109637 A1 | | 7/2016 |
| WO | 2016170785 A1 | | 10/2016 |
| WO | 2017029096 A1 | | 2/2017 |
| WO | 2017/062106 A1 | | 4/2017 |
| WO | 2017/189203 A1 | | 11/2017 |
| WO | 2017/219319 A1 | | 12/2017 |

OTHER PUBLICATIONS

International Search Report and Written Opinion mailed Mar. 29, 2018 for International Application No. PCT/IB2017/058086, 7 pages.
Extended European Search Report dated Jul. 2, 2021 for European Application No. 17935322.2, 11 pages.
International Preliminary Report on Patentability mailed Jul. 2, 2020 for International Application No. PCT/IB2017/058493.
International Search Report and Written Opinion Apr. 13, 2018 for International Application No. PCT/IB2017/058493, 13 pages.
Extended European Search Report dated Oct. 4, 2021 for European Application No. 17935810.6, 12 pages.
International Preliminary Report on Patentability mailed Jul. 2, 2020 for International Application No. PCT/IB2017/058084.
International Search Report and Written Opinion mailed Apr. 25, 2018 for International Application No. PCT/IB2017/058084, 8 pages.
Extended European Search Report dated Jun. 25, 2021 for European Application No. 17935461.8, 6 pages.
International Preliminary Report on Patentability mailed Jul. 2, 2020 for International Application No. PCT/IB2017/058489.
International Search Report and Written Opinion mailed Apr. 12, 2018 for International Application No. PCT/IB2017/058489, 7 pages.
Extended European Search Report mailed Jun. 28, 2021 for European Application No. 17935508.6, 6 pages.

(56) References Cited

OTHER PUBLICATIONS

International Preliminary Report on Patentability mailed Jul. 2, 2020 for International Application No. PCT/IB2017/058085.
International Search Report and Written Opinion mailed Mar. 29, 2018 for International Application No. PCT/IB2017/058085, 7 pages.
Extended European Search Report dated Jul. 2, 2021 for European Application No. 17935411.3, 8 pages.
International Preliminary Report on Patentability mailed Jul. 2, 2020 for International Application No. PCT/IB2017/058490.
International Search Report and Written Opinion mailed Apr. 6, 2018 for International Application No. PCT/IB2017/058490, 8 pages.
Extended European Search Report dated Jul. 2, 2021 for European Application No. 17935151.5, 6 pages.
International Preliminary Report on Patentability mailed Jul. 2, 2020 for International Application No. PCT/IB2017/058087.
International Search Report and Written Opinion mailed Mar. 30, 2018 for International Application No. PCT/IB2017/058087, 7 pages.
Extended European Search Report dated Jun. 29, 2021 for European Application No. 17935271.1, 5 pages.
International Preliminary Report on Patentability mailed Jul. 2, 2020 for International Application No. PCT/IB2017/058491.
International Search Report and Written Opinion mailed Apr. 23, 2018 for International Application No. PCT/IB2017/058491, 6 pages.
First Office Action dated Mar. 16, 2022 for Chinese Application No. 201780097481.4, with English translation, 17 pages.
Extended European Search Report dated Jul. 1, 2021 for European Application No. 17935809.8, 5 pages.
European Office Action dated Sep. 16, 2022 for European Application No. 17935322.2, 12 pages.
Al-Shihabi, T. & Mourant, R. R., "A Framework for Modeling Human-like Driving Behaviors For Autonomous Vehicles in Driving Simulators," AGENTS '01: Proceedings of the Fifth International Conference on Autonomous Agent, May 2001, pp. 286-291.
Chinese Office Action dated Dec. 15, 2022 for Chinese Application No. 201780097496.0, with English translation, 21 pages.
Chinese Office Action dated Dec. 30, 2022 for Chinese Application No. 201780097485.2, with English translation, 18 pages.
Chinese Office Action dated Dec. 30, 2022 for Chinese Application No. 201780097497.5 with English translation, 18 pages.
Chinese Office Action dated Jan. 4, 2023 for Chinese Application No. 201780097486.7 with English translation, 18 pages.
Tang, Lei, et al., "Review of Vehicular Mobility Models for Vehicular Ad Hoc Network", Journal of Chang'an University (Natural Science), vol. 36, No. 5, Sep. 15, 2016, 12 pages.
Wang, Xiaoyuan, et al., "Study on the Integrated Cognitive Topological Structure of Driver in the Multi-Resource Information Fusion", Communications Standardization, vol. 4, Issue No. 164, Apr. 30, 2007 (Year: 2007), 6 pages.
Zhou, Huizi, et al., "Dynamic Path Planning for Autonomous Driving with Avoidance of Obstacles", Journal of Computer Application, vol. 37, No. 3, Mar. 10, 2017, pp. 883-888.
Zou, Shuilong et al., "Method and System for Road Condition Real-Time Recognition and Danger Judgment Based on Composite Sensor", Mobile Communications, vol. 15, Aug. 15, 2017 (Year: 2017), 6 pages.
First Office Action dated Feb. 4, 2023 for Chinese Application No. 201780097474.4, 9 pages.
First Office Action dated Feb. 4, 2023 for Chinese Application No. 201780097495.6, 8 pages.
First Office Action dated Feb. 21, 2023 for Chinese Application No. 201780097506.0, 15 pages.
Notice of Allowance dated Nov. 29, 2023 for Chinese Application No. 201780097497.5, 6 pages.
Notice of Allowance dated Dec. 16, 2023 for Chinese Application No. 201780097486.7, 6 pages.
Notice of Allowance dated May 29, 2024 for Chinese Application No. 201780097495.6, 4 pages.

* cited by examiner

METHOD AND SYSTEM FOR PERSONALIZED DRIVING LANE PLANNING IN AUTONOMOUS DRIVING VEHICLES

CROSS-REFERENCE TO RELATED APPLICATIONS

The present application is a continuation of U.S. patent application Ser. No. 15/856,728, filed Dec. 28, 2017, which is a continuation of U.S. patent application Ser. No. 15/845,294, filed Dec. 18, 2017, and this application is also related to U.S. patent application Ser. No. 15/845,173, filed Dec. 18, 2017; U.S. patent application Ser. No. 15/845,337, filed Dec. 18, 2017; and U.S. patent application Ser. No. 15/845,423, filed Dec. 18, 2017, all of which are incorporated herein by reference in their entireties.

BACKGROUND

1. Technical Field

The present teaching generally relates to autonomous driving. More specifically, the present teaching relates to planning and control in autonomous driving.

2. Technical Background

With recent technological advancement in artificial intelligence (AI), there is a surge in applying AI in different application fields. This includes the field of autonomous driving, in which planning and control are essential. This is shown in FIG. 1 (Prior Art), in which an autonomous driving module 110 includes a planning module 120 and a vehicle control module 130. Planning may include, as shown in FIG. 2, route planning, motion planning, or behavior planning. Route planning refers to the effort to plan a route from a source to a destination based on certain considerations.

Motion planning may generally refer to the effort of planning the movement of a vehicle to achieve certain effect. For example, the movement of the vehicle may be planned in a way that complies with the traffic regulations or safety. Motion planning is then to determine what movement the vehicle needs to make to achieve that. Behavior planning generally refers to the effort to plan how the vehicle should behave in different situations, e.g., the vehicle behavior while crossing an intersection, the vehicle behavior in staying within or following a lane, or the vehicle behavior in making a turn. For instance, in terms of overtaking a slow moving front vehicle, certain vehicle behavior may be planned. Behavior planning and motion planning may be related. For example, the planned vehicle behavior may need to be translated into motion in order to implement the behavior.

Vehicle control 130 as shown in FIG. 1 may involve various aspects of control. This is illustrated in FIG. 3, which shows that vehicle control may involve, e.g., roadway specific control, motion specific control, mass specific control, geometry specific control, aerodynamic specific control, and tire specific control.

Surrounding information 100 in FIG. 1 may be used for vehicle planning. Traditionally, surrounding information 100 includes, e.g., current location of the vehicle, intended destination, and/or traffic information. Utilizing such surrounding information, the conventional planning module 120 may devise, e.g., a plan for a route from the current location to the destination. Known criteria used in route planning may include, e.g., shortest distance, shortest time, use of highways, use of local roads, traffic, etc. Such criteria may be applied based on known information such as the distance of each road segment, known traffic patterns associated with roads, etc.

The planning module 120 may also perform motion planning, which is traditionally based on, e.g., rapidly exploring random trees (RRT) for state space or Markov Decision Process (MDP) for environmental modeling. The planning module 120 may generate, based on the planned route/motion, planning data to be fed to the vehicle control module 130 so that the vehicle control module 130 can proceed to control the vehicle in a way as planned. To make the vehicle to move to carry out the plan, the vehicle control module 130 may then generate control signals 140 which may be sent to different parts of the vehicle to implement the planned vehicle movement. Vehicle control is traditionally exercised based on generic vehicle kinematic models and/or different types of feedback controllers.

Each human driver generally operates or controls a vehicle differently with diverse preferences. Human drivers also operate vehicles adaptively based on real time situations, which may arise out of the present conditions of the vehicle itself, the extrinsic environment conditions that serve to limit the ability of the vehicle to operate, and/or the reaction or response to the current vehicle movement from passengers in the vehicle. For example, with children in the vehicle, a human driver may elect, for safety, to avoid (route planning) a route that is curvy on a snowy day. A human driver may drive in different manners when different passengers are riding in the vehicle to ensure comfort of the passenger. Although a human driver generally controls a vehicle by following a lane by staying roughly in the middle of the lane, the behavior may change when faced with a right turn. In this case, the same human driver may curve to the right side of the lane when the vehicle is approaching the point of the right turn. In addition, different human drivers may curve to the right in different ways. Furthermore, lane changing behavior may also differ with respect to different vehicles in different surrounding situations. The existing technologies do not address those issues, let alone providing solutions.

Therefore, there is a need to provide improved solutions for planning and control in autonomous driving.

SUMMARY

The teachings disclosed herein relate to methods, systems, and programming for online services. More particularly, the present teaching relates to methods, systems, and programming for developing a virtual agent that can have a dialog with a user.

In one example, a method for lane planning in an autonomous vehicle is disclosed. Sensor data are received that capture ground images of a road the autonomous vehicle is on. Based on the sensor data, a current lane of the road that autonomous vehicle is currently occupying is detected. Information indicating presence of a passenger in the vehicle is obtained and used to retrieve a personalized lane control model related to the passenger. Lane control for the autonomous vehicle is planned based on the detected current lane and self-aware capability parameters in accordance with the personalized lane control model. The self-aware capability parameters are used to predict operational capability of the autonomous vehicle with respect to a current location of the autonomous vehicle. The personalized lane control model is generated based on recorded human driving data.

In another example, a system for lane planning in an autonomous vehicle is disclosed. The system comprises a driving lane detector and a driving lane planning unit. The driving lane detector is configured for receiving sensor data capturing ground images of a road the autonomous vehicle is on and detecting, from the sensor data, a current lane of the road the autonomous vehicle is currently occupying. The driving lane planning unit is configured for obtaining information indicating presence of a passenger within the autonomous vehicle, retrieving a personalized lane control model related to the passenger, and planning lane control for the autonomous vehicle based on the detected current lane and self-aware capability parameters in accordance with the personalized lane control model. The self-aware capability parameters are used to predict the operational capability of the autonomous vehicle with respect to a current location of the vehicle. The personalized lane control model is generated based on recorded human driving data.

Other concepts relate to software for implementing the present teaching on developing a virtual agent. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, machine readable non-transitory medium is disclosed, wherein the medium has information recorded thereon for lane control in an autonomous vehicle, where the information, when read by the machine, causes the machine to perform various steps. Sensor data are received that capture ground images of a road the autonomous vehicle is on. Based on the sensor data, a current lane of the road that autonomous vehicle is currently occupying is detected. Information indicating presence of a passenger in the vehicle is obtained and used to retrieve a personalized lane control model related to the passenger. Lane control for the autonomous vehicle is planned based on the detected current lane and self-aware capability parameters in accordance with the personalized lane control model. The self-aware capability parameters are used to predict operational capability of the autonomous vehicle with respect to a current location of the autonomous vehicle. The personalized lane control model is generated based on recorded human driving data.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
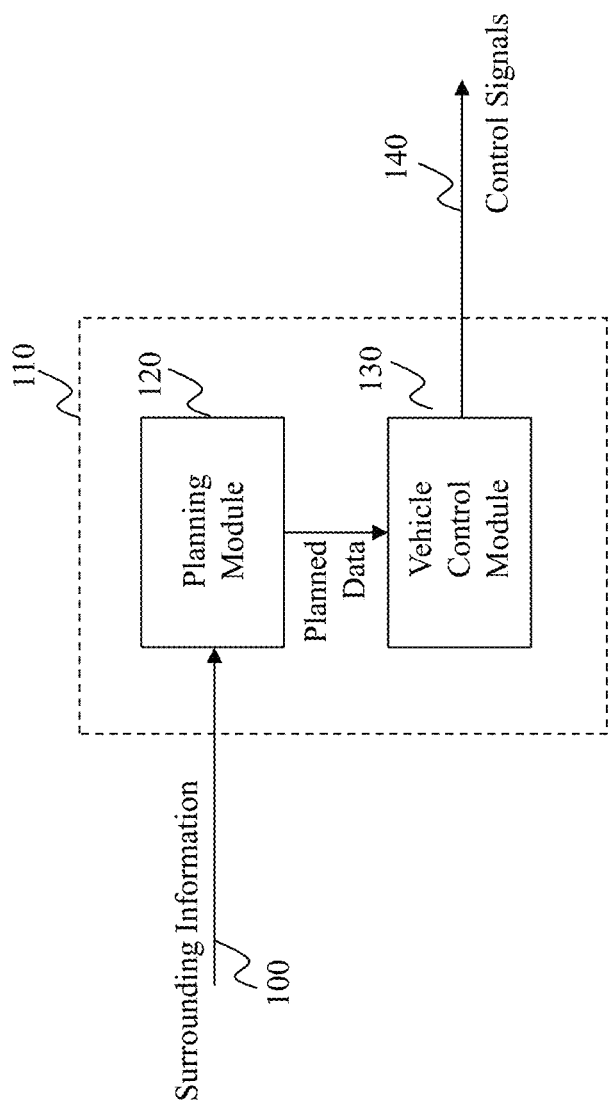
FIG. 1 (Prior Art) shows some essential modules in autonomous driving.
Figure 2:
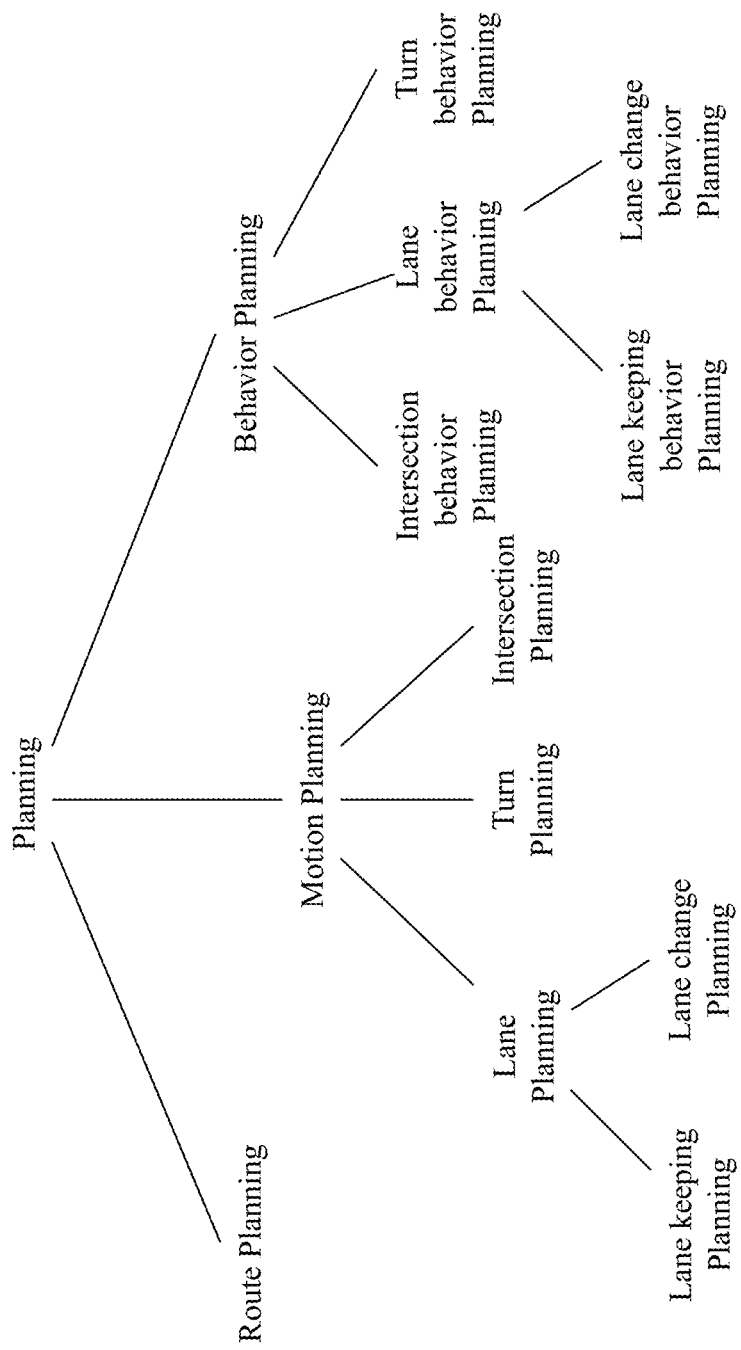
FIG. 2 illustrates exemplary types of planning in autonomous driving.
Figure 3:
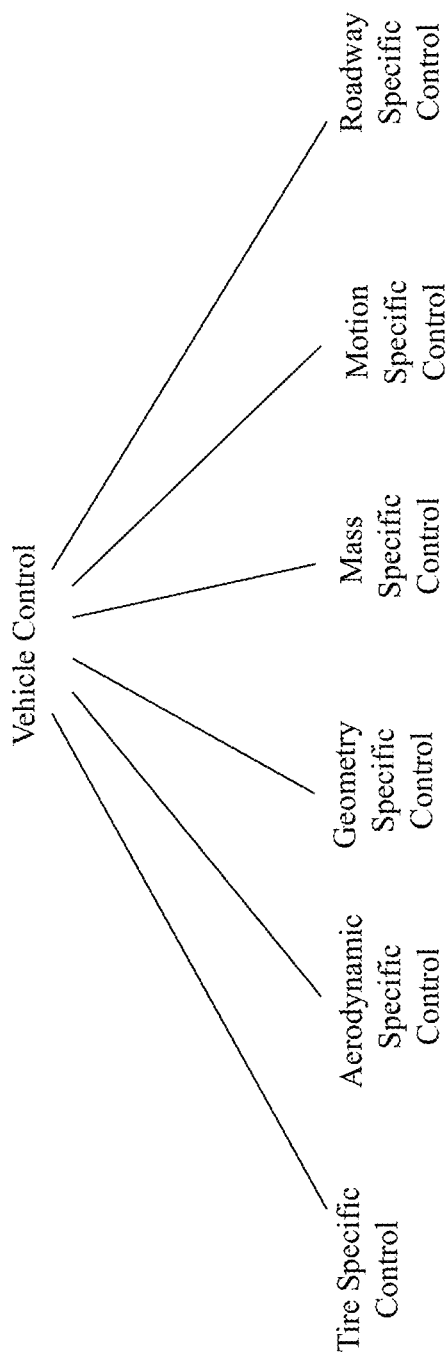
FIG. 3 illustrates commonly known types of vehicle control.
Figure 4A:
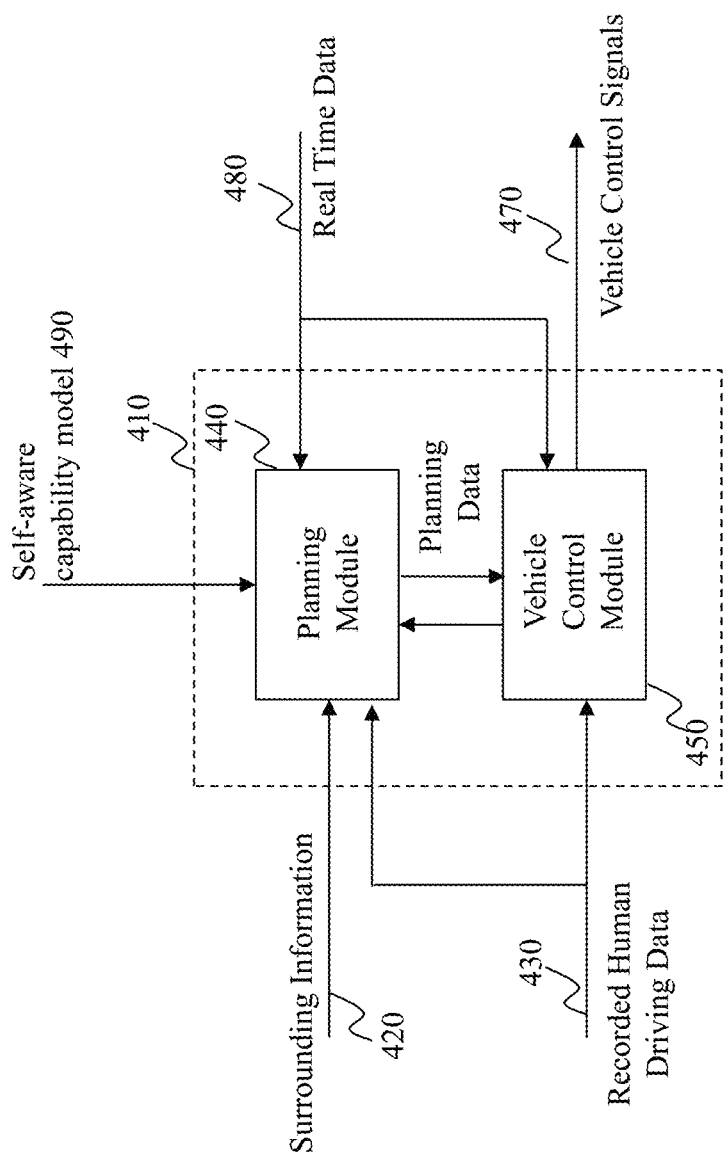
FIG. 4A depicts an autonomous driving vehicle with a planning module and a vehicle control module, according to an embodiment of the present teaching.

The present disclosure generally relates to systems, methods, medium, and other implementations for planning and control of route/vehicle behaviors in a self-capability aware, human-like, and personalized manner that is adaptive to real time situations. FIG. 4A shows an autonomous vehicle with a vehicle planning/control mechanism 410, according to an embodiment of the present teaching. The autonomous vehicle planning/control mechanism 410 includes a planning module 440 and a vehicle control module 450. Both modules take various types of information as input in order to achieve operations that are self-capability aware, human-like, personalized and adaptive to real time situations. For example, as shown, both the planning module 440 and the vehicle control module 450 receive historical manual driving data 430 in order to learn human like ways to handle the vehicle in different situations. These modules also receive real time data 480 in order to be aware of the dynamic situations surround the vehicle in order to adapt the operations accordingly. Furthermore, the planning module 440 accesses a self-aware capability model 490 which characterizes what limits the operational ability of the vehicle given the situation the vehicle is currently in.

Figure 4B:
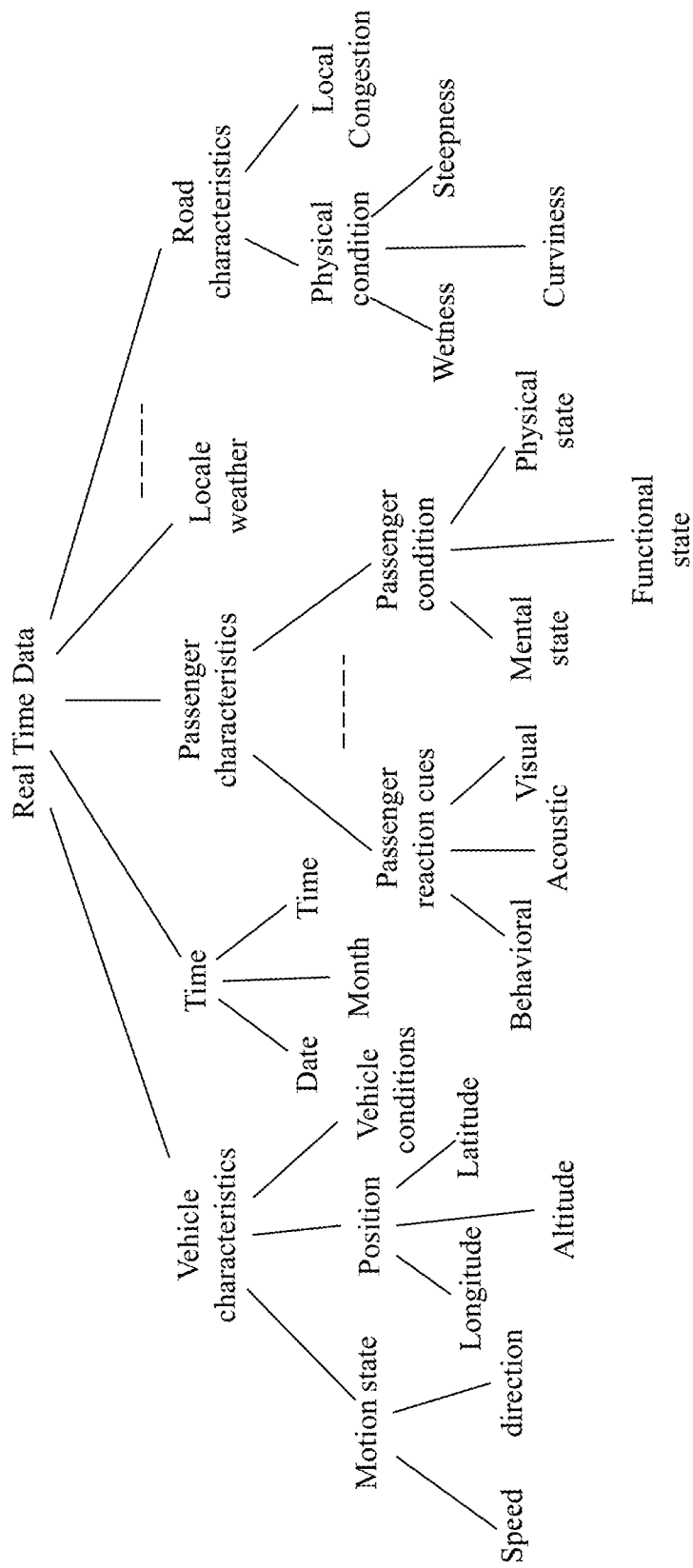
FIG. 4B illustrates exemplary types of real time data, according to an embodiment of the present teaching.

Real time data 480 may include various types of information useful or relevant for planning and control of the vehicle. FIG. 4B illustrates exemplary types of real time data, according to an embodiment of the present invention. For example, exemplary real time data may include vehicle related data, time related data, passenger related data, weather related data, . . . , and data related to the nearby roads. Vehicle related data may include, e.g., the motion state, position, or conditions of the vehicle at the time. The motion state of a vehicle may involve, e.g., its current speed and driving direction. The real time position information may include, e.g., the current latitude, longitude, and altitude of the vehicle. The real time conditions of the vehicle may include the functional state of the vehicle such as whether the vehicle is currently in a full or partial functional state or specific parameters under which different components of the vehicle are operating, etc.

Real time data related to time may generally include current date, time, or month. Passenger related data may include various characteristics related to the passenger of the vehicle such as passenger reaction cues, which may include visual, acoustic, or behavior cues observed from the passenger, or conditions of the passenger such as mental state, physical state, or functional state of the passenger. The conditions of the passenger may be inferred based on the cues observed from the passenger reaction cues. Weather related data may include the weather of the locale where the vehicle is currently situated. The road related data may include information about the physical condition of the nearby road(s), e.g., wetness, steepness, or curviness of the road, or the local traffic condition such as congestion along the road.

Figure 5:
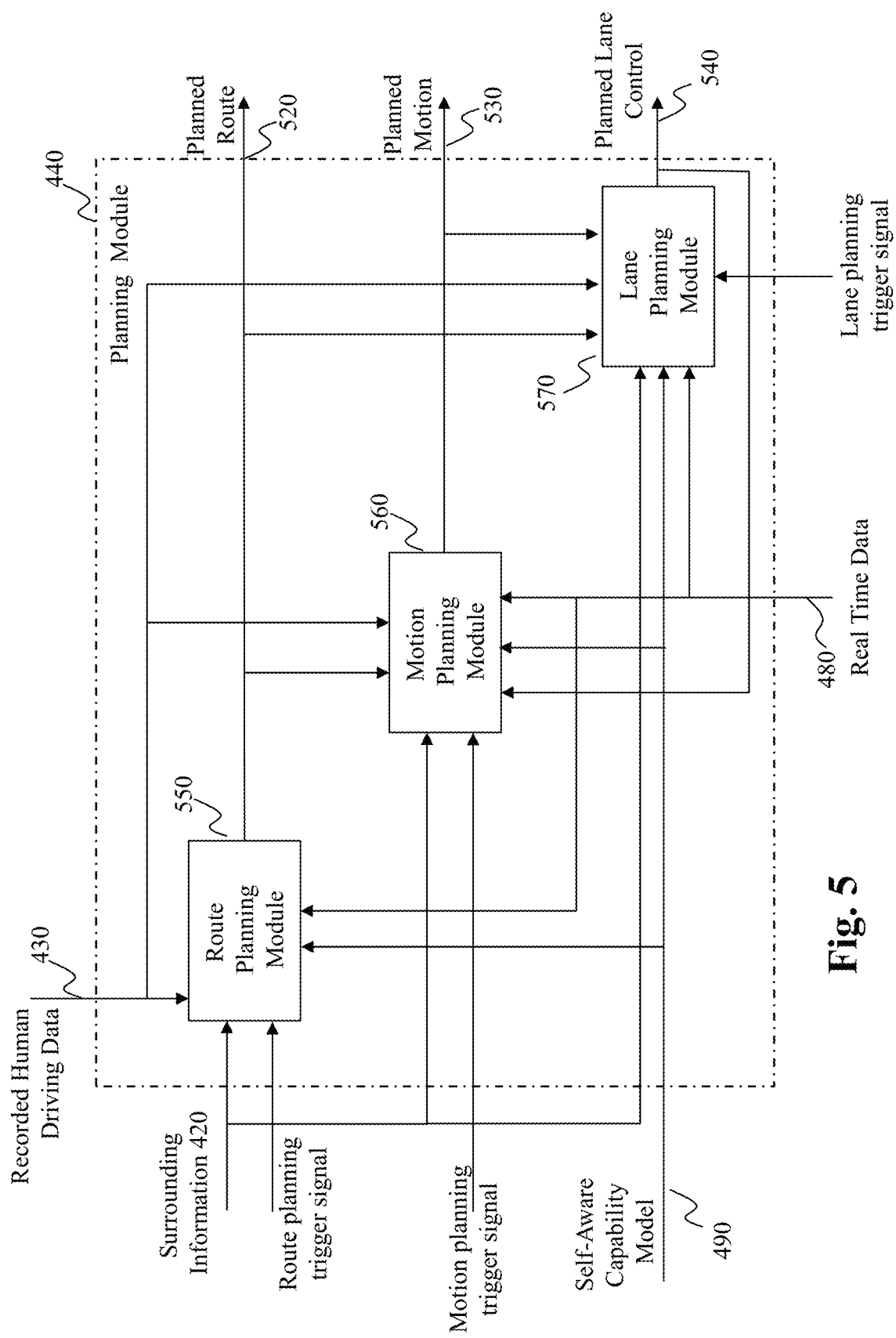
FIG. 5 depicts an exemplary high level system diagram of a planning module, according to an embodiment of the present teaching.

FIG. 5 depicts an exemplary high level system diagram of the planning module 440, according to an embodiment of the present teaching. In this exemplary embodiment, the planning includes, but not limited to, route planning, motion planning, and the planning of lane related behavior, including lane following, lane changing, etc. Accordingly, in this illustrated embodiment, the planning module 440 comprises a route planning module 550, a motion planning module 560, and a lane planning module 570. Each of the modules aims at operating in a self-capability aware, human-like, and personalized manner. Each of the modules 550, 560, and 570 takes, in addition to the surrounding information 420, recorded human driving data 430, real time data 480, and the self-aware capability model 490 as inputs and generates their respective outputs to be used by the vehicle control module 450 to convert into the vehicle control signals 470 to control the vehicle. For example, the route planning module 550 generates the planned route information 520 as its output, the motion planning module 560 generates planned motion 530 as its output, and the lane planning module 570 generates planned lane control information 540 as its output.

Each of the planning modules may be triggered via some triggering signal. For instance, the route planning module 550 may be activated via a route planning trigger signal; the motion planning module 560 may be activated upon receiving a motion planning trigger signal; while the lane planning module 570 may start to operate when a lane planning trigger signal is received. Such a trigger signal may be manually provided (by, e.g., a driver or a passenger) or automatically generated based on, e.g., certain configuration or certain event. A driver may manually activate the route planning module 550 or any other planning module for the route/motion/lane planning, much like what people do to manually start, e.g., cruise control in a car.

The planning activities may also be activated by a certain configuration or an event. For example, the vehicle may be configured to activate route planning whenever the vehicle accepts an input indicating the next destination. This may be regardless what the current location of the vehicle is. In some embodiments, the planning modules may be always triggered on whenever the vehicle is on and depending on the situation, they may become engaged in different planning activities as needed. In different situations, they may also interact with each other in a manner called for by the situation. For example, the lane planning module 570 may determine to change lane in certain circumstance. Such a planned lane control is output by the lane planning module 570 and may be fed to the motion planning module 560 so that a specific path trajectory (planned motion) appropriate for carrying out the planned lane changing may be further planned by the motion planning module 560.

Output of a planning module may be fed into another within the planning module 440 for either further planning or for providing an input for the future planning of another. For example, the output of the route planning module 550 (planned route 520) may be fed to the motion planning module 560 so that the route information may influence how the vehicle motion is planned. As discussed above, the output (planned lane control 540) of the lane planning module 570 may be fed to the motion planning module 560 so that the lane control behavior planned may be realized via planned motion control. Conversely, the output of the motion planning module 560 (the planned motion 530) may also be fed to the lane planning module 570 to influence the planning of the lane control behavior. For instance, in personalized motion planning, the motion planning module 560 may determine that the motion of the vehicle needs to be gentle due to the observation that the passenger of the vehicle prefers smooth motion. Such a determination is part of the motion planning and may be to be sent to the lane planning module 570 so that the lane control behavior of the vehicle may be carried out in a way that ensures smooth motion, e.g., change lane as little as possible.

Figure 6A:
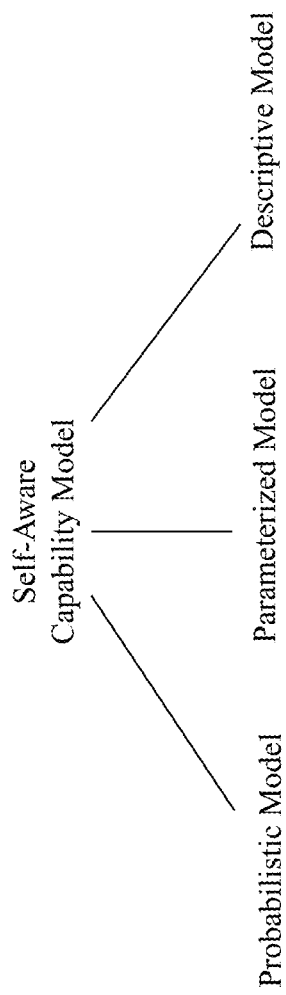
FIG. 6A illustrates exemplary ways to realizing a safe-aware capability model, according to an embodiment of the present teaching.

To ensure that the vehicle behavior is planned and controlled in a self-capability aware manner, the route planning module 550, the motion planning module 560, and the lane planning module 570 also access the self-aware capability model 490 and use it to determine the planning strategy in a manner that takes into account of what the vehicle is actually capable of in the current scenario. FIG. 6A illustrates exemplary ways that the self-aware capability model 490 is realized, according to an embodiment of the present teaching. As illustrated, the self-aware capability model 490 may be constructed as a probabilistic model, a parameterized model, or a descriptive model. Such a model may be trained based on, e.g., learning. The model may include a variety of parameters to be used to characterize factors that may influence or have an impact on the actual ability of the vehicle. The model may be implemented as a probabilistic model with parameters being estimated probabilistically. The model may also be implemented as a parameterized model with explicit model attributes applicable to different real world conditions. The model 490 may also be provided as a descriptive model with enumerated conditions with values instantiated based on real time scenarios.

Figure 6B:
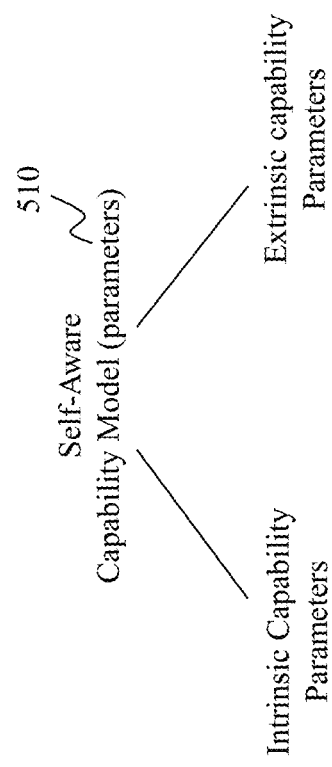
FIG. 6B illustrates an exemplary construct of a self-aware capability model with parameters, according to an embodiment of the present teaching.

The self-aware capability model 490 in any situation may include various parameters, each of which is associated with some factors that may impact the actual ability of the vehicle so that the vehicle planning (route, motion, or lane) has to consider. In the following disclosure, self-aware capability model and self-aware capability parameters will be used interchangeably. FIG. 6B illustrates an exemplary construct of the self-aware capability model or parameters 510, according to an embodiment of the present teaching. As illustrated, self-aware capability parameters 510 may include intrinsic capability parameters and extrinsic capability parameters. Intrinsic vehicle capability parameters may refer to parameters associated with the vehicle itself which may impact what the vehicle is capable of in operation and such parameters may be determined based on either how the vehicle is manufactured or how the vehicle is at the time. Extrinsic capability parameters may refer to the parameters or characteristics of the surrounding that are extrinsic to the vehicle but nevertheless may impact the way the vehicle can be operated.

Figure 6C:
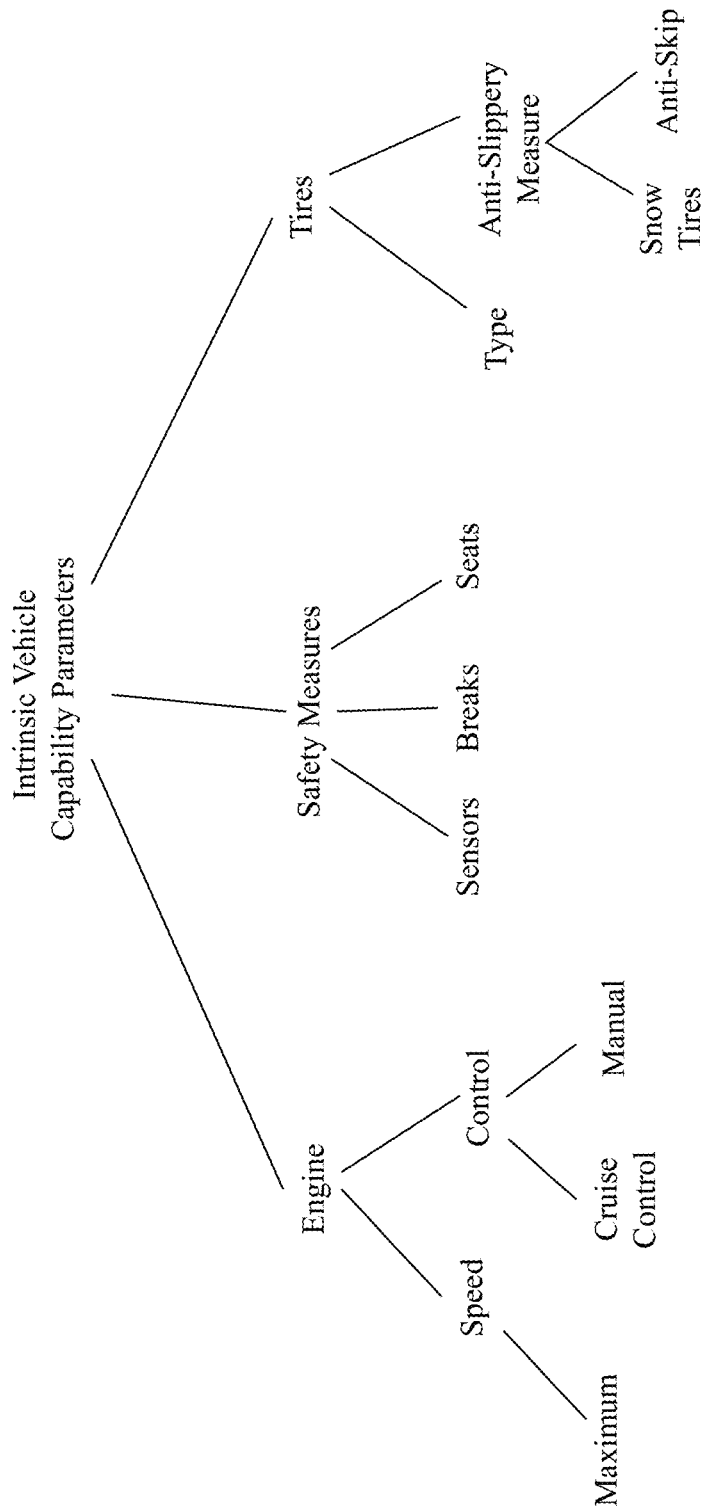
FIG. 6C illustrates exemplary types of intrinsic vehicle capability parameters, according to an embodiment of the present teaching.

FIG. 6C illustrates exemplary types of intrinsic vehicle capability parameters, according to an embodiment of the present teaching. As illustrated, intrinsic vehicle capability parameters may include, but not limited to, characteristics of the vehicle in terms of, e.g., its engine, its safety measures, and its tires, etc. For instance, in terms of its engine, the intrinsic capability parameters may specify the maximum speed the vehicle is capable of, the control that can be exercised on the engine, including cruise control or any restrictions on manual control of the engine. In terms of safety measures, the intrinsic capability parameters may include information on what sensors the vehicle is equipped with, specific parameters related to breaks, or information about the seats of the vehicle. For example, some vehicles may have seats that are backed by metal support (stronger) and some with only plastic support. Some seats may have mechanism which allows automatic control to have vibrations and some may not. In terms of other components of the vehicle, the intrinsic capability parameters may also specify the type of the tires of the vehicle (which may have a bearing on what operation can be done) and whether the vehicle currently has snow tires installed or equipped with anti-skip measures. Such intrinsic vehicle capability parameters may be used to assess what types of routes and motions may be possible and which types of vehicle behaviors may be achievable. Thus, making such intrinsic capability parameters available to the planning modules allows the planning modules to plan appropriately without exceeding what the vehicle is actually capable of.

Figure 6D:
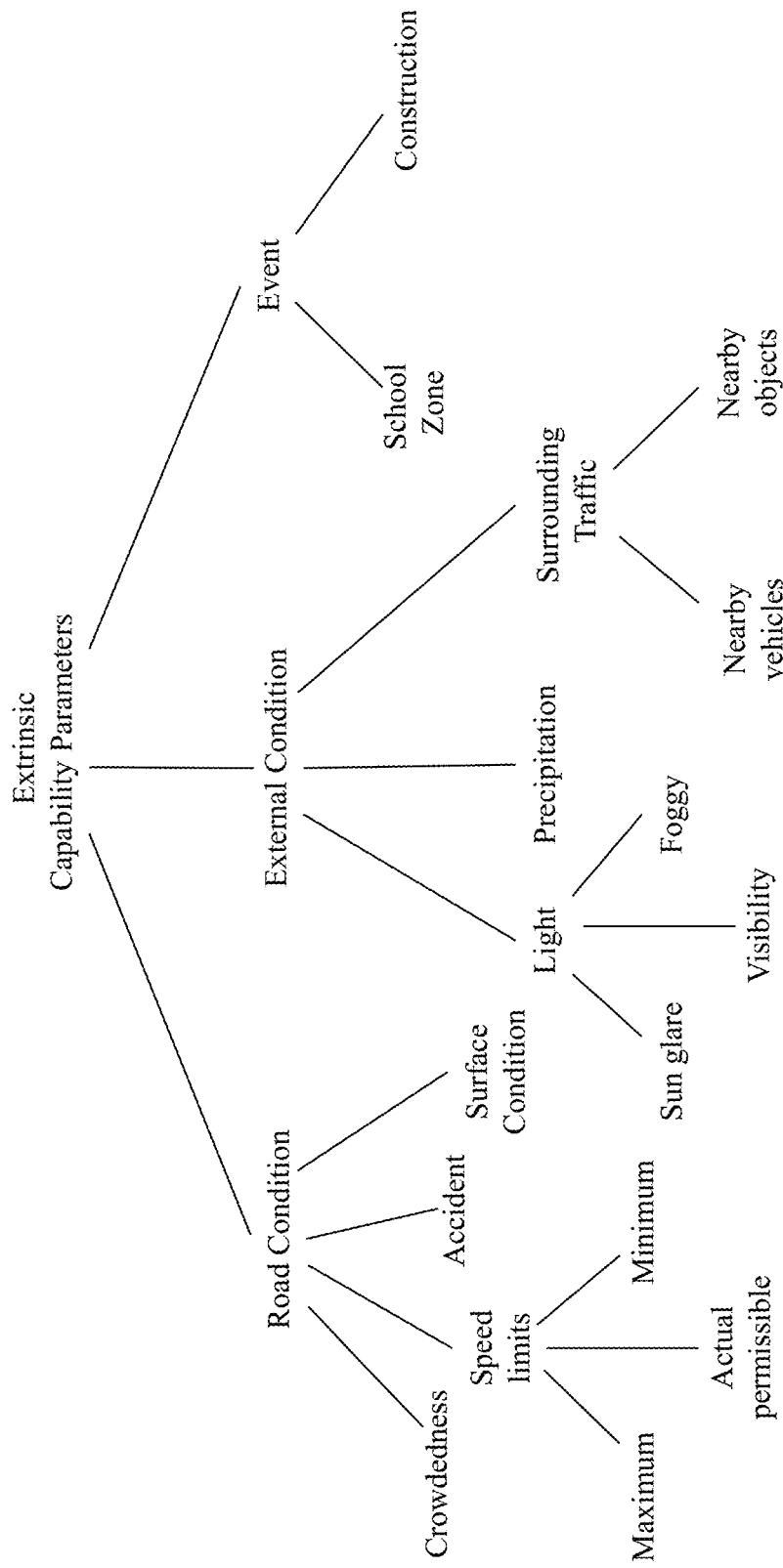
FIG. 6D illustrates exemplary types of extrinsic capability parameters, according to an embodiment of the present teaching.

FIG. 6D illustrates exemplary types of extrinsic capability parameters, according to an embodiment of the present teaching. As discussed above, extrinsic capability parameters specify information that are external to the vehicle but nevertheless may impact the ability of planning and such extrinsic capability parameters are used to determine appropriate planning given the conditions external to the vehicle. The ultimate output from the planning modules may be determined within the confine of both intrinsic and extrinsic capability parameters. As extrinsic capability parameters may include parameters describing the conditions or situations the vehicle is in or may encounter, they likely will impact what should be planned. For example, the surrounding situations related to the road(s), either close to the vehicle or even relatively remote from the vehicle. The road condition related parameters may indicate how crowded the road is (so that the driving speed cannot be planned to be fast), whether there are speed limits on the road (regulated minimum and maximum speeds as well as the actual permissible speed due to traffic), whether there is any accident along the road, or the surface condition of the road (so that the motion cannot be too swift), or whether the surface of the road presents certain conditions that will impede the ability of the vehicle in its planning.

There are other conditions external to the vehicle that may affect various planning activities. This includes the light or atmosphere related conditions as well as the surrounding of the vehicle. For instance, if the vehicle is positioned in such a way that there is a sun glare so that sensors may not work well, this will impact the planning decisions. If the vehicle is in an area with a heavy fog condition, such information is also important to the planning module. If there is a high level of precipitation, such information may also be taken into account by the planning modules. The surrounding traffic may also be important in terms of planning. For instance, extrinsic parameters may provide information related to nearby vehicles or objects so that the planning modules may consider such information in their respective planning. The extrinsic parameters may include information about such nearby vehicles/objects, e.g., the nearby vehicle is a big truck or a bicycle, which may also impact how the planning decision is made. In addition, events occur along the road the vehicle is on may also impact the planning. For instance, whether the vehicle is currently on a road that is in a school zone or whether there is a construction going on along the road the vehicle is currently on may also be important information to the planning modules for obvious reasons.

The extrinsic capability parameters may be acquired and updated continuously in time to support the planning modules to adapt their decisions based on external situations in real time. In some situations, the extrinsic capability parameters may also be predicted. For example, if the vehicle is driving on a road to the west in the afternoon, it may be predicted that there will be sun glare. Although such predicted extrinsic capability parameter may not be the real time information, it nevertheless will assist the planning module (e.g., the route planning module) to make an appropriate decision. For instance, if the intended destination for a vehicle is in the north west direction and there are roads available at the time to both the west and the north, knowing that there will be sun glare if heading to the west in late afternoon, the route planning module 550 may accordingly decide to presently take the road heading to the north first and later take a road to head to the west after sun is down to avoid sun glare (safer). Such predicted extrinsic capability parameters may be determined based on other information such as the current location of the vehicle and the intended destination of the vehicle.

Figure 7:
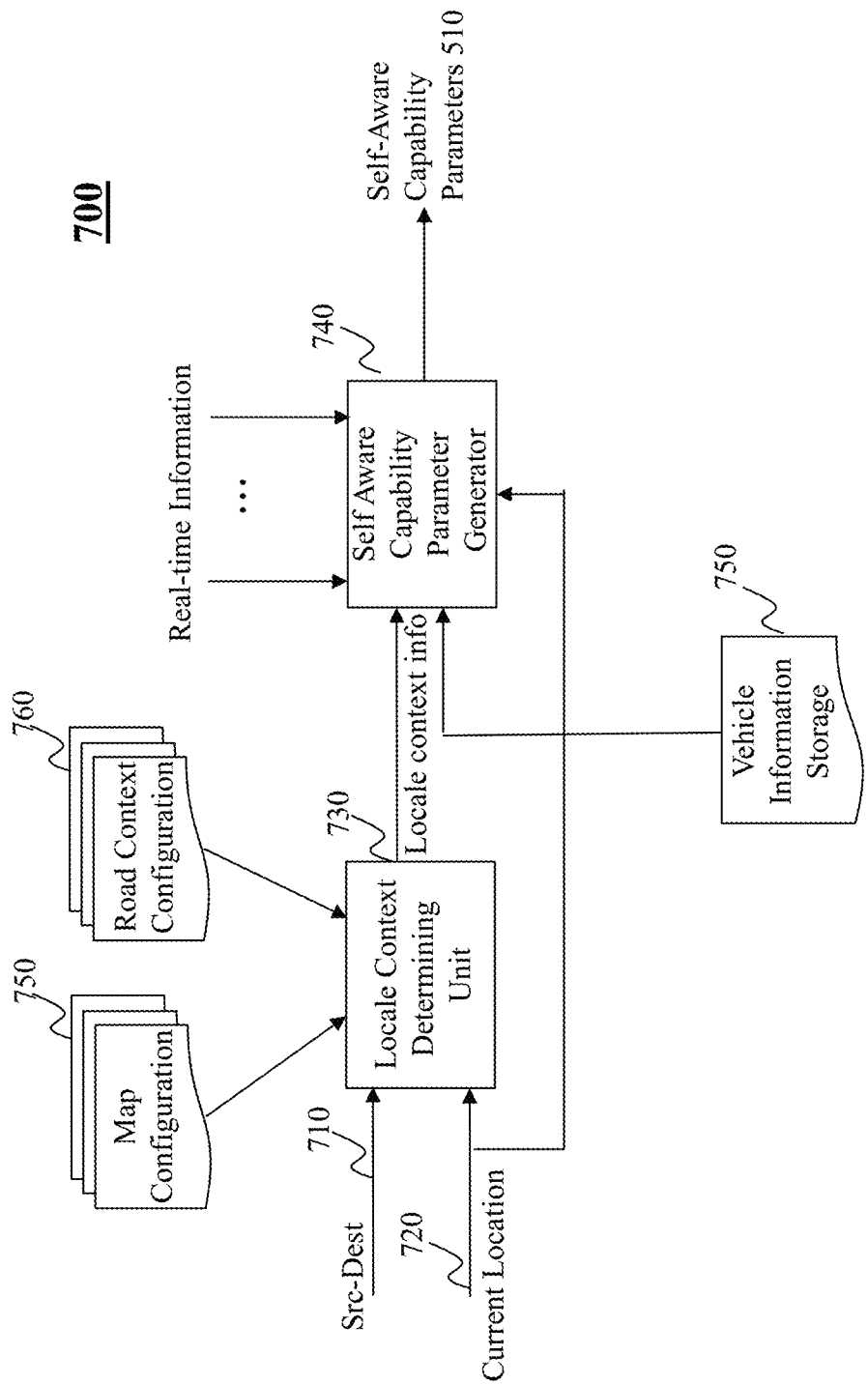
FIG. 7 depicts an exemplary high level system diagram of a mechanism for generating self-aware capability parameters to be considered for planning, according to an embodiment of the present teaching.

With capability parameters (including both intrinsic and extrinsic), the vehicle becomes self-aware of both intrinsic and extrinsic capability related limitations, which may be crucial in terms of planning. FIG. 7 depicts an exemplary high level system diagram for a mechanism 700 for generating self-aware capability parameters, according to an embodiment of the present teaching. In this illustrated embodiment, the mechanism 700 comprises a locale context determining unit 730 and a self-aware capability parameter generator 740. The locale context determining unit 730 is to gather information locale to where the vehicle is and/or will be (i.e., both where the vehicle is presently and where the vehicle will be on its way to the destination) based on, e.g., information about the current location of the vehicle and/or the destination the vehicle is heading to. The self-aware capability parameter generator 740 is to generate both intrinsic and extrinsic capability parameters, e.g., on a continuous basis, based on information related to the vehicle and the locale context information determined based on, e.g., the current and future location of the vehicle.

To facilitate the self-aware capability parameter generator 740 to generate extrinsic capability parameters, the locale context determining unit 730 may retrieve information stored in a map configuration 750 and a road context configuration 760 based on the current location 720 and the destination information 710. The locale context information related to the roads may include the surrounding or contextual information of the road the vehicle is currently on and/or the roads that the vehicle will be on subsequently. For example, the map configuration 750 may provide information about the roads from the current location to the intended destination, while the road context configuration 760 may provide some known or static information about the characteristics associated with roads, such as altitude, steepness, curviness of each road, etc. Such gathered static information about the roads may then be used by the self-aware capability parameter generator 740.

The road conditions may change over time. For example, roads may become icy or slippery due to changes in weather conditions. Such dynamically changing context information about the roads may be acquired separately by, e.g., the self-aware capability parameter generator 740 on a continuous basis and used in generating extrinsic capability parameters that are reflective of the real time situations. As will be discussed below in reference to FIG. 8 about the self-aware capability parameter generator 740, both the current location and the source-destination information may also be sent to the self-aware capability parameter generator 740 in order for it to gather real time information about road conditions to determine the extrinsic capability parameters.

To generate intrinsic vehicle capability information, information related to the vehicle may be accessed from a vehicle information storage 750. The vehicle information storage 750 may store vehicle parameters configured when the vehicle was manufactured such as whether the vehicle is equipped with cruise control or certain types of sensors. The storage 750 may also subsequently update information related to the parameters intrinsic to the vehicle. Such subsequent update may be generated due to, e.g., vehicle maintenance or repair or even update observed in real time. In discussion below in reference to FIG. 8, the self-aware capability parameter generator 740 includes also the mechanism to collect continuously any dynamic update of the vehicle related parameters consistent with the actual intrinsic capability of the vehicle.

Figure 8:
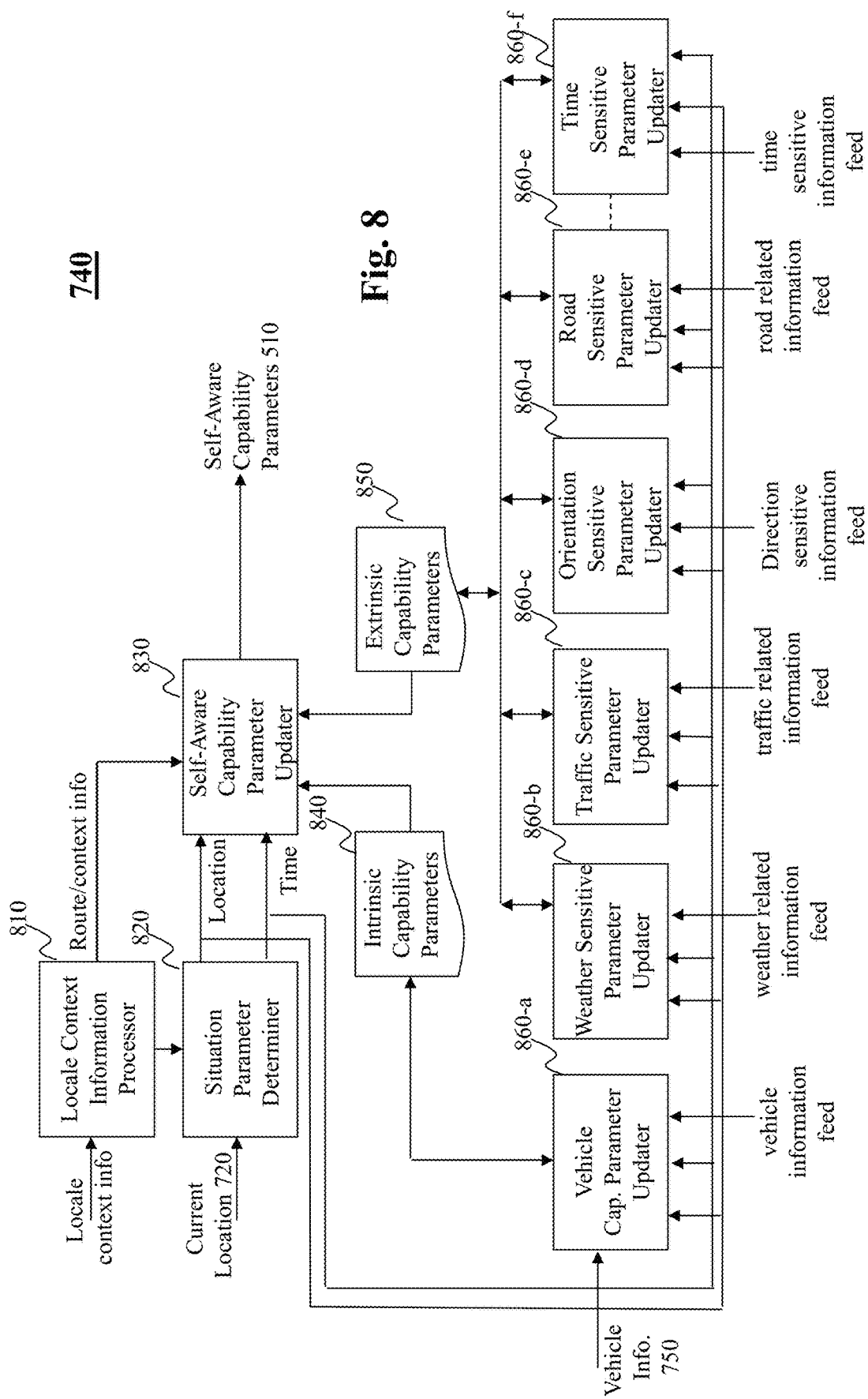
FIG. 8 depicts an exemplary high level system diagram of a self-aware capability parameter generator, according to an embodiment of the present teaching.

FIG. 8 depicts an exemplary high level system diagram of the self-aware capability parameter generator 740, according to an embodiment of the present teaching. In this illustrated embodiment, the self-aware capability parameter generator 740 comprises a locale context information processor 810, a situation parameter determiner 820, a self-aware capability parameter updater 830, and various updaters that continuously and dynamically gather information of different aspects related to decision making of the vehicle. Such dynamic information updaters include, e.g., vehicle capability parameter updater 860-*a*, weather sensitive parameter updater 860-*b*, traffic sensitive parameter updater 860-*c*, orientation sensitive parameter updater 860-*d*, road sensitive parameter updater 860-*e*, . . . , and time sensitive parameter updater 860-*f*.

In some embodiments of the operation, upon receiving the locale context information from the locale context determining unit 730, the locale context information processor 810 processes the received information and, e.g., extracts information related to the current route the vehicle is on and sends such information to the self-aware capability parameter updater 830. Such information related to the current route may include steepness or curviness of the route or other types of static information such as the altitude and orientation of the route. The situation parameter determiner 820 receives the current location 720 and, e.g., separates location and time information and sends the information to the self-aware capability parameter identifier 830 so that it may use that information to identify capability parameters specific to the location and the precise time.

With the information about the location of the vehicle and the current time, the self-aware capability parameter updater 830 may access intrinsic capability models 840 and/or extrinsic capability models 850 to retrieve capability related parameter values specific to the current location and time. In some embodiments, the intrinsic capability models 840 may be configured to specify types of parameters relevant to the intrinsic capabilities of the vehicle and the current values thereof. Similarly, the extrinsic capability models 850 may be configured to specify types of parameters that have an impact on the ability of the vehicle to operate and their current values.

In operation, in order to keep the values of the parameters current, the intrinsic and extrinsic capability models (840 and 850) may regularly trigger the updaters (860-*a*, . . . , 860-*f*) to gather real time information and update the values of the corresponding parameters based on such gathered real time information. For example, the intrinsic capability models 840 may be configured to have a mechanism to activate the vehicle capability parameter updater 860-*a* to gather updated information related to the intrinsic capabilities of the vehicle. Such a mechanism may specify different modes of triggering. For instance, it may be on a regular schedule, e.g., daily or hourly. It may also specify to be triggered by some external event such as a signal received from a maintenance shop or a sensor in the vehicle that senses that some functional state of a component in the vehicle has been changed. In this case, the vehicle capability parameter updater 860-*a* may accept real time vehicle information from the sensor(s) and update the values/states of the relevant capability parameter in the intrinsic capability models to reflect that real time status of the vehicle. For instance, if during the operation of the vehicle, the headlight or a break may become non-functional. Such information sensed in real time may be gathered by the vehicle capability parameter updater 860-*a* and used to update the information stored in the intrinsic capability parameter storage 840. Such updated information relates to the vehicle may then be used by the self-aware capability parameters generator 740 to generate intrinsic capability parameters.

Similarly, the extrinsic capability models 850 may be configured to specify the update mechanism(s) for updating different types of extrinsic capability parameters. The update mechanism may specify regularly scheduled update or update to be triggered by some events. Different types of extrinsic capability parameters may be configured to be updated based on different triggering mechanisms. For example, for weather related extrinsic capability parameters or extrinsic capability parameters that may be keyed on weather, e.g., visibility in the vicinity of the vehicle, the update may be made regularly, e.g., every few minutes. Similarly, traffic sensitive parameters, e.g., the actual permissible speed which is usually direct result of the traffic condition, may also be updated regularly. Different types of parameters, although all regularly updated, may have different update schedule, which may range from every few seconds to every few minutes or every few hours.

On the other hand, some extrinsic capability related parameters may be made upon the occurrence of some events. For instance, for an orientation sensitive parameter, e.g., whether sun glare exists, the update may be triggered when the vehicle is heading in certain directions. If the direction of the vehicle is heading changes from north to north-west at some afternoon time, this may trigger the orientation sensitive parameter updater 860-*d* to gather information related to sun glare and update the situation with regard to sun glare. In some situations, the update may indicate that there is no sub glare, e.g., when it is a cloudy day. In some situations, the update may indicate that there is sun glare. In either situation, such orientation sensitive information is then used to update the value of the corresponding extrinsic capability parameter stored in the extrinsic capability parameter storage 850. Similarly, update of time sensitive parameters, such as visibility of the vehicle due to time of the day, may be triggered based on detected location, time zone of the location, and the specific time of the day at the moment. In some embodiments, the update of some of the capability parameters may also be triggered by event related to the detected updates of other capability parameter values. For example, the update of road sensitive parameters such as slippery road condition may be triggered when the update for the weather condition indicates that it started to rain or snow.

In the illustrated embodiments, the vehicle capability parameter updater 860-*a* receives the static vehicle information from storage 750 and dynamic vehicle information update from real time vehicle information feed which may be from multiple sources. Examples of such sources include dealers, vehicle maintenance places, sensors on the vehicle reporting the status change of components, or other sources. The weather sensitive parameter updater 860-*b* may receive both dynamic weather update and the updates of other weather sensitive capability parameters, e.g., precipitation, visibility, fog, or any other parameters that relate to weather and have the potential to impact the operation of the vehicle. Weather related information may be from multiple data sources that feed real time data.

The traffic sensitive parameter updater 860-*c* may receive both dynamic traffic reports and other information relating to the traffic that may influence the operation of the vehicle. Examples include the extent of the traffic jam (which may be used to determine whether the route of the vehicle needs to be re-planned) or the time of the accident that had caused the traffic (to estimate how long the delay will continue in order to determine whether to re-do the route planning). Traffic or traffic related information may be received from one or more sources for real time data feed. The orientation sensitive parameter updater 860-*d* may be configured to gather information along the road in the direction of the vehicle. Such orientation sensitive information may include sun glare in certain directions (e.g., east or west) or any potential situations in the direction of the road the vehicle is on (e.g., landslide situation ahead of the road). Similarly, the road sensitive parameter updater 860-*e* may, once triggered, gather information about various roads or road conditions with respect to the location of the vehicle, from one or more real time information feed sources. Such information may be related to the roads (e.g., open, close, detoured, school zone, etc.) or conditions thereof (e.g., slippery, icy, flooded, construction, etc.). The time sensitive parameter updater 860-*f* may be configured to collect from data source(s) real time data that depend on time. For example, the visibility of the road may depend on the time of day at the zone the vehicle is in.

The collected real time data may then be used to update the intrinsic capability models 840 and/or the extrinsic capability models 850. Such updated data may be time stamped. The self-aware capability parameter updater 830 may then access both the intrinsic and extrinsic capability models 840 and 850 to determine relevant capability parameters and the updated values thereof. The retrieved intrinsic/extrinsic capability parameters may then be output so that they can be used by various planning modules as shown in FIG. 5. Specifically such generated self-aware capability parameters 510 are used by the route planning module 550 for route planning, as will be discussed with reference to FIGS. 10-13. The self-aware capability parameters are also used by the motion planning module 560 for personalized motion planning, which will be disclosed in detail with reference to FIGS. 14-19. The self-aware capability parameters are also used by the lane planning module 570 for lane control, which will be detailed with reference to FIGS. 20-22.

Figure 9:
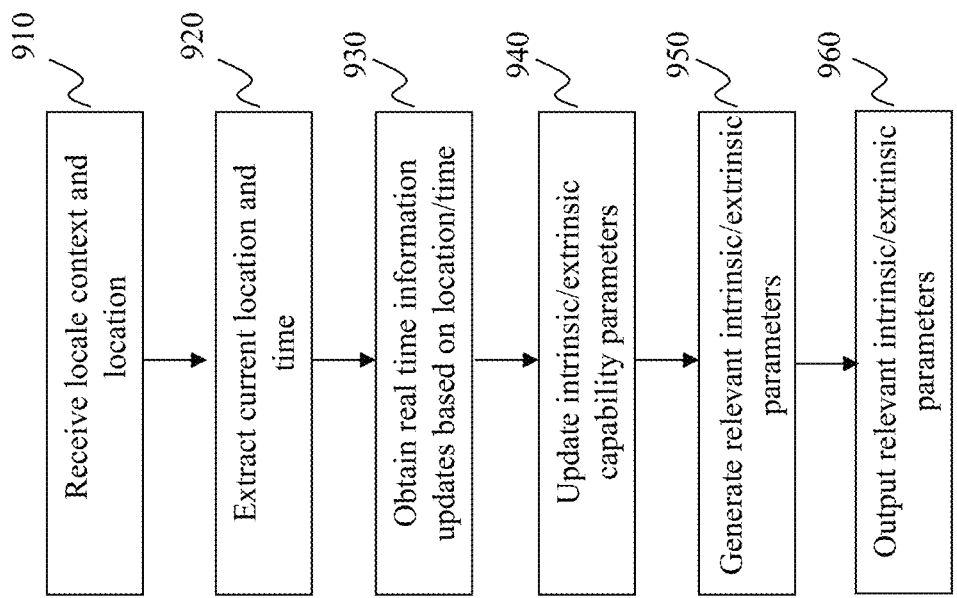
FIG. 9 is a flowchart of an exemplary process for generating self-aware capability parameters, according to an embodiment of the present teaching.

FIG. 9 is a flowchart of an exemplary process of the self-aware capability parameter generator 740, according to an embodiment of the present teaching. First, the locale context information is received at 910 and location and time information are extracted at 920 and used at 930 by different updaters to obtain information feeds from different sources related to various aspects of intrinsic and extrinsic capabilities. Such acquired information is then used by different updaters at 940 to update the intrinsic capability parameters 840 and extrinsic capability parameters 850. Based on the current location, time, and the received locale contextual information, the self-aware capability parameter updater 830 then identifies various intrinsic and extrinsic capability parameters 510 relevant to the vehicle at the present time to update, at 940, the intrinsic/extrinsic capability parameters and generates, at 950, the updated capability parameters. Such updated intrinsic/extrinsic capability parameters 510 are then output at 960.

Such dynamically gathered self-aware capability parameters are to be used in various vehicle behavior planning operations, including route planning, motion planning, and lane related vehicle behavior planning. For example, in human driving, choosing a route to a destination is often done with consideration of factors captured by the self-aware capability parameters. For example, a human driver may choose a route to a desired destination based on, e.g., what the vehicle is equipped with or capable of (intrinsic capability parameters). If the vehicle is in such a condition that it cannot handle steep road well, then such road needs to be avoided. In addition, a human driver may also consider other factors such as weather of the day, conditions of the roads considered, events known or scheduled at certain time of day (extrinsic capability parameters). For instance, it one road points to the west and the sun will be setting at that time, perhaps there will be too much glare so that it is better to take another alternative road. For both safety and reliability, autonomous vehicles ought to also consider such intrinsic and extrinsic capabilities with respect to route choices during route planning.

Traditional approaches to route planning often adopt some cost function so that the cost of a route selected is minimized. For instance, conventional route planning considers, e.g., optimization of distance traveled, minimization of time required to arrive the destination, or minimize the fuel used to get to the destination. In some instances, conventional approaches may also consider traffic conditions in optimizing the cost, e.g., high traffic route may decrease the speed leading to increased time and fuel to get to the destination. Such optimization functions often assume that all vehicles can handle all routes in the same manner and all routes can be handled equally well. Such assumptions are often not true so that when autonomous vehicles apply such planning schemes, they often find unable to proceed or even become unsafe in some situations. The present teaching aims to achieve safe, realistic, and reliable route planning that is adaptive to the changing intrinsic and extrinsic capability related parameters.

Figure 10:
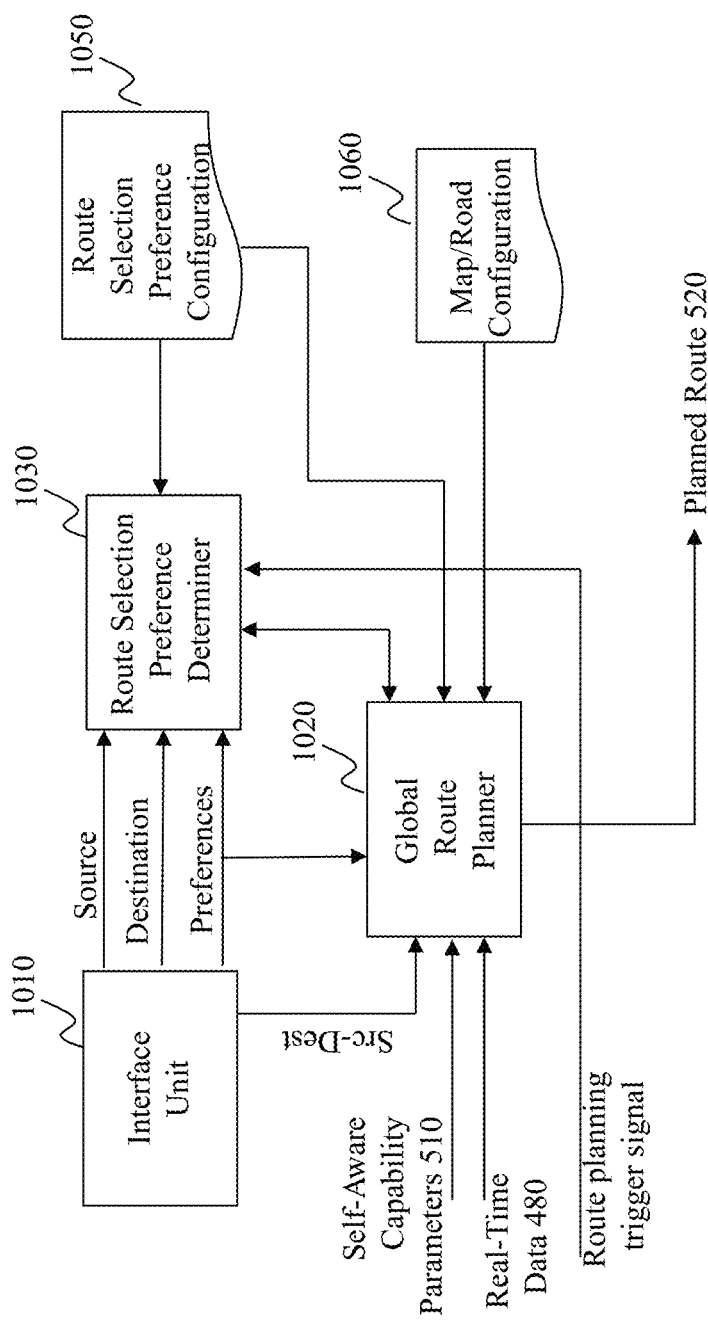
FIG. 10 depicts an exemplary high level system diagram of a route planning module, according to an embodiment of the present teaching.

As shown in FIG. 5, the self-aware capability parameters 510 are considered by the planning module 450 in achieving different planning tasks, including the route planning module 550, the motion planning module 560, and the lane planning module 570. Below, in reference to FIGS. 10-13, details about the route planning module 550 are provided. FIG. 10 depicts an exemplary high level system diagram of the route planning module 550, according to an embodiment of the present teaching. The purpose of the route planning module 550 is to plan a route based on desired destination in a self-aware manner in terms of both intrinsic and extrinsic capabilities. In contrast, conventional route planning technologies consider mainly criteria such as shortest distance, shortest time, most use of highways/local ways, etc. without taking into account the dynamic intrinsic capability parameters and the real time extrinsic capability parameters.

In this illustrated embodiment, the route planning module 550 comprises a route selection preference determiner 1030 and a global route planner 1020. The route selection preference determiner 1030 is to determine the preferences to be considered in selecting a route. The global route planner 1020 is to select an appropriate route based on a variety of information, including the self-aware capability parameters 150. In some embodiments, the route planning activities may be triggered based on the route planning trigger signal as shown. Upon being activated, the global route planner 1020 may gather various types of dynamic information relevant to the present route planning operation. For example, the global route planner 1020 may rely on information related to the source/current location and the destination desired. The planning is performed with respect to the source/current location and the destination. The destination information may be determined in different ways. For example, it may optionally be received from a driver/passenger via an interface unit 1010.

The global route planner 1020 may also take real time data 480 as input and plans a route accordingly. As discussed with respect to FIG. 4B, real-time data include information related to real time vehicle related information (position), information about passenger observed in the vehicle, . . . , and road characteristics. Such real-time data provide surrounding information needed for the route planning. The global route planner 1020 also receives the self-aware capability parameters 510 that inform the planner what is possible given the dynamic intrinsic and extrinsic situations at the time of the planning. For instance, intrinsic capability parameters may indicate that the vehicle is currently not able to run fast due to some mechanical problems so that the global route planner 1020 may take that into account to, e.g., plan a route that involves mainly local roads and may possibly pass some car repair shops. Similarly, extrinsic capability parameters may indicate that in the north direction of the current location of the vehicle, the sun glare is quite severe so that the global route planner may base that information to avoid a nearby route that is in the north direction before the sun is set. The real-time data 480 and the self-aware capability parameters 510 provide information to the global route planner 1020 to enable it to plan a route that is appropriate given, e.g., the present time, the present location of the vehicle, the present weather, the present passenger's situation, and present road conditions.

The global route planner 1020 may also consider preference(s) to be applied in route planning. Such preferences may be specified by a driver/passenger via the user interface unit 1010 (which may be forwarded to the global route planner 1020) or may be obtained via other means (see disclosure below with reference to FIG. 12). In considering the preferences to be applied, information stored in route selection preference configuration 1050 may also be accessed and considered. Such route selection preference configuration may specify some general preference in route selection in different scenarios, e.g., avoid steep/curvy roads in raining/snow scenarios, avoid small streets at night, avoid roads with very few gas stations, etc. The global route planner 1020 may forward relevant information received from real-time data 480 and self-aware capability parameters 510 to the route selection preference determiner 1030, which is in turn used by the route selection determiner 1030 to retrieve certain route selection preference configuration from 1050. For example, if it is currently snowing (from real-time data 480) and the vehicle has no snow tire (from the intrinsic capability parameter 510), such dynamic information may be forwarded from the global route planner 1020 to the route selection preference determiner 1030 so that selection preference configuration related to such dynamic scenarios may be retrieved from the route selection preference configuration 1050 (e.g., avoid steep/curvy road) and sends back to the global route planner 1020 so that it can be relied on in selecting an appropriate route.

To determine an appropriate route, in addition to knowing the selection preferences, the global route planner 1020 may also need to know additional information about the roads, such as what routes available from the current location of the vehicle to the intended destination. In addition, for each route available, the map/road configuration 1060 may also store characteristic information about each of the available roads/routes. Such characteristic information of the roads/routes may include, but not limited to, geometric characteristics such as nature of the roads/routes (highway or not), dimension of the roads/routes, steepness/curviness, condition of the roads/routes, etc. During planning, the global route planner 1020 may first determine the roads/routes available between the current location of the vehicle to the desired destination. To select an appropriate route to the destination, for such available roads/routes, their characteristic information may also be accessed by the global route planner 1020 so that selections may be made based on such characteristic information.

With the information about the available roads/routes available as well as the characteristic information about those available roads/routes, the global route planner 1020 may then select an appropriate route to the destination by matching the route selection preferences, determined by the route selection preference determiner 1030, with the characteristic information of the available roads/routes. Details about the global route planner 1020 are provided with reference to FIGS. 12-13.

As discussed previously, the global route planner 1020 selects a planned route based on dynamic information from different sources, including real-time data 480 and self-aware capability parameters 510. In addition to that, as the vehicle may be on move or the destination may change over time, the current location of the vehicle and the destination may also change in time, just like the real-time data 480 and the self-aware capability parameters 510. When such information changes, it may impact the global route planned. For example, when the current location changes, the real-time data associated with the current location may also change, e.g., from good weather associated with the previous spot to the raining condition associated with the current location. This may in turn lead to a change in terms of route selection preferences and ultimately, the route selected. Thus, the global route planner 1020 may interact with the route selection preference determiner 1030 in a bi-directional manner and dynamic manner. Whenever there is a change that may warrant a re-determination of route selection preferences, the global route planner 1020 may then activate the route selection preference determiner 1030 to modify or re-generate the preferences to be used by the global route planner 1020 to determine an appropriate route given the situation.

Figure 11:
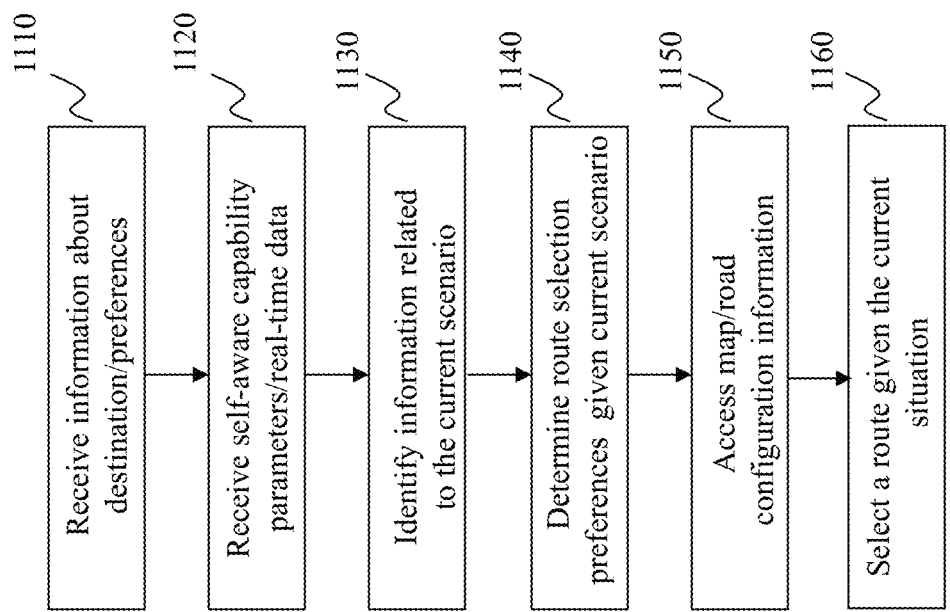
FIG. 11 is a flowchart of an exemplary process for route planning, according to an embodiment of the present teaching.

FIG. 11 is a flowchart of an exemplary process for the route planning module 550, according to an embodiment of the present teaching. Information about the destination of the vehicle and optionally about the preferences is received at 1110. Real-time data 480 as well as self-aware capability parameters 510 are received by the global route planner 1020 at 1120 and various information related to the current scenario or situation of the vehicle may then be identified, at 1130, from the received real-time data and the self-aware capability parameters. Based on the relevant information related to the current scenario, preferences specific to the current scenario are determined, at 1140. To plan a route, the global route planner 1020 accesses, at 1150, information about available roads/routes with respect to the current location and the desired destination as well as the characteristic information of such available roads/routes. At 1160, based on the specific preferences determined based on the current scenario as well as the roads/routes information, the global route planner 1020 selects a route appropriate for the current situation.

Figure 12:
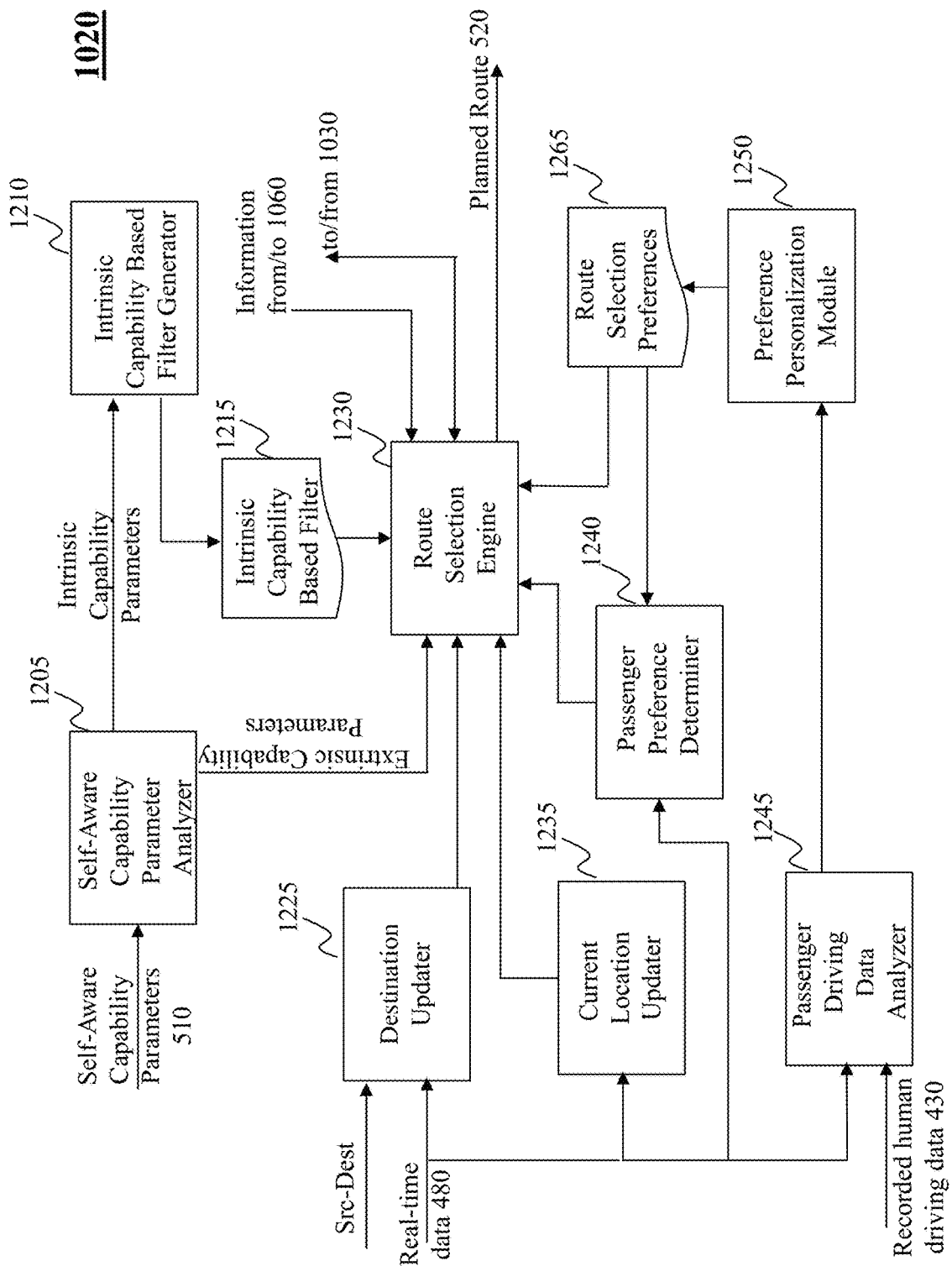
FIG. 12 depicts an exemplary high level system diagram of a global route planner, according to an embodiment of the present teaching.

FIG. 12 depicts an exemplary high level system diagram of the global route planner 1020, according to an embodiment of the present teaching. In this illustrated embodiment, the global route planner 1020 comprises a self-aware capability parameter analyzer 1205, an intrinsic capability based filter generator 1210, and a route selection engine 1230. Optionally, the global route planner 1020 also comprises a destination updater 1225 for dynamically determine and update the current destination. In the illustrated embodiment, the global route planner 1020 also optionally include a mechanism for personalizing preferences of a driver/passenger so that the route in selecting a route. The route selection preference determiner 1030 is to determine the preferences related to selecting a route based on the specific situation the vehicle is currently in, which differs from obtaining personalized preferences directed to a specific driver/passenger.

Illustratively, the optional mechanism to determine personalized preferences comprises a passenger driving data analyzer 1245, a preference personalization module 1250, and a passenger preference determiner 1240. In operation, the passenger driving data analyzer 1245 receives recorded human driving data 430 as input and analyzes or learns from such data to understand route preferences relevant to specific drivers/passengers. For example, from the recorded human driving data 430, it may be learned that a specific driver prefers to drive on local roads instead of highway or historically chose to use highways at nights even though it involved much longer distance. It may also learn preferences of all drivers associated with the vehicle. For instance, multiple people (husband, wife, and a child of a household) may be associated with the vehicle, i.e., anyone of these people may operate the vehicle. The passenger driving data analyzer 1245 may learn from the recorded human driving data 430 various types of information associated with the driving behavior of such drivers, which may enable the preference personalization module 1250, upon receiving such driving behavior information, to establish personal preferences of each of such individuals.

Upon receiving the information related to each individual driver from the passenger driving data analyzer 1245, the preference personalization module 1250 may then generate personalized preferences in terms of route choices. Such route related preferences may reflect not only route choices but also represent preferences of route choices in different situations such as specific time frames of a day, seasons, locations, etc. Such established preferences for each individual driver may then be stored in storage 1265. At the time of route planning, the passenger preference determiner 1240 receives the real-time data 480 and based on various types of information in the real-time data 480 (e.g., month/day/time, passenger information, locale weather, etc.), the passenger preference determiner 1240 may access, from the route selection preference storage 1265, relevant preferences that can be applied in current route planning. For example, if the real-time data indicate that the driver is a specific person and the time is currently 7:45 pm in January, etc., the passenger preference determiner 1240 may identify personalized route preferences in 1265 related to the current specific driver which are associated with the specific time frame and season of the year (e.g., a driver may prefer driving on highway in winter season). The personalized route selection preferences so identified may then be sent to the route selection engine 1230 so that personalized preferences of the driver/passenger at the time of the route planning can be considered in determining what route is to be selected.

As shown in FIG. 12, the route selection engine 1230 may also take the preferences estimated by the route selection preference determiner 1030 as input and use that in its route selection operation. In some embodiments, the route selection engine 1230 may rely on the preferences from 1030 without considering the personalized preferences of a driver, i.e., it may rely on merely the preferences identified by the route selection preference determiner 1030 in its route selection.

In selecting route appropriate for the current situation, the route selection engine 1230 may also receiving self-aware capability parameters 510. In the illustrated embodiment, the self-aware capability parameter analyzer 1205 separates extrinsic capability parameters and intrinsic capability parameters and sends the extrinsic capability parameters to the route selection engine 1230 so that extrinsic conditions associated with the current situation the vehicle is in can be considered in selecting a route. For example, the extrinsic capability parameters may indicate that there is on-going construction on Route 7, the route selection engine 1230 may consider that and avoid Route 7. However, if the destination is currently set for a school on Route 7 and the driver's habit is to pick up children from the school each day at the present time (e.g., 3:30 pm), the route selection engine 1230 may elect to choose Route 7, given all things considered.

Similarly, intrinsic capability parameters may also be considered in selecting an appropriate route. In this illustrated embodiment, the intrinsic capability parameters are fed to the intrinsic capability based filter generator 1210, which may create different filters 1215 based on the intrinsic capability parameters so that such filters may be utilized by the route selection engine to filter out routes that are not appropriate given the intrinsic capability parameters. For example, if the intrinsic capability parameters indicate that the vehicle has no snow tire, any routes that are steep and/or curvy may not be appropriate on a snowy day.

The route selection engine 1230 selects a route based on both the current location of the vehicle, tracked by a current location updater 1235, and a destination, tracked by a destination updater 1225. Depending on the situation, changed current location and destination may trigger the route selection engine 1230 to activate the route selection preference determiner 1030 to re-evaluate the preferences in route selection given the changed circumstance.

Figure 13:
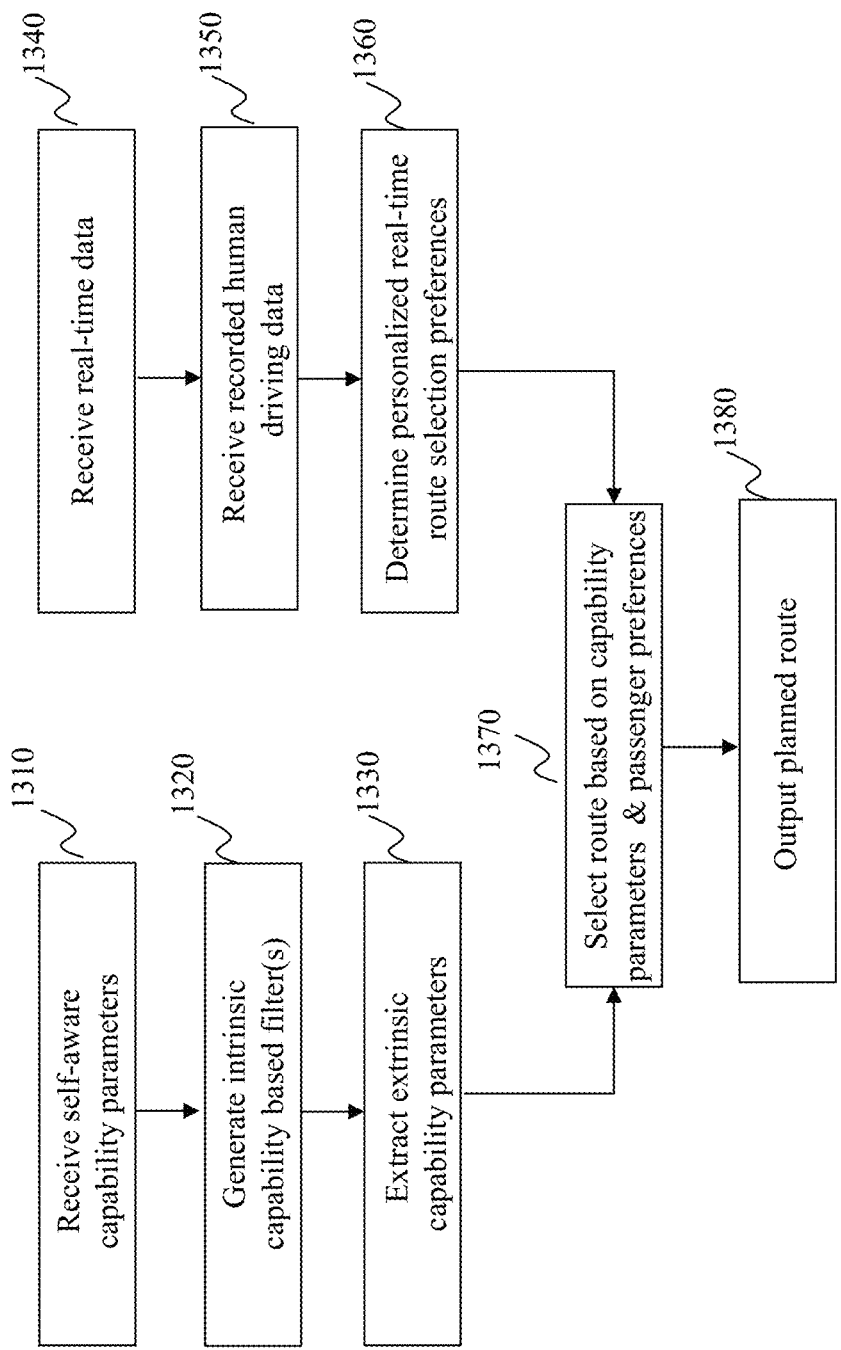
FIG. 13 is a flowchart of an exemplary process for a global route planner, according to an embodiment of the present teaching.

FIG. 13 is a flowchart of an exemplary process for the global route planner 1020, according to an embodiment of the present teaching. At 1310, self-aware capability parameters are received. Intrinsic capability parameters are used to generate, at 1320, intrinsic capability based filter(s) so that certain routes can be filtered out as inappropriate given the intrinsic conditions of the vehicle. Extrinsic capability parameters are extracted, at 1330, from the received self-aware capability parameters. At the same time, real-time data 480 are continuously received at 1340 and recorded human driving data are received at 1350. Such data are then used to determine, at 1360, personalized route selection preferences relevant to the current driver, current situation, and current time. At 1370, self-aware capability parameters and/or the personalized preferences of the driver may then be used to select a route appropriate given all factors considered. At 1380, the selected route is output.

The route planning according to the present teaching allows various types of information, such as real-time data and self-aware capability parameters, to be taken into account in route planning so that the planned routes are adaptive with respect to the vehicle condition at the time (via intrinsic capability parameters), the dynamic environment the vehicle is in at the time (via real-time data as well as extrinsic capability parameters), the passenger characteristics determined based on, e.g., dynamically updated real-time data (see FIG. 4B), as well as passenger personalized preferences. Similarly, such information may also be utilized in other types of planning operations so that the planned vehicle activities are adapt to the real-time situation, personalized based on individual preferences, and allows the vehicle to behave more human driver like. Below, more details are provided, with respect to FIGS. 14-19 on personalized adaptive motion planning.

Human drivers control their vehicle motion in a manner that is comfortable. In most situations, human drivers also pay attention to the feedback or reaction of passengers who ride with them in the vehicle and respond to the vehicle motion. For example, some human drivers may prefer start and stop the vehicle smoothly. Some human drivers who usually start and stop the vehicle fairly abruptly may adjust their driving when they observe that passengers sitting in their vehicle respond in a certain way. Such human behavior may play an important role in autonomous vehicles. It is commonly recognized that driving behavior changes from person to person and how such behavior is to be adjusted in the presence of others in the same vehicle may also differ from person to person.

Traditionally, autonomous vehicles may adopt planning models that are trained to capture the characteristics of human driving behavior of the general population. Such generalized models do not customize the planning approach based on individual driver/passenger preferences or intents. The present teaching aims to provide personalized motion planning based on knowledge of the driver/passenger as well as the dynamic observations of driver/passenger response to vehicle motions.

Figure 14A:
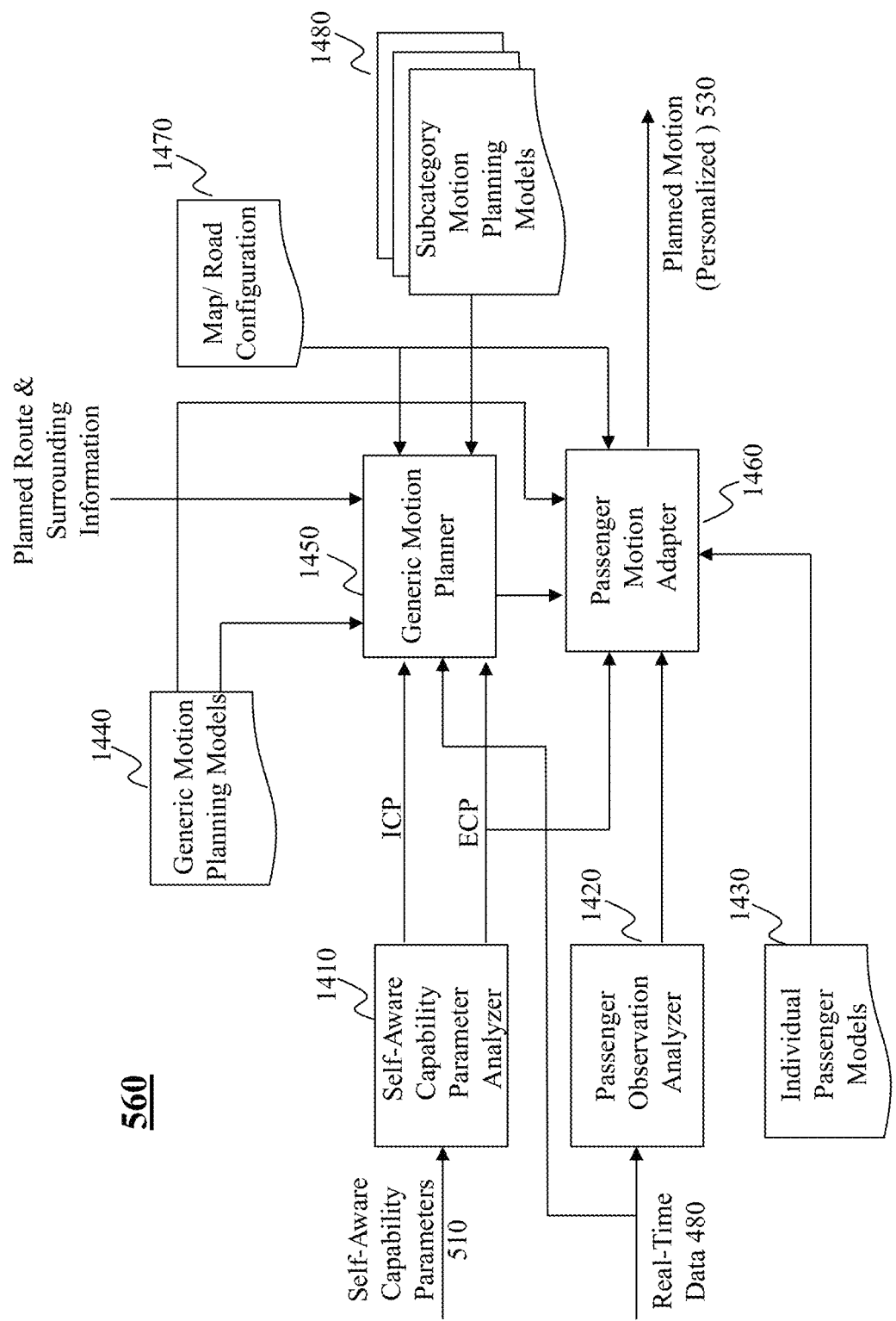
FIG. 14A depicts an exemplary high level system diagram of a motion planning module, according to an embodiment of the present teaching.

FIG. 14A depicts an exemplary high level system diagram of the motion planning module 560, according to an embodiment of the present teaching. In this illustrated embodiment, the motion planning module 560 aims at personalized, human-like, and adaptive motion planning, i.e., motions of the vehicle are planned in accordance with, e.g., general and personal likings, which may include what is known to be the preferences of a passenger and what is the reaction or feedback of a of a passenger of the current motion of the vehicle. The motion planning module 560 according to the present teaching may comprise a generic motion planner 1450 and a passenger motion adapter 1460. The motion planning module 560 may plan vehicle motion based on various considerations, including real-time situations the vehicle is in (e.g., on a curvy road, raining day, dim lighting, etc.), vehicle conditions (via intrinsic capability parameters), and personal preferences of the passenger in the vehicle (known preferences or dynamically determined based on driver feedback observed). Given those considerations, vehicle motion may be planned based on motion planning models, which may be invoked in a manner suitable for different scenarios. Motion planning models may include different models appropriate for the given situation in hand.

Figure 14B:
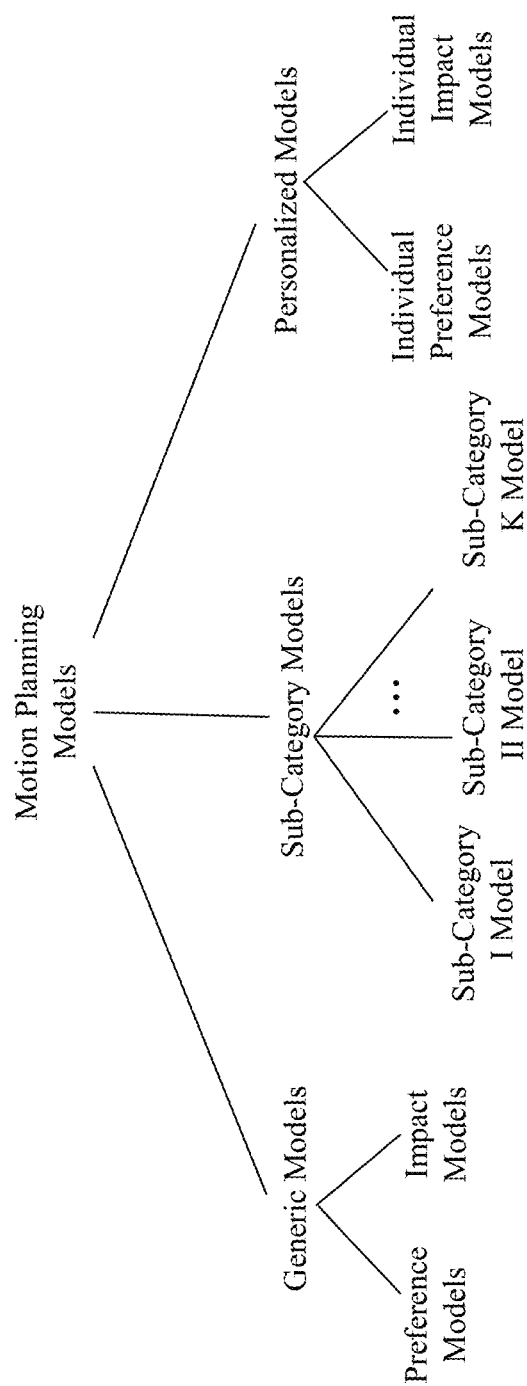
FIG. 14B illustrates exemplary types of passenger models, according to an embodiment of the present teaching.

FIG. 14B illustrates exemplary types of motion planning models, according to an embodiment of the present teaching. In the illustrated embodiment, motion planning models may include generic motion planning models (1450 in FIG. 14A), sub-category models (1480 in FIG. 14A), or personalized models (1430 in FIG. 14A). The generic motion planner 1450 may be preference based models or impact based models (see FIG. 14B). A preference based model may be provided specifying preferred vehicle motion in different scenarios based on general knowledge about vehicle operation. For instance, when roads are slippery or icy, it is preferred to plan motions that are slower without sharp turns. An impact based model may specify which kind of motion may cause what type of impact and such specification may be used to guide motion planning to achieve or avoid certain impact.

A sub-category model for motion planning may be, as compared with the generic models, directed to a sub-category of vehicles or a sub-category of drivers/passengers. For example, a sub-category model may be directed to sports cars and another sub-category model may be provided for vans. In addition, a sub-category model may be directed to teenager drivers and another sub-category model may be directed to senior citizens. Each sub-category model is tuned or specialized so that the motion planning for a matching sub-category can be performed more accurately. According to the present teaching, motion planning models may also include personalized models which may include individual models, each of which may specify preferences of each individual in terms of vehicle motions. For example, a passenger's individual preference model may specify that the passenger prefers smooth vehicle motion and another passenger's individual preference model may specify some different preferences. Such generic, sub-category and individual models for motion planning may be derived based on recorded human driving data so that the motion planned based on such models are more human-like.

With reference back to FIG. 14A, in operation, to achieve personalized, human-like, and adaptive motion planning, the motion planning module 560 receives various types of information and utilizes different motion planning models. The received information includes planned route 520 from the route planning module, surround information 420, real-time data 480, and self-aware capability parameters 510. Based on the real-time data 480 and the self-aware capability parameters 510, the generic motion planner 1450 determines the situation the vehicle is in (e.g., raining, dark, etc.) and accordingly invokes appropriate generic motion planning models in 1440 to retrieve general motion planning information. In some embodiment, the generic motion planner 1450 may also determine relevant sub-category of the vehicle and/or passenger so that associated sub-category motion planning models may be retrieved from 1480 and utilized for motion planning. The generic motion planning models 1440 may specify general motion planning strategies, e.g., if it is a snowy day or the vehicle is on a curvy road, it is preferred to make the vehicle motion slower and steady. Each sub-category model may be provided to specify the generic motion planning strategies for the sub-category (e.g., a type of cars such as sports car or a sub-group of passengers such as senior citizens).

The motion planned by the generic motion planner 1450 (based on generic motion planning models and/or sub-category motion planning models) may be further adjusted or adapted according to personalized preferences. In the illustrated embodiment, this is achieved by the passenger motion adapter 1460. There may be different ways to adapt the motion planned to meet personalized preferences. In some embodiments, personalized preferences may be accessed from individual passenger models 1430. If the identity of the passenger is known, the associated individual passenger model for the passenger may be retrieved from 1430 and the specified preferences in vehicle motion may be used to determine how to achieve personalized motion planning. For instance, an individual model for a particular passenger may indicate that the passenger prefers a smooth ride without taking risks.

Another way to achieve personalized motion planning is adaptively adjusting motion planning based on dynamically observed information. As discussed previously with reference to FIG. 4B, real-time data 480 includes information related to passenger characteristics, which can be passenger condition, . . . , and/or passenger reaction cues. Passenger condition may refer to mental, physical, and functional state of the passenger. Information to be used in personalized motion planning may also include other types of data collected related to the situation. A passenger observation analyzer 1420 may collect various types of information and extract relevant indications and then send such indications to the passenger motion adapter 1460 so that such dynamic and personalized information can be taken into account in motion planning. Details about the passenger observation analyzer 1420 are provided with reference to FIGS. 15-16.

Figure 14C:
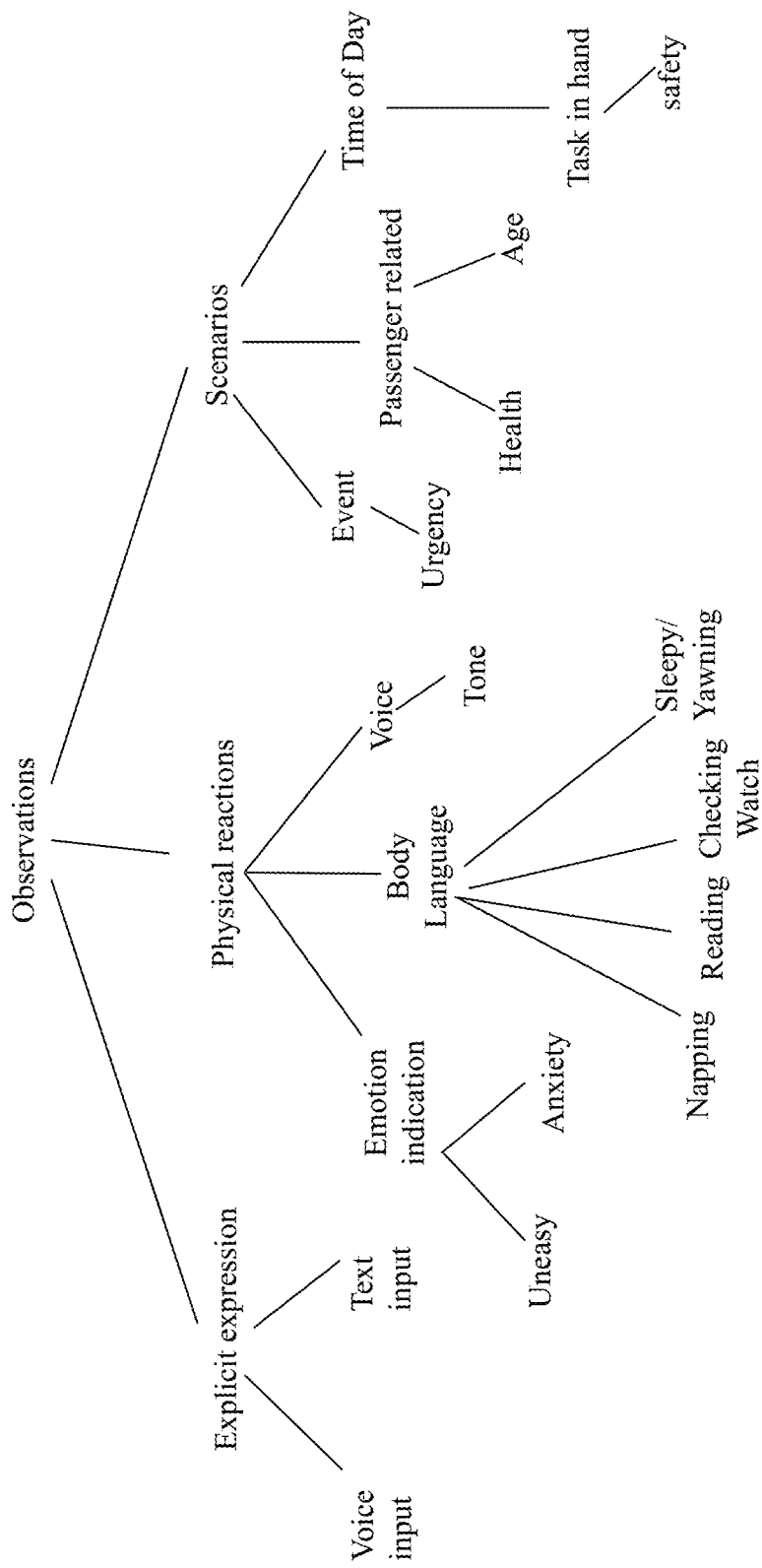
FIG. 14C illustrates exemplary types of user reactions to be observed for motion planning, according to an embodiment of the present teaching.

FIG. 14C illustrates exemplary types of observations collected for consideration in motion planning, according to an embodiment of the present teaching. Observations may include explicit expression from, e.g., the passenger such as voice or text input which may explicitly indicate what the passenger desires. For instance, the passenger may shout "faster!" or "I am going to be late!" or "I really get there on time." Such explicit expression detected may be relied on in motion planning. The observations may also include detected scenarios that may indicate something in terms of motion planning. Scenario information may include event involved (which may indicate the urgency of the passenger is faced with), the current state of the passenger (such as age, known health conditions, etc.), time of day which may imply certain task the passenger has at that time (e.g., pick up children from school) which requires certain safety level. Observations may also include observed physical reactions of the passenger which may be considered as relevant for motion planning. For instance, sensors inside the vehicle may capture any data that may indicate the emotion of the passenger, the body language of the passenger, or the tone in passenger's voice, all of which may reflect the desire of the passenger in response to the current vehicle motion. For instance, the passenger may appear to be uneasy or even show anxiety, which may indicate that the vehicle motion is too rough for the passenger. A sharp tone in passenger's voice may indicate the same. Certain physical behavior may also suggest certain reaction from the passenger to the vehicle motion. For example, if the passenger is napping, yawning, looking sleepy, or reading, it may indicate that the passenger is comfortable with the vehicle motion. On the other hand, if it is observed that the passenger keeps checking watch, it may indicate that the passenger feels the vehicle is moving too slow.

According to the present teaching, in addition to personalized motion planning (e.g., not only with respect to sub-categories but also with respect to individuals), motion planning may also be adaptive to the current situation characterized by, e.g., self-aware capability parameters and real-time situations such as weather, road conditions, etc. The passenger motion adapter 1460 receives the extrinsic capability parameters from 1410 and plans motion accordingly. For example, if extrinsic capability parameters indicate that there is sun glare or foggy, motion may be planned accordingly (e.g., slow down).

Figure 15:
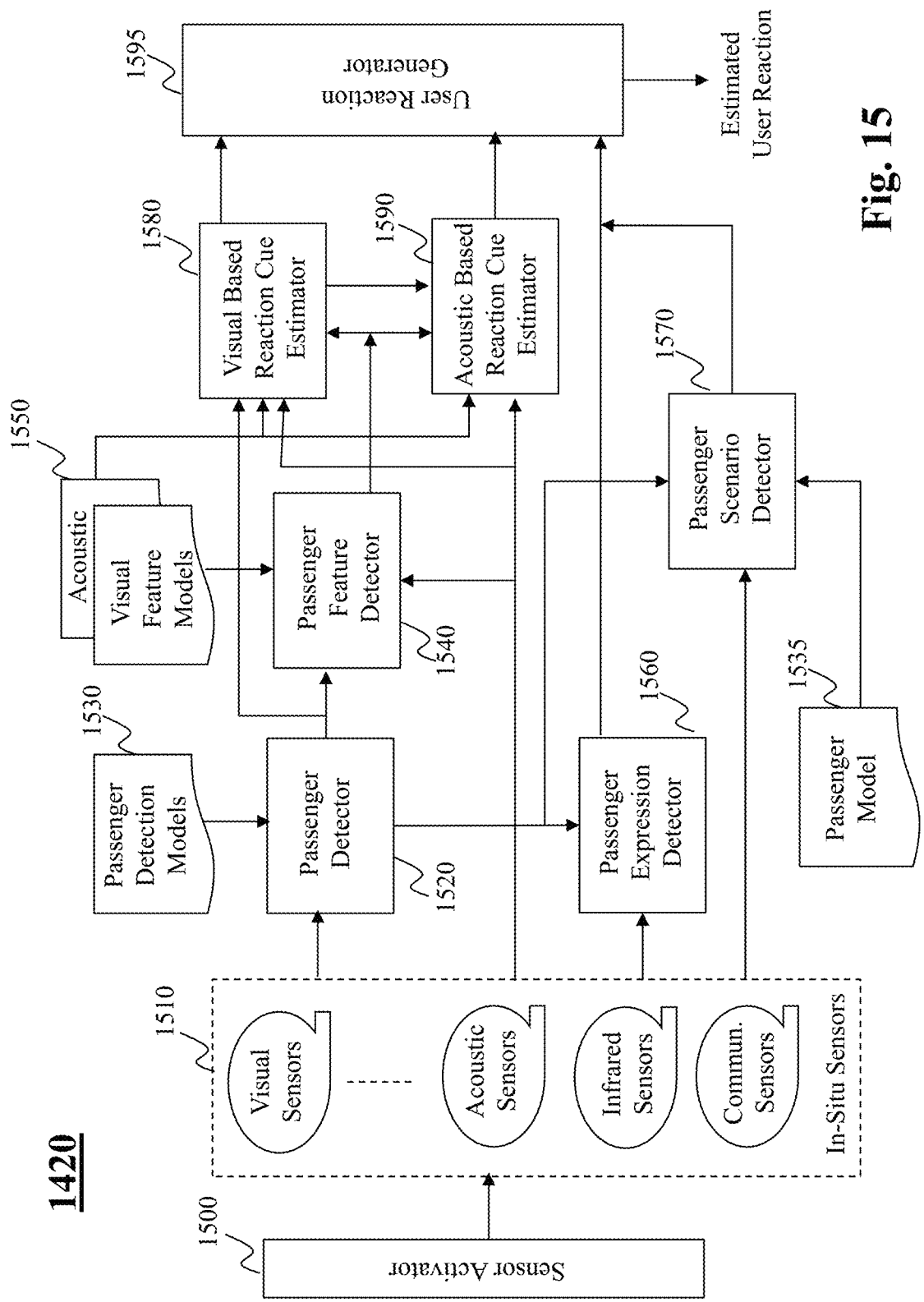
FIG. 15 depicts an exemplary high level system diagram of a passenger observation analyzer, according to an embodiment of the present teaching.

FIG. 15 depicts an exemplary high level system diagram of the passenger observation analyzer 1420, according to an embodiment of the present teaching. In this illustrated embodiment, the passenger observation analyzer 1420 is provided for obtaining the dynamic preferences of the passenger in terms of vehicle motion so that the motion planning can be adapted to the personal likings. The dynamic preferences of the passenger are derived based on analysis of the passenger's reaction cues to the current vehicle motion, observed via different sensors. The exemplary passenger observation analyzer 1420 comprises a sensor activator 1500, a plurality of in-situ sensors 1510, a passenger detector 1520, a passenger feature detector 1540, a visual-based reaction cue estimator 1580, an acoustic-based reaction cue estimator 1590, a passenger expression detector 1560, a passenger scenario detector 1570, and a user reaction generator 1595.

The passenger observation analyzer 1420 is provided to determine the reaction or feedback of the passenger to the current vehicle motion to determine whether the vehicle motion needs to be adjusted. For example, if passenger reaction indicates that the passenger is not happy about the current vehicle motion, an adjustment may be made in motion planning accordingly. The passenger reaction is to be estimated based on different cues, including visual, acoustic, text, or contextual scenarios.

In some embodiments, the sensor activator 1500 activates the in-situ sensors 1510 to detect the passenger reaction. The in-situ sensors 1510 comprise a plurality of sensors including visual sensors, acoustic sensors, infrared sensors, . . . , or communication sensors and the like that enable the detection of any expression of the passenger. For instance, the visual sensors included in the in-situ sensors 1510 may comprise a plurality of spatially distributed (within the vehicle) camera devices that are capable of capturing, processing and fusing images of a scene from a variety of viewpoints into some form more useful individual images/videos. For example, the visual sensors may capture a gesture or facial expression of the passenger, which may be used to estimate the reaction of the passenger. The in-situ sensors may be selectively activated. For instance, at night, in order to observe accurately the passenger's reaction, visual sensor may not work well and in this situation, infrared sensors may be activated instead.

As depicted in FIG. 14C, various physical reactions may be observed and used to analyze passenger's reaction cues. The passenger detector 1520 receives sensor data and detects the passenger based on, passenger detection models 1530. The detection may be based on either visual or acoustic information. Thus, the passenger detection models 1530 may include both visual and acoustic models associated with the passenger and can be either individually invoked to detect the passenger based on a single modal data or both invoked to detect the passenger based on both visual and acoustic features. For instance, the passenger detection models 1530 may include a face recognition model which can be used to detect the passenger based on video or pictorial data from one or more visual sensors. The passenger detection models 1530 may also include a speaker based passenger detection model by which the passenger may be recognized based on his/her voice.

Upon the detection of the passenger, the sensor data may be continuously fed to the passenger feature detector 1540 to detect various passenger behavior features, which may include both visual and acoustic. For instance, certain body language may be detected that may reveal that the passenger is doing certain things, such as sleeping (napping), reading, yawning, or frequently checking his/her watch. Such detected passenger features may also include acoustic features. For instance, the passenger feature detector 1540 may detect that the passenger is saying "slow down." Visual and acoustic cues may be simultaneously detected that reveal consistent reaction cues. For example, the passenger may constantly check the watch and say "faster!"

The passenger features may be detected based on visual and acoustic feature detection models 1550. Such models may guide the passenger feature detector 1540 in terms of what feature to detect and provide, for each feature to be detected, a corresponding model that can be used to detect the feature. Those models may be personalized in the sense that what is to be detected may depend on the passenger. For instance, if the passenger is known to be mute, there is no reason to detect acoustic features associated with the passenger. Those feature detection models may be adaptive so that once they are trained and deployed on the vehicle, they may be configured to receive scheduled or dynamic update so that the models are adaptive to the changing situations.

The detected passenger visual features are then sent to the visual-based reaction cue estimator 1580, which may then estimate the passenger's reaction cues based on such visual cues. For example, if it is detected that the passenger is checking on the watch, the visual based reaction estimator 1580 may the reaction cue may be that the passenger is not happy with the speed of the vehicle and becomes impatient. Such an estimated cue may also be derived based on, e.g., a personalized visual feature model in 1550, which may be used to determine whether such a behavior (checking watch) is indicative of certain reaction cue associated with this particular passenger (may or may not be depending on the person).

Similarly, the detected passenger acoustic features are sent to the acoustic based reaction cue estimator 1590, which may then estimate the passenger's reaction cue based on such acoustic features. For example, if it is detected that the passenger is snoring, the acoustic based reaction cue estimator 1590 may estimate that the passenger is comfortable with or at least not unhappy with the current vehicle motion. Such an estimated cue may also be derived based on, e.g., a personalized acoustic feature model in 1550, which may be used to determine whether such a behavior is indicative of certain reaction cue of this particular passenger.

To estimate the reaction of the passenger, the visual based and acoustic based reaction cue estimators 1580 and 1590 may be engaged in estimating the emotional state of the passenger. For example, from the body language observed from the passenger (e.g., restless or seems to be vomiting), it may indicate that the passenger feels uneasy which may be a cue of his/her reaction to the vehicle motion. In addition, the tone of the voice used when the passenger says "faster" or "slow down" may also be used to estimate a level of anxiety of the passenger which is a clue as to how unhappy the passenger is. Such estimated emotional state may be used in evaluating the severity of the reaction that the passenger exhibits in response to the current vehicle motion and may be used to guide whether and/or how to adjust the motion planning.

In addition to the observed physical features, other parameters may also be used to estimate whether the current vehicle motion is acceptable. For instance, the source of observation may be an input directly entered by the passenger via some communication interface (e.g., a touch screen display) within the vehicle. The passenger may input via the display interface in the vehicle that he/she wants the vehicle motion to be smoother. This may be detected by the passenger expression detector 1560 via different communication sensors, which could be textual or acoustic.

As discussed previously, the scenarios that the passenger is currently in may also influence how the motion should be planned. The passenger scenario detector 1570 is configured to detect any scenario parameters that may be relevant to motion planning. For instance, if it is known that each afternoon between 3:30 pm and 4:30 pm (time of day), the vehicle is used to pick up children from school (task in hand), this may place a restriction on motion planning. That is, the motion planned may need to be based on safety. Once detected, such a restriction may be configured to trump the estimated desire (of the passenger) to be faster in order to ensure safety of the children. Other scenario related factors may also be observed, e.g., the health and age of the passenger. If it is observed (from a passenger model 1535) that the passenger is an elderly and suffers from dementia, such scenario parameters may be used to void some detected desire of the passenger. For instance, if the current vehicle motion is already pretty fast and the passenger keeps demanding to be even faster, given the age and known health condition of the passenger, the motion planning module may use such information to make an appropriate motion planning decision.

The various passenger reaction cues, detected by the visual/acoustic based reaction cue estimators 1580 and 1590, the passenger expression detector 1560, and the passenger scenario detector 1570, are then send to the user reaction generator 1595, where the detected different parameters are selected and integrated to generate estimated user reaction and sent to the passenger motion adapter 1460 so that the motion planned by the generic motion planner 1450 may be adapted in accordance with the observed dynamic user reaction to the current vehicle motion.

Figure 16:
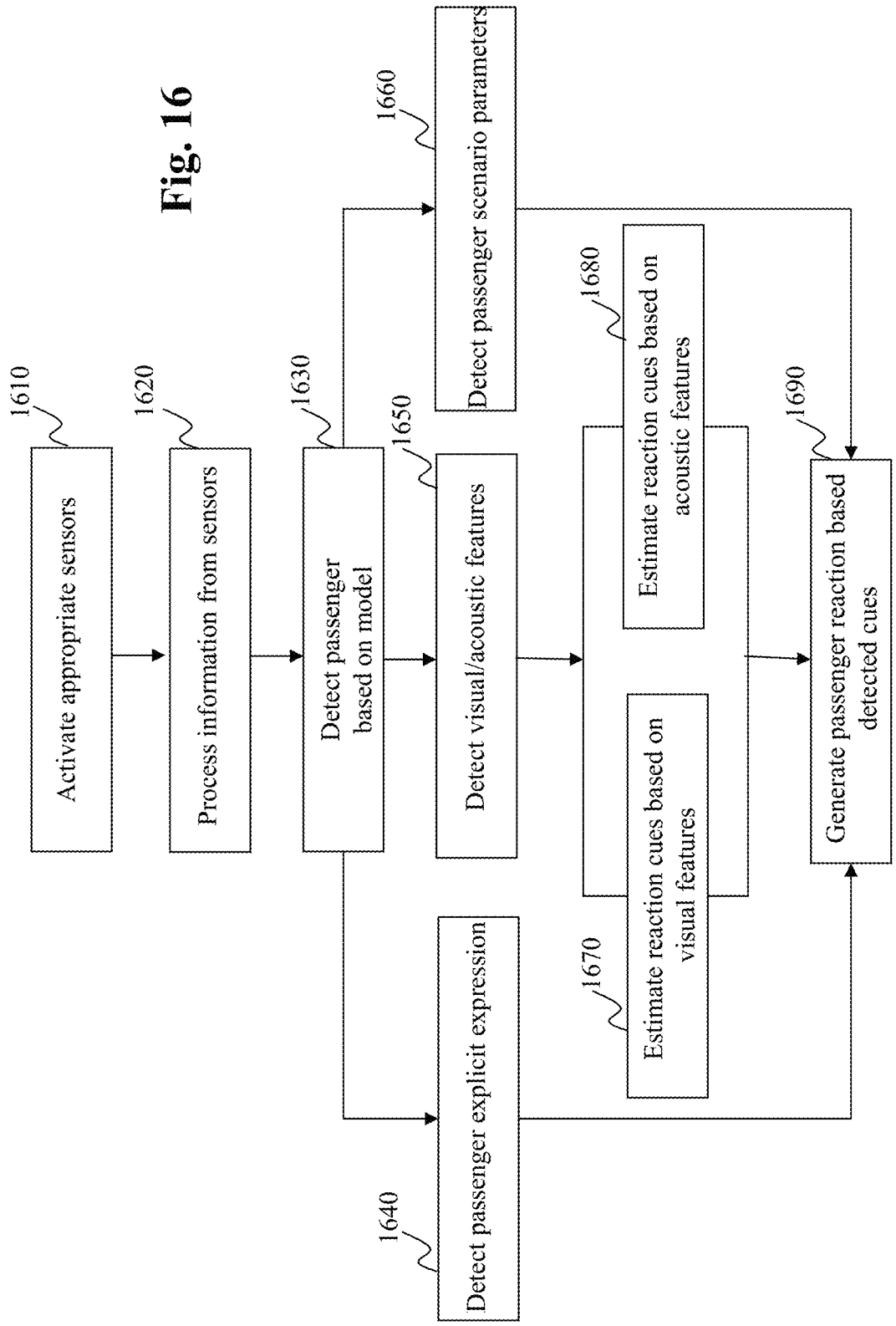
FIG. 16 is a flowchart of an exemplary process of a passenger observation analyzer, according to an embodiment of the present teaching.

FIG. 16 is a flowchart of an exemplary process for the passenger observation analyzer 1420, according to an embodiment of the present teaching. To gather observations associated with the passenger, appropriate sensors are activated at 1610. Information from activated sensors is processed at 1620. To ascertain the physical behavior of the passenger, the passenger is detected, at 1630, based on passenger detection models 1530. Once the identity of the passenger is ascertained, different types of features associated with the passenger may be obtained. At 1640, any explicit expression from the passenger is detected. The scenario parameters associated with the passenger are detected at 1660. Such gathered explicit expression from and scenario parameters related to the passengers are then sent to the user reaction generator 1595.

Visual/acoustic features of the passenger are detected at 1650 and are used to estimate, at 1670 and 1680 respectively, the visual and acoustic reaction cues, which are then sent also to the passenger reaction generator 1595. Different types of information so collected (from 1640, 1660, 1670, and 1680) are then all used by the passenger reaction generator 1595 to generate, at 1690, the estimated user reaction.

Going back to FIG. 14, the estimated user reaction output by the passenger observation analyzer 1420 is sent to the passenger motion adapter 1460 so that the real-time passenger reaction to the current vehicle motion may be considered in determining how to adapt the planned motion based on the dynamic feedback from the passenger.

Figure 17:
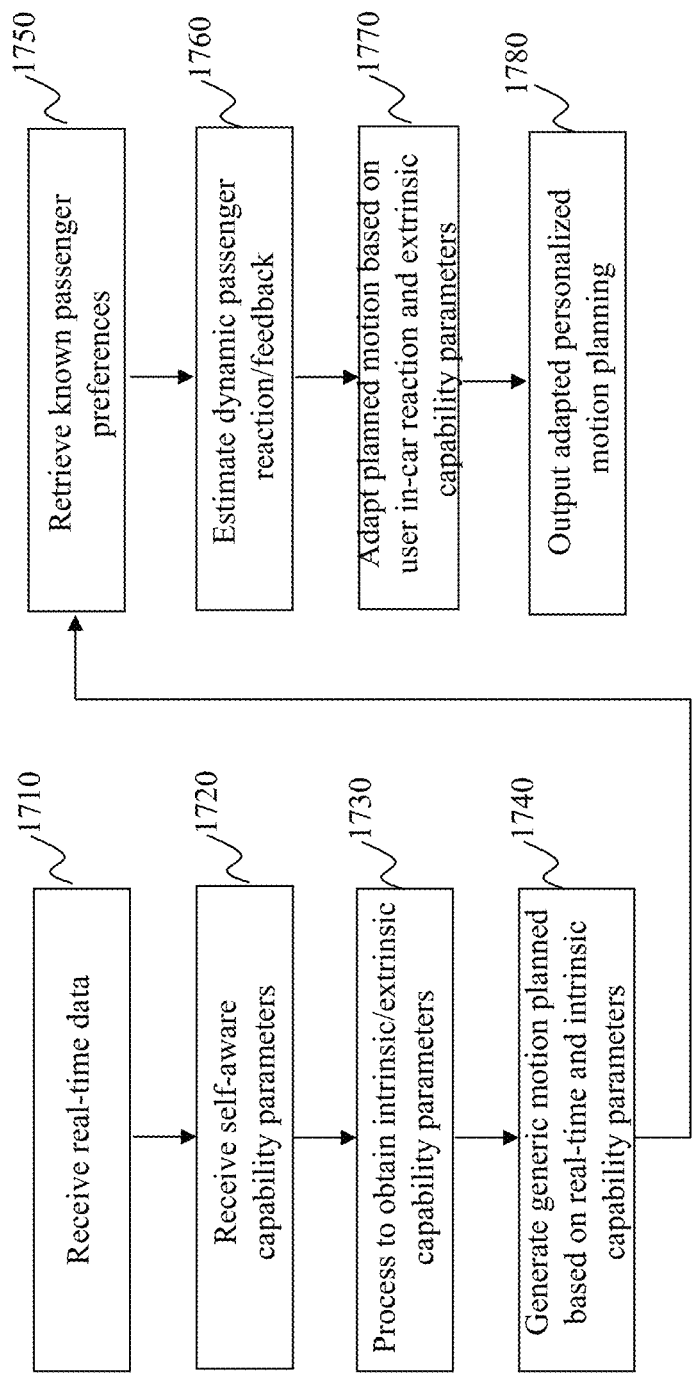
FIG. 17 is a flowchart of an exemplary process for a motion planning module, according to an embodiment of the present teaching.

FIG. 17 is a flowchart of an exemplary process for the motion planning module 560, according to an embodiment of the present teaching. At 1710 and 1720, real-time data 480 and the self-aware capability parameters are received, respectively. The self-aware capability parameters are processed, at 1730, and split into intrinsic and extrinsic capability parameters. Based on real time data and the intrinsic capability parameters, the generic motion planner 1450 generates, at 1740, planned motion for the vehicle. Such planned motion is generated based on generic motion planning models 1440 as well as any applicable sub-category motion planning models 1480.

To personalize the motion planning, the generically planned motion may then be adapted based on personalized information, which may include both known personal preferences and dynamically observed passenger reaction to the current vehicle motion. To achieve that, know passenger preferences are identified, at 1750, based on the individual passenger models 1430. In addition, dynamic passenger reaction/feedback is estimated, at 1760, based on information gathered from different sources/sensors. The personal preferences, either already known or estimated dynamically, are then used to personalize the motion planned, e.g., by adapting, at 1770, the motion planned based on generic information. Such personalized planned motion is then output, at 1780, as the planned motion 530.

As discussed with respect to FIG. 14A, various models are used in motion planning, some being generic, some being semi-generic (sub-category models are semi-generic), and some being personalized. In addition to being personalized and adaptive, the motion planning scheme as disclosed herein also aims at behaving in a manner that is more human-like. Being adaptive to the dynamic reaction of the passenger may be part of it. In some embodiments, the models used by the motion planning module 560 may also be generated to capture human-like behavior so that when they are applied in motion planning, the planned motion 530 will be more human-like.

Figure 18:
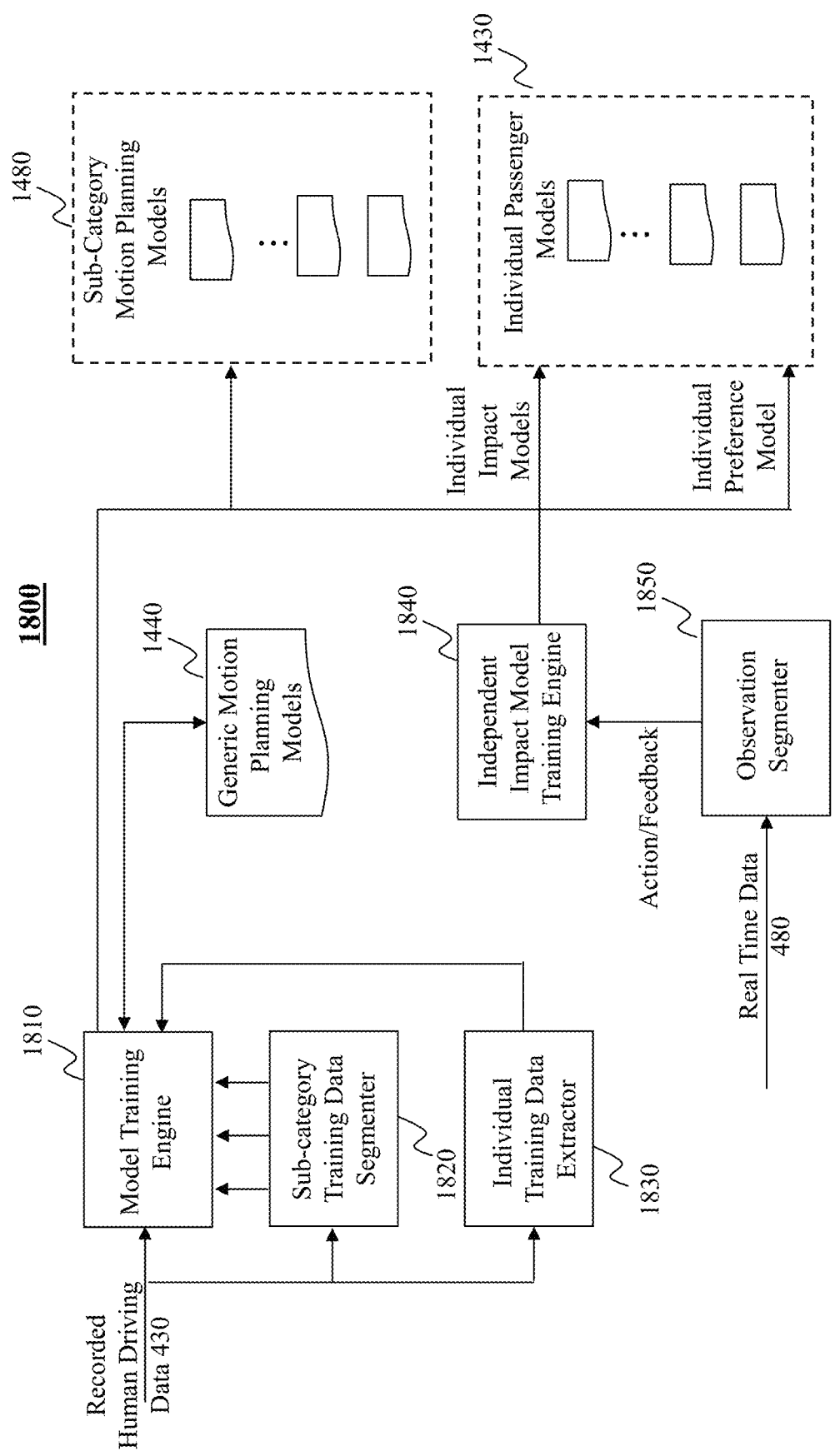
FIG. 18 depicts an exemplary high level system diagram of a model training mechanism for generating different models for motion planning, according to an embodiment of the present teaching.

FIG. 18 depicts an exemplary high level system diagram of a motion planning model training mechanism 1800 for generating those models, according to an embodiment of the present teaching. In this illustrated embodiment, the motion planning model training mechanism (MPMTM) 1800 comprises data pre-process portion and a model training portion. The data pre-processing portion comprises a sub-category training data classifier 1820, an individual training data extractor 1830, and an observation segmenter 1850. The model training portion comprises a model training engine 1810 and an independent impact model training engine 1840, and an independent impact model training engine 1840.

Recorded human driving data 430 are utilized to train models so that the models can capture characteristics related to motion planning that are more human-like. To train the generic motion planning models 1440, the received recorded human driving data are sent to the model training engine 1810 and the trained models are saved as the generic motion planning models 1440. To obtain sub-category motion planning models 1480, the recorded human driving data 430 are classified by the sub-category training data segmenter 1820 into training data sets for the sub-categories and then fed to the model training engine 1810 for training. For each sub-category model, appropriate sub-category training data set is applied to derive the corresponding sub-category model and such trained sub-category models are then saved in 1480. Similarly, for obtaining individual passenger models 1430 for motion planning, recorded human driving data may be processed to generate different training sets by the individual training data extractor 1830, each for an individual, and used by the model training engine 1810 to derive individual passenger models that characterize the preferences of the corresponding individuals.

Figure 19:
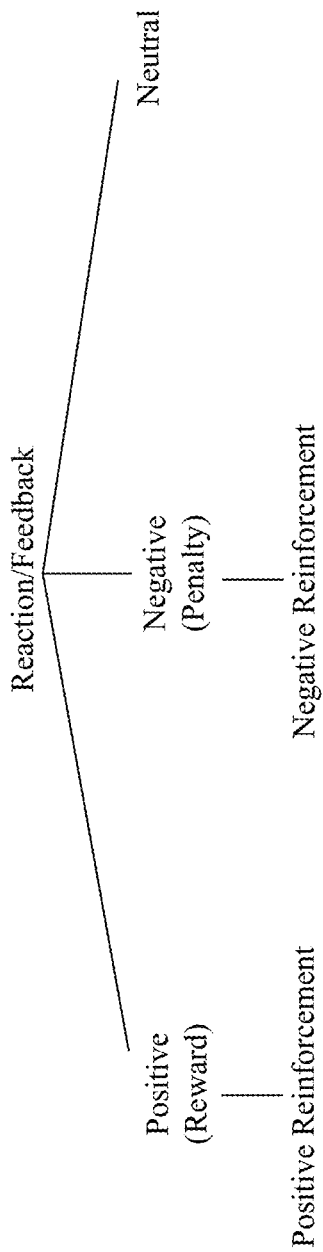
FIG. 19 illustrates different types of reactions to be observed and their roles in model training, according to an embodiment of the present teaching.

In addition to the individual preferences, the individual passenger models 1430 may also include models that characterize impact of vehicle motions on individual passengers observed from the reaction or feedback of passengers. The observed reaction/feedback may be positive or negative and can be used to influence how the motion should be planned in the future for passengers. FIG. 19 illustrates different types of reactions observed and their roles in model training, according to an embodiment of the present teaching. For example, passenger reaction/feedback that can be used to train impact based models may include negative or position impact. Negative reaction (negative reinforcement) of a passenger to certain planned motion may be captured in a model so that similar motion may be avoided in the future as to this particular passenger. Similarly, positive reaction to a planned motion or positive reinforcement observed may also be captured in the model for future motion planning. Some reaction may be neutral which may also be captured by the individual passenger models.

To obtain impact based models for individuals, the real-time data 480, which capture the passenger characteristics in terms of their behavioral, visual, acoustic cues as well as their conditions (including mental, physical and functional states during vehicle movement), may be segmented based on individuals and such segmented data may then be used to derive models that characterize how certain motions impact passengers. In some embodiments, the mechanism 1800 includes an observation classifier 1850 that segments the real-time data 480 according to individual passengers and fed such segmented training data sets to the independent impact model training engine 1840 to derive individual impact models. Such derived individual impact models are then stored as part of the individual passenger models 1430.

Figure 20A:
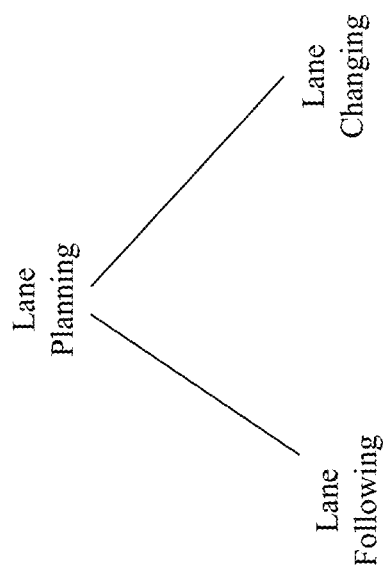
FIG. 20A illustrates exemplary types of lane related planning, according to an embodiment of the present teaching.

Referring back to FIG. 5, the planning module 440 also includes lane planning module 570, which may be directed to lane following and lane changing as illustrated in FIG. 20A. Lane following may refer to the behavior to stay in the lane while the vehicle is moving. Lane changing may refer to the behavior to move from one lane the vehicle is currently in to an adjacent lane while the vehicle is moving. Lane planning may refer to the planning of vehicle behavior in terms of either lane following or lane changing.

Figure 20B:
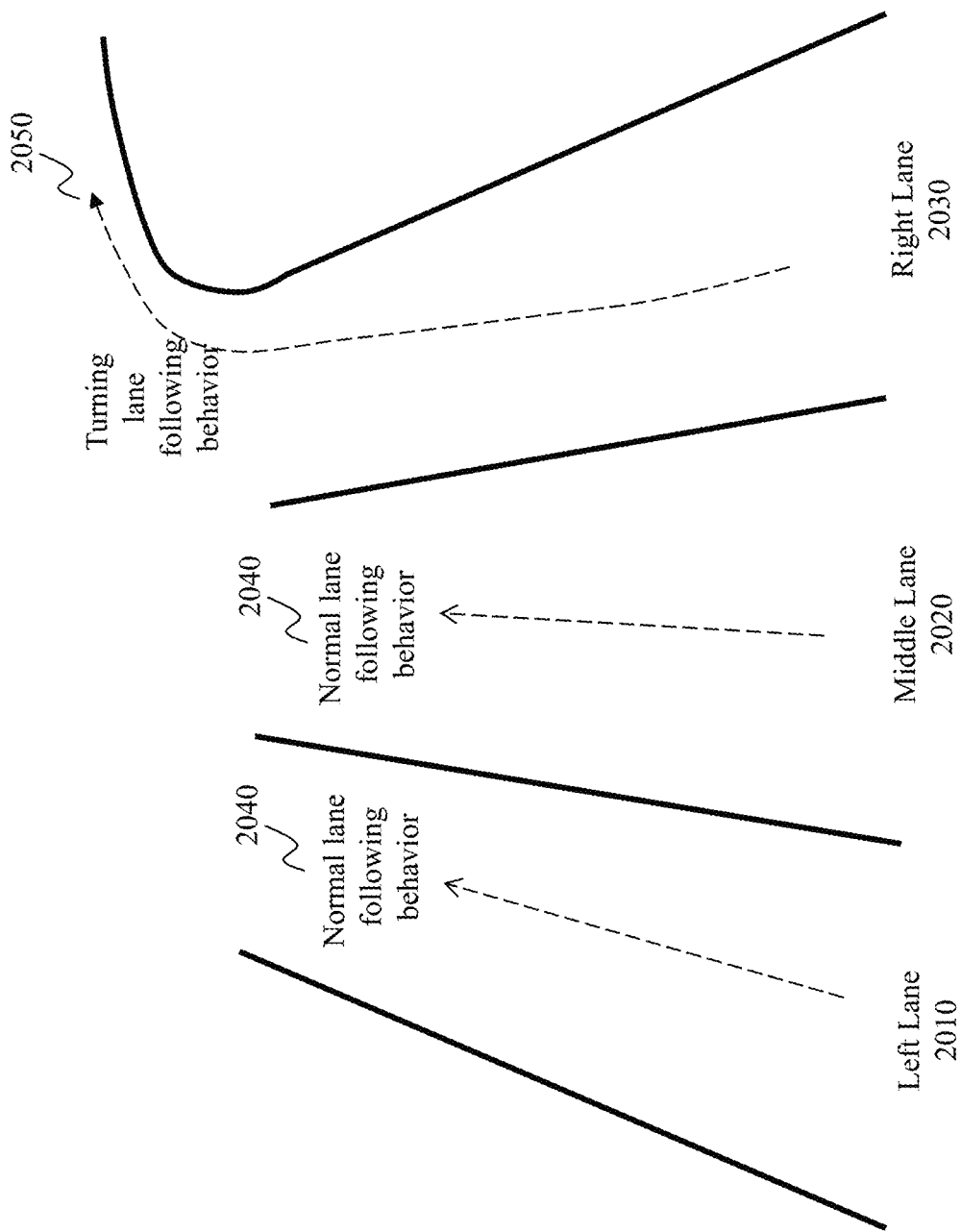
FIG. 20B illustrates exemplary types of behavior related to lane following, according to an embodiment of the present teaching.

FIG. 20B illustrates exemplary types of behavior related to lane following, according to an embodiment of the present teaching. As illustrated, there are multiple lanes (2010, 2020, and 2030) and a vehicle in each lane may follow its lane. Depending on different situations, the lane following behavior of individual vehicles may differ. For instance, as shown, when a vehicle merely tries to stay in a lane without turning, the vehicle may behave to stay in the middle of the lane. This is shown in FIG. 20B with respect to the vehicles in lane 2010 and 2020. This may be referred to as normal behavior 2040. When a vehicle in lane 2030 needs to turn to the right, e.g., as shown 2050 in FIG. 20B, the vehicle in lane 2030 may behave differently. For example, instead of remain in the middle of lane 2030, vehicle in that lane may pull to the right side of the lane before the turn so that the turn is, e.g., safer and easier. Similarly, when a vehicle is turning left, the lane following behavior may differ as well. The lane planning module 570 is configured to capture, e.g., via modeling, lane following behavior in different situations so that the autonomous driving vehicle may be controlled in a natural and human-like way.

On the other hand, lane changing may involve behavior of the vehicle when it moves from one lane to an adjacent lane while the vehicle is moving. Different passengers may exhibit different lane changing behaviors. From safety considerations, there may be desirable lane changing behaviors for different situations. Lane planning in terms of lane changing is to plan the vehicle movement with respect to the lanes in a manner that is safe, natural, human-like, and personalized.

Figure 20C:
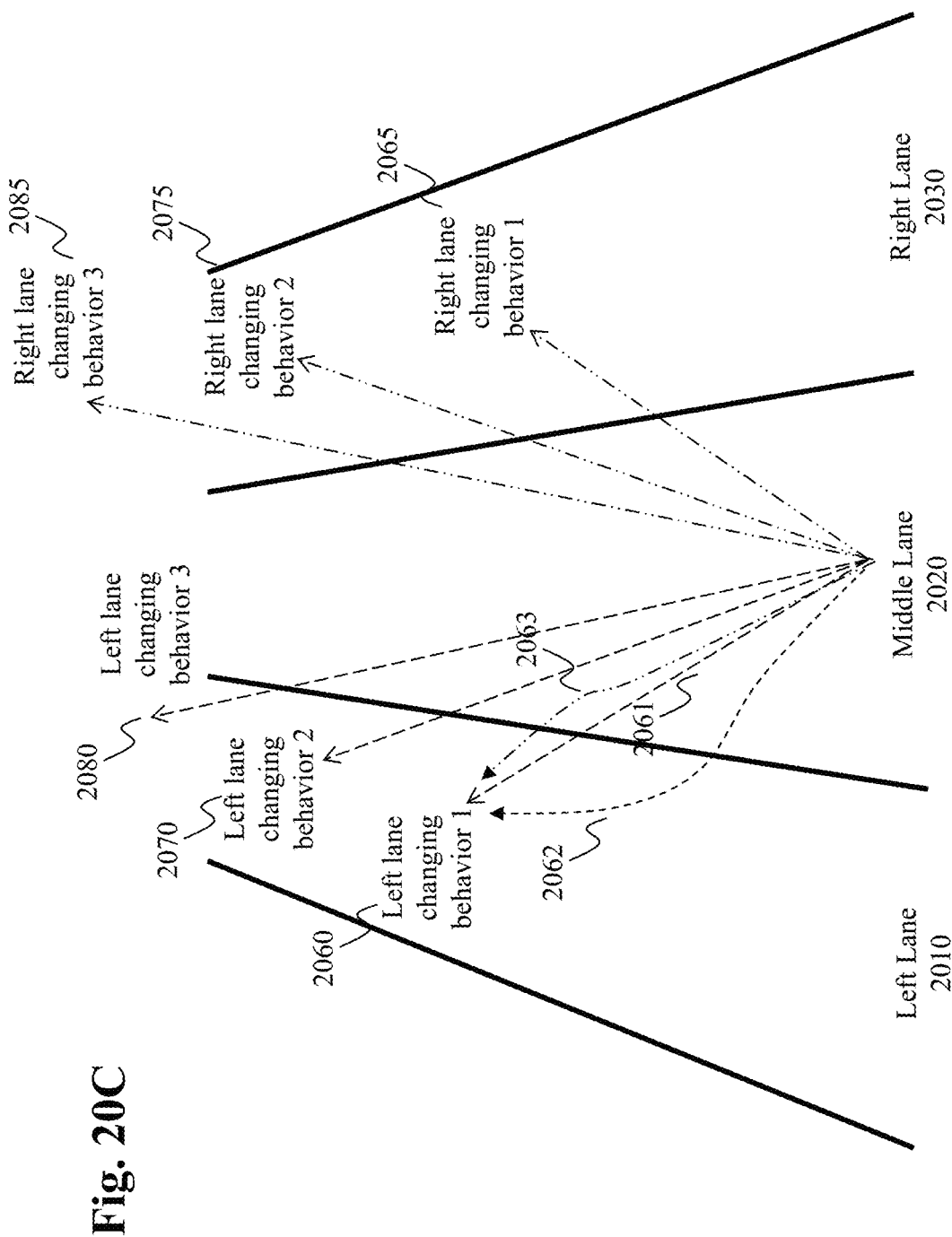
FIG. 20C illustrates exemplary types of behavior related to lane changing, according to an embodiment of the present teaching.

FIG. 20C illustrates exemplary types of behavior related to lane changing, according to an embodiment of the present teaching. Illustrated are different lane changing behavior, i.e., changing from a current lane 2020 to the lane left to it (lane 2010) and changing from the current lane 2020 to the lane right to it (lane 2030). With respect to the lane changing from lane 2020 to lane 2010, different lane changing behaviors may be characterized in terms of (1) how fast to make the change and (2) in what manner the vehicle is to move to the next lane. For instance, as shown in FIG. 20B, there are illustrated three plans to move to the lane 2010, which are left lane changing behavior 1 2060, left lane changing behavior 2 2070, and left lane changing behavior 3 2080, representing respectively different speeds to move to lane

2010. By behavior 2060, the vehicle is to move to lane 2010 fastest. By behavior 2080, the vehicle is to move to lane 2010 slowest. The speed to move to lane 2010 by behavior 2070 is in the middle. Similarly, when a vehicle is to move from lane 2020 to the lane to its right (2030), there may also be different lane changing behavior, e.g., right lane changing behavior 1 2065, right lane changing behavior 2 2075, and right lane changing behavior 2085, as shown in FIG. 20B.

In addition to the speed by which the vehicle is to move to the next lane, the lane changing behavior may also differ in terms of how the vehicle moves into the next lane. Also as shown in FIG. 20B, when the vehicle is to move from lane 2020 to lane 2010 by employing left lane changing behavior 1 2060, there are different behaviors for the vehicle to adopt to ease into lane 2010, e.g., by following a straight line 2061, by following curve 2062 (cut in first and then straight out the vehicle), or by following curve 2063 (ease towards the edge of lane 2020 first and watch and then cut in when ready). So, with regard to lane changing, decisions as to vehicle behavior may be made at different levels.

Different drivers/passengers may exhibit different lane planning (include both lane following and lane changing) behaviors and in some situations, the same driver/passenger may behave differently under different circumstances. For instance, if there is no one on the street, a driver may decide to cut into the next lane quickly in lane change. When the street is crowded, the same driver may be more careful and decide to take time to gradually ease into the next lane. The lane planning module 570 is configured to learn different human behaviors in different circumstances and use such learned knowledge/models to achieve lane planning in autonomous driving.

Smooth and predictable lane following and lane changing behavior is a key aspect of offering human-like driving experience in autonomous vehicles. It may be especially challenging when significant environment noise is present in camera images and/or videos captured during the vehicle operation. Traditional approaches rely on computer vision to detect lanes by detecting drivable area on the fly. Some uses end to end image raw pixels for vehicle control signal prediction. Such conventional approaches fail to utilize the available manual driving data collected so that they usually produce rigid planning and control and are susceptible to environment variances, while ultimately limit the capability to operate the vehicle satisfactorily.

The present teaching utilizes lane detection models and lane planning models for lane planning and control. Both models are trained based on large amount of training data, some labeled and some are as collected. For lane detection, lane detection models are obtained using training data with labeled lanes to derive supervised models for lane detection. Such supervised models are to be trained using a large set of training data covering a wide range of environmental conditions to ensure the representativeness and robustness of the trained models.

For lane planning, to achieve human-like lane planning behavior, large volume of human driving data are collected and used to train lane control models that, when used for lane planning, are to exhibit human-like behavior in maneuvering the vehicles. Although the lane detection models and the lane planning models are trained separately, in operation, the two sets of models are used in a cascade manner for inference in order to produce robust behavior in diverse types of environment or conditions with human-like operational behavior. In some embodiments, when human driving data are classified according to individual drivers, the present teaching can be configured to further personalize to create personalized human-like lane planning models. With such personalized human-like lane planning models, an autonomous driving vehicle may be operated during lane planning/control in an adaptive manner, depending on who is the passenger in the vehicle.

Figure 21:
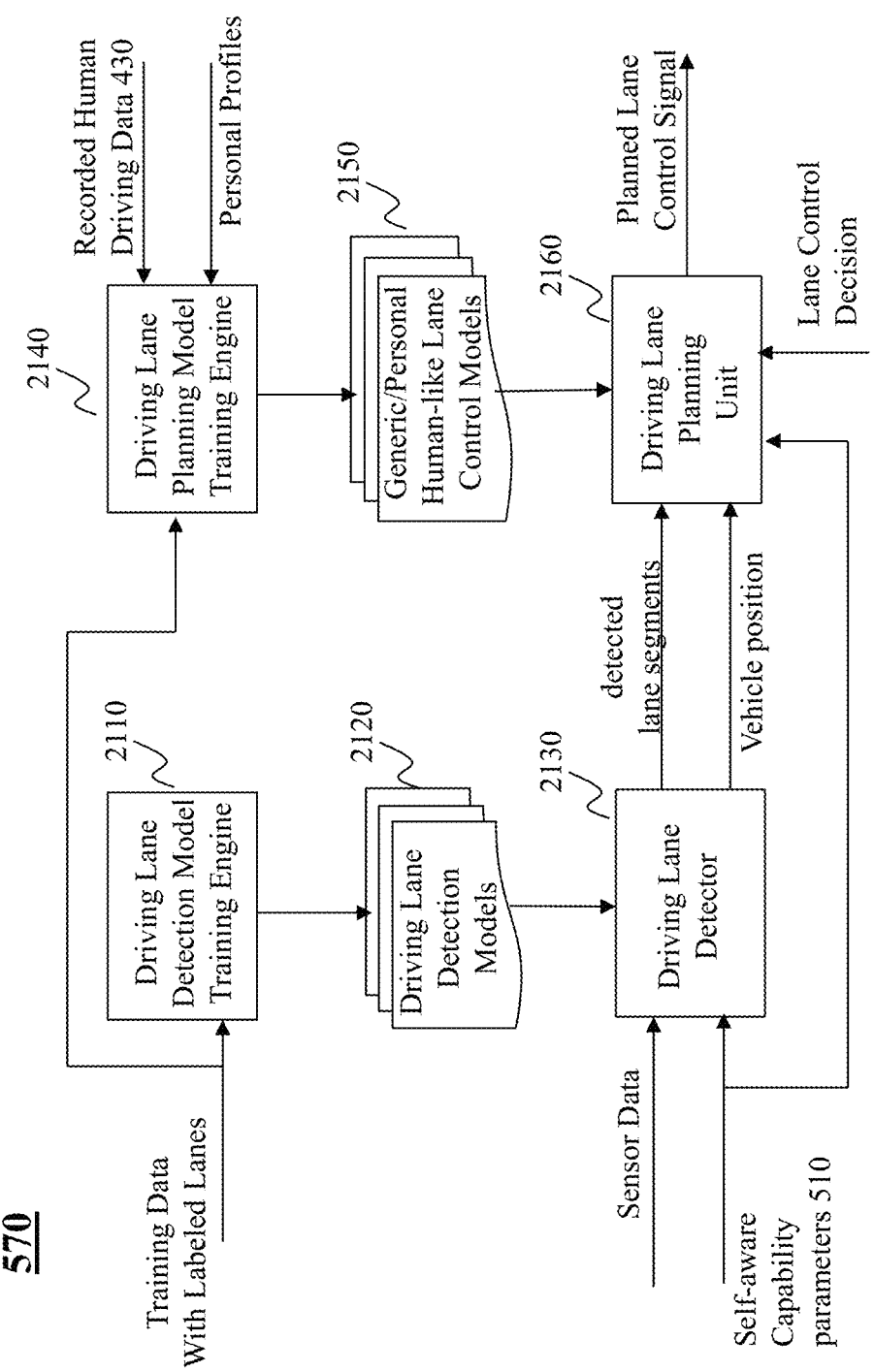
FIG. 21 depicts an exemplary high level system diagram of a lane planning module, according to an embodiment of the present teaching.

FIG. 21 depicts an exemplary high level system diagram of the lane planning module 570, according to an embodiment of the present teaching. In this illustrated embodiment, the lane planning module 570 comprises two model training engines 2110 and 2140 for training lane detection models 2120 and lane planning models 2150, respectively. Such trained models are then used, in lane planning, in a cascaded manner by a driving lane detector 2130 and a driving lane planning unit 2160. As discussed above, the lane detection models 2120 are supervised models and are trained using training data with labeled lanes. Such supervised training data are processed and used by the driving lane detection model training engine 2110 to obtain the driving lane detection models 2120.

In some embodiments, the lane detection models 2120 may correspond to a generic model, capturing the characteristics of lane detection in different situations. In some embodiments, the lane detection model 2120 may include different models, each of which may be for providing a model to detect lanes in a specific distinct situation. For example, some model(s) may be for detecting lanes in normal road conditions, some may be for detecting lanes when the road is wet, some may be for detecting lanes when the road has glare or reflection, some may even be for estimating lanes when the roads are covered with, e.g., snow or other types of visual obstructing objects. The lane detection models may also provide separate models for different types of vehicle. For example, some vehicles have higher gravity so that cameras capturing the ground image in front of the vehicle may be installed at higher positions relative to the ground. In this case, the lane detection models for such vehicles may be different from the lane detection models for vehicles with cameras installed at a level closer to the ground level. Each type of model may be trained using appropriate labeled training data that are related to the corresponding scenario.

To achieve human-like lane planning behavior in autonomous driving, the driving lane planning model training engine 2140 takes recorded human driving data 430 as input and learns human-like behavior in terms of lane planning. As discussed above, such human driving data may be collected from a wide range of drivers/situations/conditions in order for the driving lane planning model training engine 2140 to learn and capture the characteristics of a wide range of human driving behavior in lane planning/control. In some embodiments, the driving lane planning model training engine 2140 may optionally take some supervised training data with labeled lanes as input, e.g., as seeds or some small set of data to drive the learning towards convergence more quickly.

Based on the recorded human driving data 430, the driving lane planning model training engine 2140 may learn and/or train models for both lane following and lane changing. In some embodiments, for each of lane following and lane changing, a generic model in 2150 for generic human behavior may be derived. In some embodiments, the lane planning model training engine 2140 may also learn and/or train multiple models for lane planning, each of which may be for different known situations, e.g., lane following or lane changing for specific subgroups of the general population, or for particular different driving environment scenarios (wet road, dark light, crowded road). Such models for subgroups of the general population may also be stored in 2150.

The human-like lane control models 2150 may also be personalized and stored in 2150. When multiple models are to be derived via training, lane human driving data that meet the condition associated with each of different model may be extracted and used to train the models. For example, lane planning (including lane following and lane changing) models for lane related behavior exhibited when driving on crowded roads may be learned based on human driving data related to lane driving behavior on crowded roads. The models for lane planning may also be personalized. To achieve personalization, the driving lane planning model training engine 2140 may derive a model for each individual passenger (e.g., with respect to each of lane following and lane changing) based on the passenger's past driving data. Optionally, information from a personal profile associated with the passenger may also be used during learning in order to obtain a model that is more accurately reflect the preferences of the passenger.

Such obtained different types of lane planning/control models may then be stored in the driving lane control model storage 2150. In some embodiments, different models for different situations may be organized and indexed for easy identification and quick access in real time during the operation of the vehicle. In some embodiments, the driving lane detection model training engine 2110 and the driving lane planning model training engine 2140 may reside remotely from the vehicle and the learning may be performed in a centralized manner, i.e., they may be operating based on training data from different sources and the learning and update may be activated regularly. The trained models may be sent to distributed vehicles. In some embodiments, personalized models for lane planning may be updated locally in each vehicle based on data acquired locally.

The training via both 2110 and 2140 engines may be achieved via any learning mechanism including artificial neural networks, deep leaning networks, etc. Depending on the types and number of models to be obtained, each training engine may comprise a plurality of sub training engines, each for a specific (set of) models for some specific purposes and each may be configured and implemented differently in order to deriving the most effective models. Each training engine (2110 and 2140) may also include, in addition to learning, pre-processing mechanisms (not shown) for process the training data prior to being used by learning mechanism to derive trained models. For example, it may include data segmentation mechanism that segment the received training data into separate sets, each may be used for training a specific model directed for a particular situation, e.g., the driving lane planning model training engine 2140 may be configured to derive a generic model for the general population, a personalized model for the driver/passenger of the vehicle, a model for lane planning in day light condition, a model for lane planning in night light condition, a model for lane planning in wet road condition, and a model for lane planning for snowy day condition. In this case, the pre-processing mechanism may then first group the received recorded human driving data 430 into different groups, each of which for one model planned so that the training engine may then use the appropriate training data group to learn the appropriate model. The models may be continuously updated when the new training data arrive. The update of the models may be performed by re-learning based on all data received (batch mode) or by incremental mode.

Once the models, include the lane detection models 2120 and the driving lane control models 2150, are generated, they are used to plan lane related behavior for an autonomous driving vehicle in a human-like manner and in some instances personalized. As discussed previously, in operation, the obtained driving lane detection models 2120 and the driving lane control models 2150 are applied in a cascade manner. In the illustrated embodiments, when the vehicle is on the road, sensor(s) installed in the vehicle take pictures/videos of the road the vehicle is currently driving on and send such sensor data to the driving lane detector 2130. In addition to the sensor data, the driving lane detector 2130 may also receive the self-aware capability parameters 510. Via the self-aware capability parameters, the driving lane detector 2130 may determine various types of information, e.g., road condition, the vehicle's capabilities, etc., in order to determine how it may proceed in a way that is appropriate. For example, if it is night time of the day, which may be indicated in the extrinsic capability parameters, the driving lane detector 2130 may proceed to invoke a lane detection model that is trained for detecting lanes in dark light situation to achieve reliable performance.

Using the appropriately invoked lane detection model(s), the driving lane detector 2130 estimates segments of the lanes from the sensor data and optionally the estimated position of the vehicle. Such estimated lane segments and the vehicle position are then sent to the driving lane planning unit 2160, where appropriate driving lane planning model(s) may then be applied in a cascade manner for planning the lane control behavior of the vehicle.

As discussed previously, lane planning includes both lane following and lane changing. In operation, lane planning is directed to either controlling the vehicle behavior in lane following or the vehicle behavior in lane changing. When the vehicle is in motion, the operation context may provide some indication as to whether lane following or lane changing planning is needed. For instance, if the vehicle needs to exit, it may need first to get into an exit lane from a current lane that does not lead to the exit. In this case, lane changing is implied so that the task involved in lane planning is for lane changing. In some embodiments, the passenger in the vehicle may also provide an explicit lane control decision to indicate lane changing, e.g., by turning on the turn signal. In some embodiments, an indication of lane changing may also be from the vehicle itself, e.g., the engine may experience some problem so that the autonomous driving system may send a lane control decision signal to the driving lane planning unit 2160, instructing to prepare for lane changing so that the vehicle can move to the emergency lane. In normal situations, the vehicle may assume a default mode of lane following in absence of any indication of entering into a lane changing mode.

To perform lane planning, the driving lane planning unit 2160 receives, from different sources, various types of information (e.g., detected lanes, estimated vehicle position, lane planning decision, and self-aware capability parameters 510) and proceeds to lane planning accordingly. For example, if the lane control decision signal indicates that the current task is for lane following, models for lane following are to be retrieved and used for planning. If the current task is for lane changing, then models for lane changing are to be used.

Similar to the driving lane detector 2130, the driving lane planning unit 2160 may invoke the generic lane planning model from 2150 for the planning. It may also invoke different lane planning models that are appropriate for the situation in hand in order to enhance the performance. As discussed earlier, the self-aware capability parameters 510 provide both intrinsic and extrinsic capability parameters, which may indicate the weather condition, road condition, etc. which can be used by the driving lane planning unit 2160 to invoke appropriate lane planning models for the planning. For example, if the current task is for lane following with a right turn coming up, personalized human-like models for the passenger in the event of a right turn from the current lane may be retrieved from 2150 and used to plan the vehicle behavior as to how to ease into a position in the current right lane and then make a right turn.

On the other hand, if the current task is for lane changing, the lane control decision indicates that it is to change to the lane left to the current one, and the self-aware capability parameters indicate heavy rain and flooded roads, then the driving lane planning unit 2160 may appropriately access lane planning models trained for planning lane changing behavior on very wet roads. In some embodiments, such tasks may also be carried out using generic lane changing models. Based on selected models for the tasks in hand, the driving lane planning unit 2160 generates the planned lane control, which may then be sent to the vehicle control module 450 (FIG. 4A) so that the planned lane control behavior can be implemented.

The driving lane planning unit 2160 may also perform personalized lane planning. In some embodiments, the passenger currently present in the vehicle may be known, e.g., either via driver/passenger information sent to the driving lane planning unit 2160 or via detection of the passenger (now shown) from the sensor data. Upon receiving such information about the passenger, the driving lane planning unit 2160 may appropriately invoke lane control models suitable for the passenger. Such invoked customized models may be a model for a subgroup that the passenger belongs to or may be a model that is personalized for the passenger. Such customized models may then be used to control how the lane planning is performed in a personalized manner.

Figure 22:
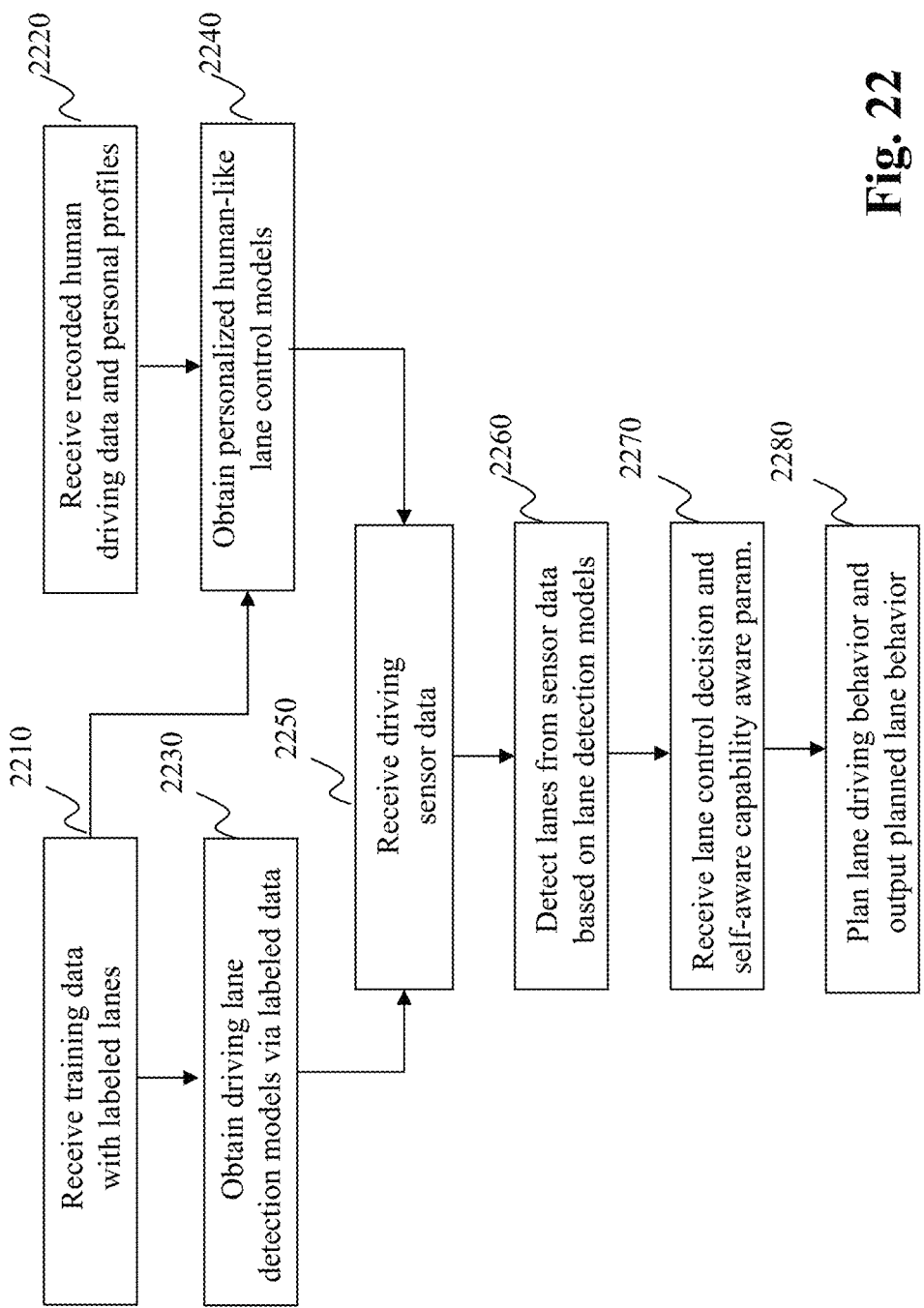
FIG. 22 is a flowchart of an exemplary process for a lane planning module, according to an embodiment of the present teaching.

FIG. 22 is a flowchart of an exemplary process for the lane planning module 570, according to an embodiment of the present teaching. To obtained lane detection models, training data with labeled lanes are first received at 2210 and such received supervised data are then used to obtain, at 2230 via training, driving lane detection models. On the other hand, to obtain driving lane planning models, recorded human driving data, and optionally together with personalized profile information, are received at 2220 and used to derive, at 2240 via training, lane planning models. Once the models are obtained, they may be dynamically updated based on newly arrived training data (now shown).

During operation, when a vehicle is in motion, the sensors on the vehicle acquire sensor data including imagery of the road ahead of the vehicle with lanes present. Such sensor data are received at 2250 and are used to detect, at 2260, lanes in front of the vehicle based on the lane detection models. The relative position of the vehicle may also be optionally estimated. Such detected lanes and optionally estimated vehicle position may then be sent to the driving lane planning unit 2160. At the driving lane planning unit 2160, various types of information received at 2270, which include lane control decision, detected lanes, and self-aware capability parameters. Such information is used to determine the lane planning models to be used so that the lane planning can be achieved, at 2280, based on appropriated selected lane planning models.

By learning from human driving data, the learned lane planning models capture the characteristics of human behavior in lane planning so that when such models are used in autonomous driving, the vehicle can be controlled in a human-like manner. In addition, by further personalizing lane planning models based on relevant driving data of the passengers/drivers, the lane planning behavior of the vehicle can be controlled in a manner that is familiar and comfortable for the passenger/driver in the vehicle.

With reference to FIGS. 5-22, details of the planning module 440 on route planning, motion planning, and lane planning are disclosed. The output of the planning module 440 includes the planned route 520 from the route planning module 550, the planned motion 530 from the motion planning module 560, and the planned lane control 540 from the lane planning module 570 (see FIG. 5). Such output may be sent to different parts of the autonomous driving vehicle in order to carry out the planned vehicle behavior. For instance, the planned route 520 may be sent to the part of the vehicle that is responsible for guide the vehicle in terms of route control, e.g., such as the built in GPS. The planned motion 530 and the planned lane control 540 may be sent to the vehicle control module 450 (in FIG. 4) so that the planned vehicle behavior as to motion and lane control may be carried out on the vehicle via the vehicle control module 450.

When the motion and lane control planned to achieve human-like behavior, the vehicle control module 450 aims at delivering the planned action. According to the present teaching, the vehicle control module 450 also aims at learning how to control the vehicle according to the knowledge in terms of how the vehicle behaves or responds to different control signals in different situations so that the vehicle can be controlled to achieve the desired effect, including the planned vehicle behavior. Traditional approaches apply machine learning based control and derive vehicle dynamics models from classical mechanics, which often fail to model a variety of situations that occurred in real world. As a consequence, it often leads to poor performance and in some situations, may cause dangerous consequences. Although some conventional approaches is designed to learn the vehicle dynamics models from historic data via, e.g., neural networks, are able to learn the vehicle dynamics models in common scenarios, in some situations, such systems have made predictions that have substantial and unpredicted errors, which in real life can be fatal.

The present teaching discloses an approach that enables both achieving accurate simulation and safety of the vehicle performance. Instead of directly learn the vehicle dynamics model from the historic data, classical mechanics model is used as backbone model and learn how to adjust the predicted result from the historic data. In addition, limitation to the adjustment to be made is specified as a way to prevent a prediction result that significantly deviates from the normal situations.

Figure 23A:
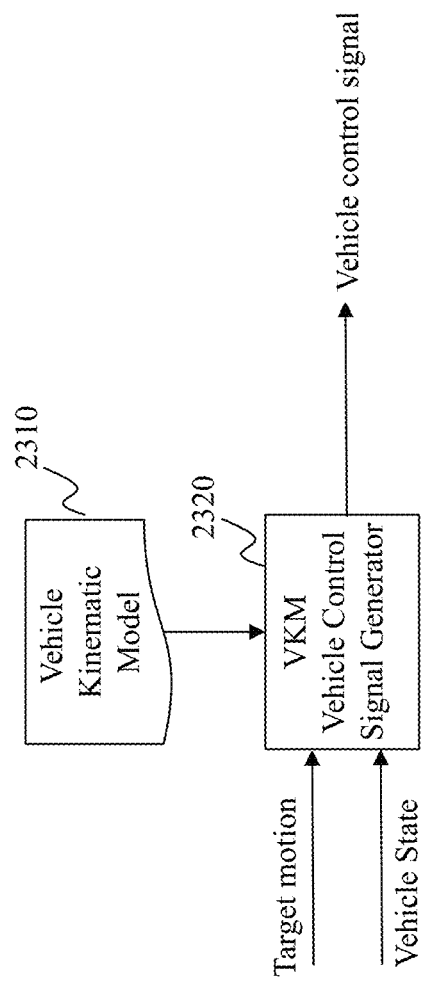
FIG. 23A illustrates the traditional approach to generate vehicle control signals based on a vehicle kinematic model.

FIG. 23A depicts a system diagram of traditional approach for generating vehicle control signal. To determine vehicle control signals needed for control the vehicle to achieve certain target motion, a vehicle kinematic model 2310 is provided and used by a vehicle kinematic model (VKM) vehicle control signal generator 2320 based on the target motion and information about the current vehicle state. For example, if the current vehicle state is 30 miles per hour and the target motion is reaching 40 miles per hour in the next 5 seconds, the VKM vehicle control signal generator 2320 uses such information to determine, based on the vehicle kinematic model 2310, what kind of vehicle control is to be applied so that the velocity acceleration can enable the vehicle to achieve the target motion. The approach as depicted in FIG. 23A is based on the traditional vehicle kinematic models 2310, which is merely a mechanical dynamic model.

Figure 23B:
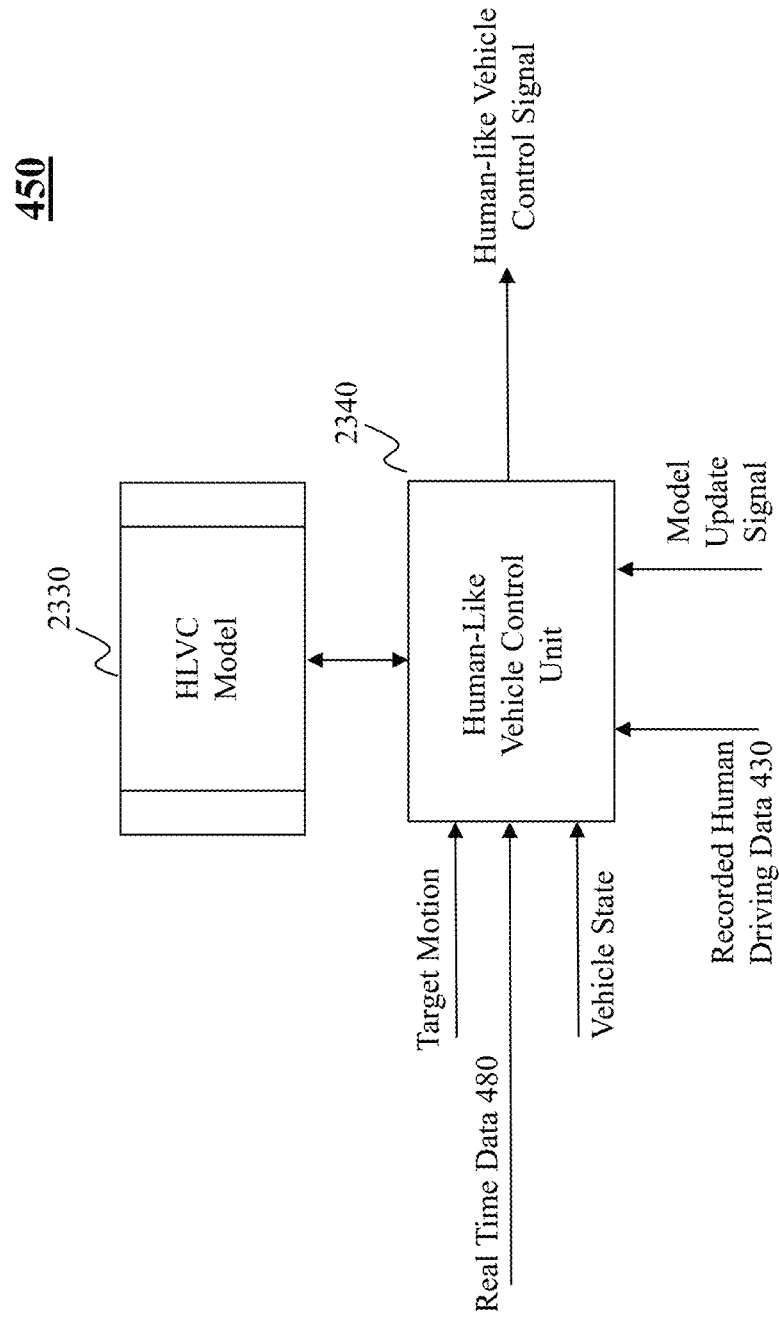
FIG. 23B depicts a high level system diagram of a vehicle control module that enables human-like vehicle control, according to an embodiment of the present teaching.

FIG. 23B depicts a high level system diagram of the vehicle control module 450 in FIG. 4A, according to an embodiment of the present teaching. The vehicle control module 450 as disclosed herein aims at providing the ability of generating vehicle control signals that can enable human-like driving behavior for autonomous vehicles. As shown, the vehicle control module 450 comprises a human-like vehicle control unit 2340 and a human-like vehicle control (HLVC) model 2330. To achieve human like autonomous driving, the human-like vehicle control unit 2340 receives recorded human driving data 430 to uses that for learning human like vehicle control and generate the HLVC model 2330 that characterizes vehicle control behavior that is humanlike.

With the HLVC model 2330 created, when the human-like vehicle control unit 2340 receives information related to a target motion and the current vehicle state, it generates a human-like vehicle control signal based on the HLVC model 2330 with respect to the real time situation associated with the vehicle (characterized by the real time data 480). When additional recorded human driving data 430 are made available, the HLVC model 2330 may be dynamically updated or re-trained so that it captures the characteristics of human vehicle control behavior in a variety of situations. The dynamic update of the HLVC model 2330 may be triggered via a model update signal as shown in FIG. 23B. The model update signal may be triggered manually or automatically when certain conditions are met, e.g., set up with regular update with a pre-determined internal or when additional data available for update amounts to a certain level.

Figure 23C:
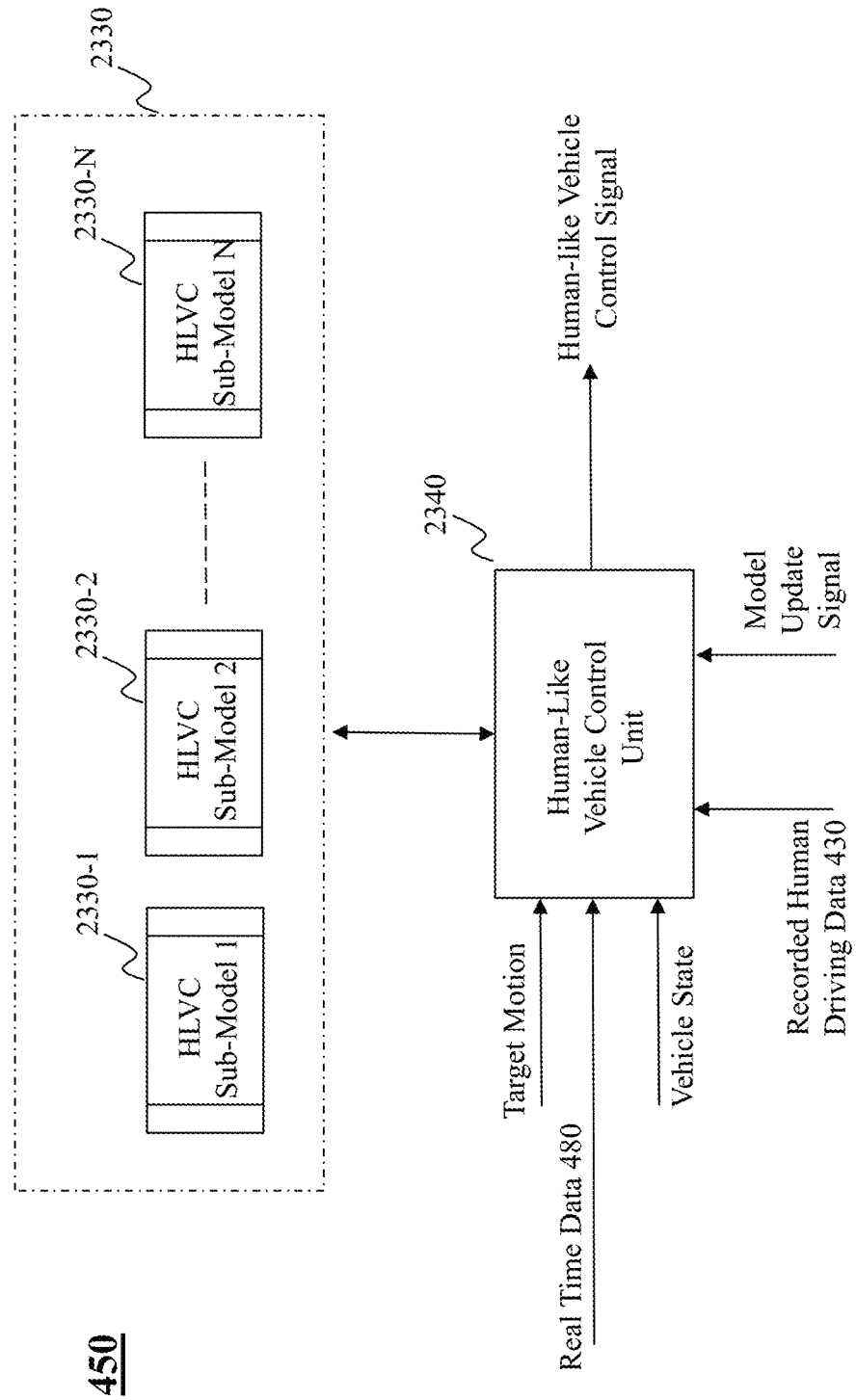
FIG. 23C depicts a high level system diagram of a vehicle control module that enables personalized human-like vehicle control, according to an embodiment of the present teaching.

In some embodiments, the HLVC model 2330 may also be personalized. This is illustrated in FIG. 23C. The HLVC model 2330 in this case may comprise a plurality of HLVC sub-models (e.g., 2330-1, 2330-2, . . . , 2330-N), each of which may correspond to a sub-population with, e.g., similar characteristics, and trained based on a part of the recorded human driving data 430 that are related to the sub-population. For instance, a HLVC sub-model may be directed to sub-population for people who may prefer to drive cautiously so that the model may be derived based on training data in the recorded human driving data 430 from the driving record of a corresponding sub-population that exhibit cautious driving record. A HLVC sub-model may also be personalized (e.g., a sub-model is for an individual) if appropriate training data are applied to derive a personalized sub-model.

Figure 24:
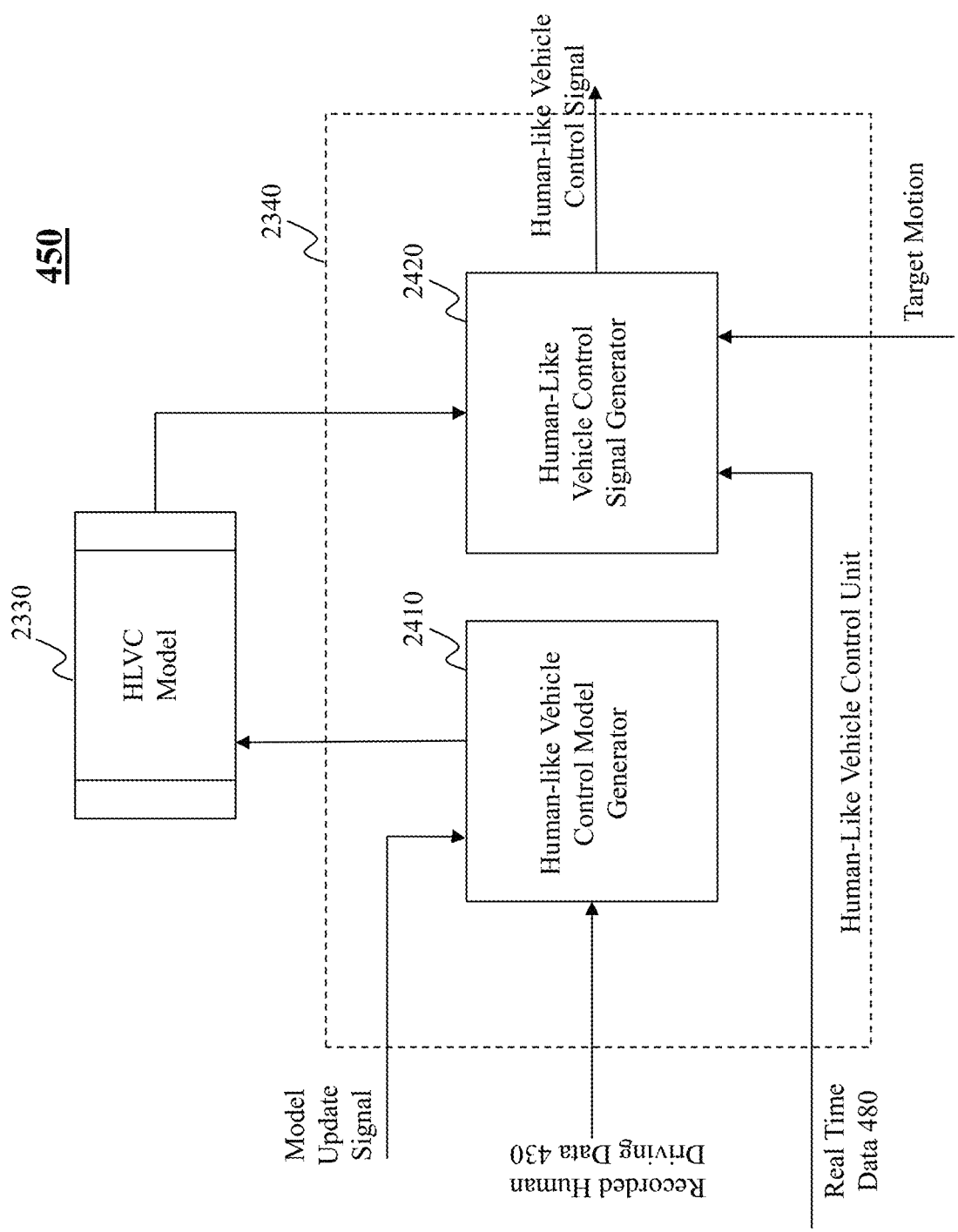
FIG. 24 depicts an exemplary high level system diagram of a human-like vehicle control unit, according to an embodiment of the present teaching.

Details on the human-like vehicle control unit 2340 is disclosed below with reference to FIGS. 24-29. FIG. 24 depicts an exemplary internal high level architecture of the human-like vehicle control unit 2340, which comprises a human-like vehicle control model generator 2410 and a human like vehicle control signal generator 2420. The human like vehicle control model generator 2410 takes recorded human driving data 430 as input and uses that information for learning and training the HLVC model 2330. Exemplary types of data extracted from the recorded human driving data 430 for training may include, e.g., the vehicle control data applied to the vehicle and the vehicle states, which may include both the vehicles states prior to and after the vehicle control data are applied.

Data to be used for deriving the HLVC model 2330 may also include environment data that characterize the surrounding condition under which the vehicle control data yielded the corresponding vehicle state. The environment data may include various types of information, e.g., road condition, whether condition, vehicle type and condition. In some embodiments, the environment data may also include information about the passenger in the vehicle as well as characteristics of the passenger, e.g., gender, age, health situation, preferences, etc. All these different types of information from the human driving data may present some variables that may impact the passenger's vehicle control behavior. For instance, when the road is wet or slippery, human drivers may exhibit different vehicle control behavior in terms of break the vehicle (e.g., apply pressure on the brake more slowly) than that when the road is not slippery.

When the HLVC model 2330 is generated, it can be used by the human-like vehicle control signal generator 2420 to generate a vehicle control signal, when it receives a desired target motion, to yield human-like vehicle control behavior in achieving the desired target motion. To generate a human-like vehicle control signal, the vehicle control signal generator 2420 obtains real time data 480 comprising information about the surrounding of the vehicle at the time of the desired target motion and use such information in invoking the HLVC model 2330 to generate a human-like vehicle control signal. As illustrated in the example above, a target motion may be to accelerate, in 5 seconds, the vehicle to 40 miles per hour starting from the current velocity of 30 miles per hour. The real time data for that moment may indicate that the road the vehicle is on has a deep slope and the road is slippery because it is currently raining. Such real time data is relevant and may be provided as environment data to the HLVC model 2330. The human-like vehicle control signal generator 2420 may invoke the HLVC model 2330 with such parameters in order to obtain an inferred human-like vehicle control signal that enables the autonomous vehicle to achieve the desired target motion in a manner similar to human driving.

Figure 25:
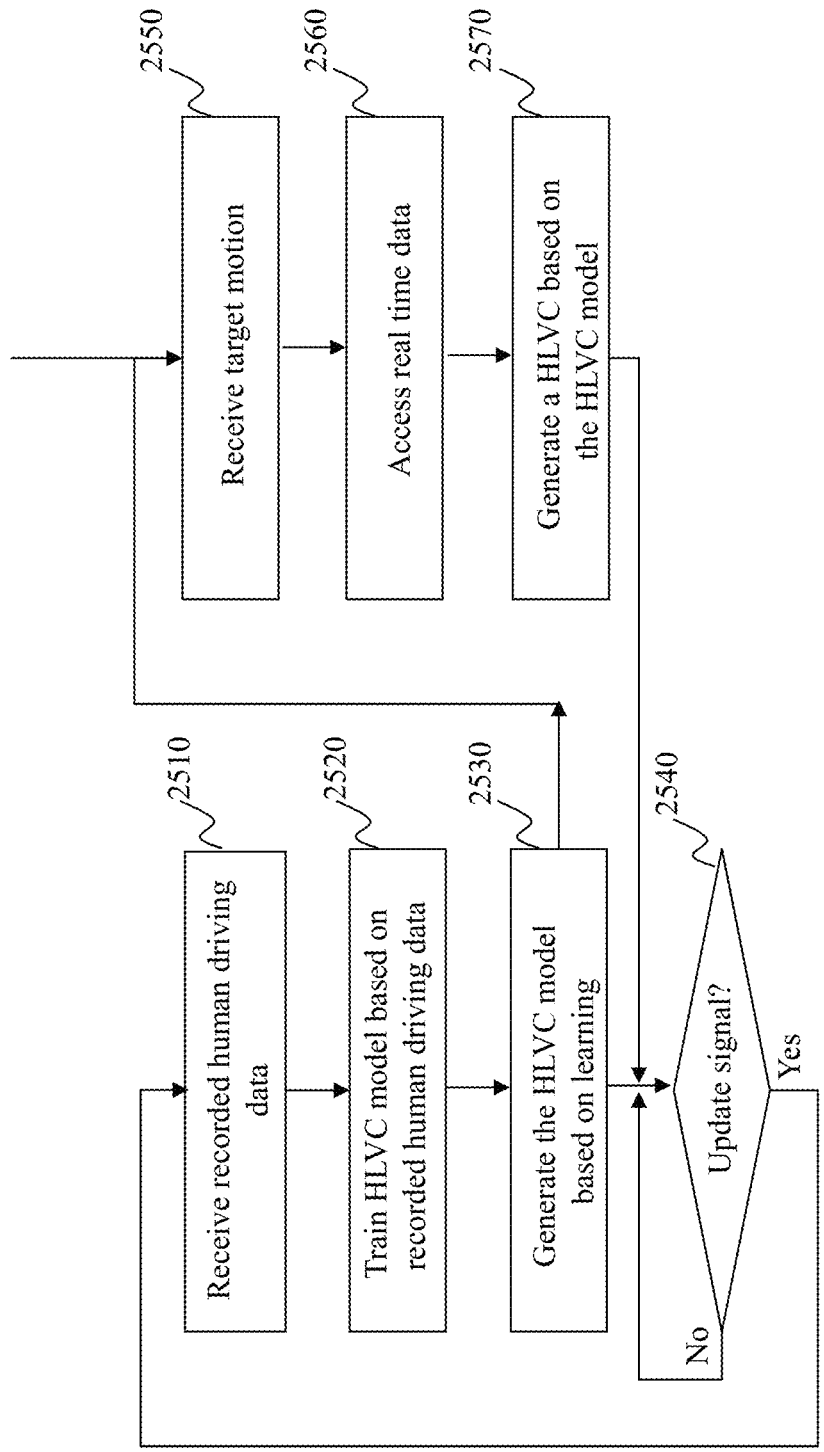
FIG. 25 is a flow chart of an exemplary process of a human-like vehicle control unit, according to an embodiment of the present teaching.

FIG. 25 is a flowchart of an exemplary process of the human-like vehicle control unit 2340, according to an embodiment of the present teaching. To generate the HLVC model 2330, recorded human driving data are received at 2510 to obtain training data, which are used in a training process, at 2520, to derive, at 2530, the HLVC model 2330. Such generated HLVC model 2330 is then used in operation when a requested target motion is received, at 2550. Based on the requested target motion, the human-like vehicle control signal generator 2420 obtains, at 2560, the real time data 480 in order to extract information related to the vehicle at the time, including environment data, current vehicle state, etc. In some embodiments, information related to the passenger (e.g., identification of the passenger or characteristics of the passenger) in the vehicle may also be obtained (not shown) so that such information may be used to personalize the process of generating an appropriate human-like vehicle control signal.

The information obtained by the human-like vehicle control signal generator 2420 may then be applied to the HLVC model 2330 to generate, at 2570, the human-like vehicle control signal in accordance with the HLVC model 2330. In the event of personalization, one or more specific HLVC sub-models appropriate for the situation may be invoked and used to generate personalized human-like vehicle control signal. During the operation, the human-like vehicle control unit 2340 may check, at 2540, whether an update triggering signal is present. If an update signal is received, determined at 2540, the human-like vehicle control model generator 2410 proceeds to step 2510 to gather training data and re-train or adaptively adjust the HLVC model 2330 based on the dynamically collected human driving data.

Figure 26:
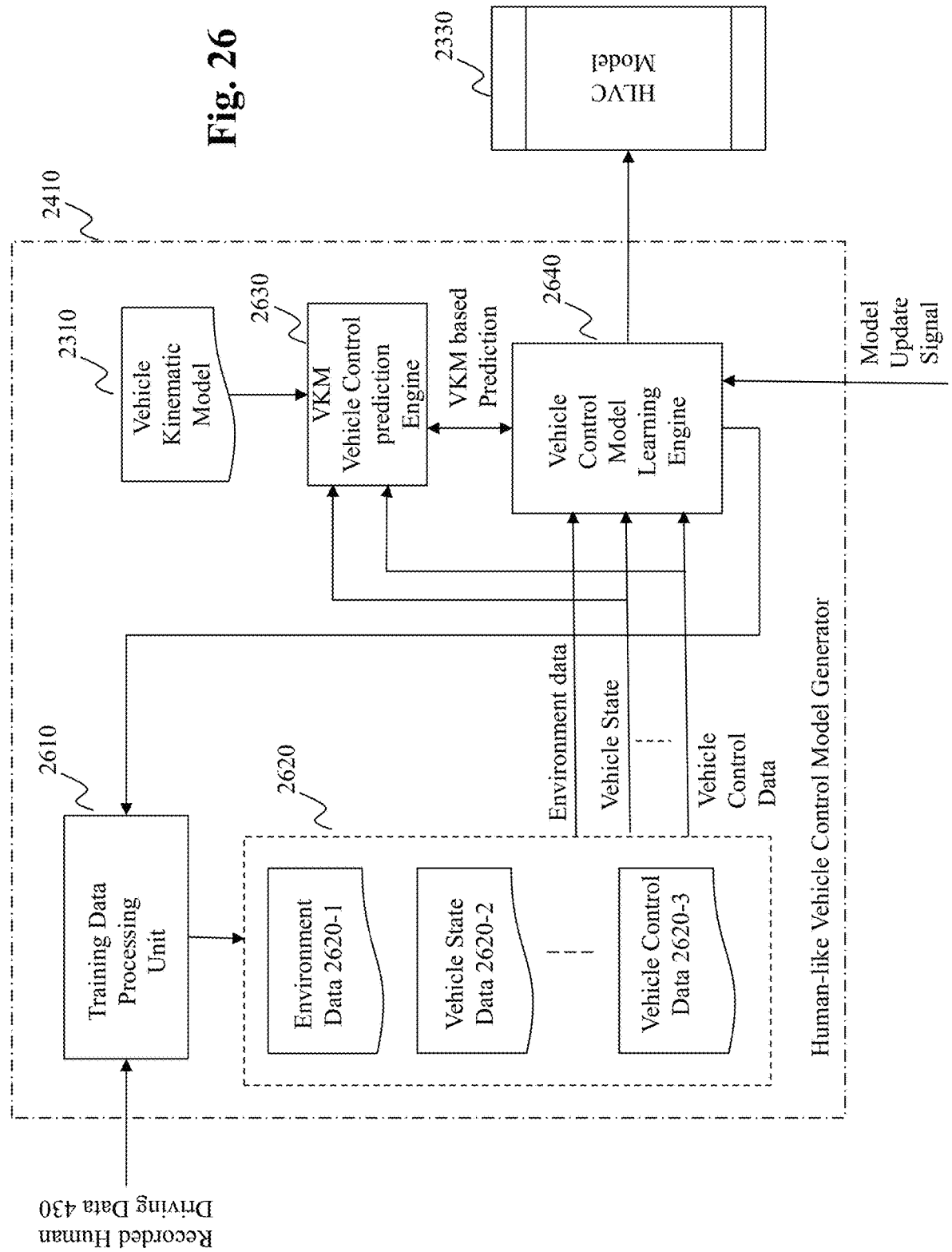
FIG. 26 depicts an exemplary high level system diagram of a human-like vehicle control model generator, according to an embodiment of the present teaching.

FIG. 26 depicts an exemplary high level system diagram of the human-like vehicle control model generator 2410, according to an embodiment of the present teaching. In the illustrated embodiment, the human-like vehicle control model generator 2410 comprises a training data processing unit 2610, a VKM vehicle control prediction engine 2630, and a vehicle control model learning engine 2640. The training data processing unit 2610 takes the recorded human driving data 430 as input, processes the input to generate training data 2620 to be used to train the HLVC model 2330. The recorded human driving data 430 may include environment data 2620-1, vehicle state data 2620-2, . . . , and current vehicle control data 2620-3. The environment data 2620-1 may include information such as the road condition such as the slope of the road, angle of the turn, slippage of the surface condition, wetness of the road, etc. The environment data may also include information related to limitations to the vehicle such as speed limit, time of the day, season, location, etc. Such environment data may be used as contextual information in training so that the HLVC model 2330 may learn human like vehicle control behavior in different context conditions such that the trained model characterizes human-like vehicle control behaviors exhibited in different situations. If personalization is needed, the obtained training data may also be classified into different sub-groups of training data (not shown), each of which may be used to train an HLVC sub-model specific for passengers that belong to that group.

The vehicle state data 2620-2 may include information characterizing the state of the vehicle, including, e.g., position of the vehicle, velocity of the vehicle, roll/pitch/yaw of the vehicle, and steering angle of the vehicle, etc. The vehicle control data 2620-3 may provide information characterizing the control applied to the vehicle, such as brake applied with a certain force, steering by turning the steering wheel by a certain angle, or throttle.

According to the present teaching, rather than training the HLVC model 2330 to generate the vehicle control signal directly, the present teaching combines or fuses the traditional kinematic model based prediction approach with learning model, created by learning from human driving data, as to how to adjust a vehicle control signal predicted using the traditional kinematic model so that the adjustment yields human-like vehicle control behavior. Such an integrated approach enables not only more accurate vehicle control but also human-like feel as to control of the vehicle.

In learning the HLVC model 2330, the vehicle state data 2620-2 and vehicle control data 2620-3 are provided to the VKM vehicle control prediction engine 2630 to predict the motion achieved because of the control exercised. The VKM vehicle control prediction engine 2630 performs the prediction based on based on the vehicle kinematic model 2310, e.g., via traditional mechanical dynamics approach to generate VKM based prediction signal, as shown in FIG. 26. The VKM based prediction is then sent to the vehicle control model learning engine 2640 to be combined with other information from the training data 2620 to learn. Based on the outputs of the VKM vehicle control prediction engine 2630 and the training data 2620, the vehicle control model learning engine 2640 trains the HLVC model 2330 in, e.g., in an iterative process until the HLVC model 2330 converges. Once the model 2330 converges, it is used to derive human-like vehicle control signals given desired target motions.

As shown, the vehicle control model learning engine 2640 may be triggered by the model update signal. When it is activated, the vehicle control model learning engine 2640 invokes the training data processing unit 2610 and the VKM vehicle control prediction engine 2630 to initiate the training process. In some embodiment, any subsequent training based on additional human driving data may be performed in a derivative manner or in a batch mode, i.e., re-train the HLVC model 2330.

Figure 27:
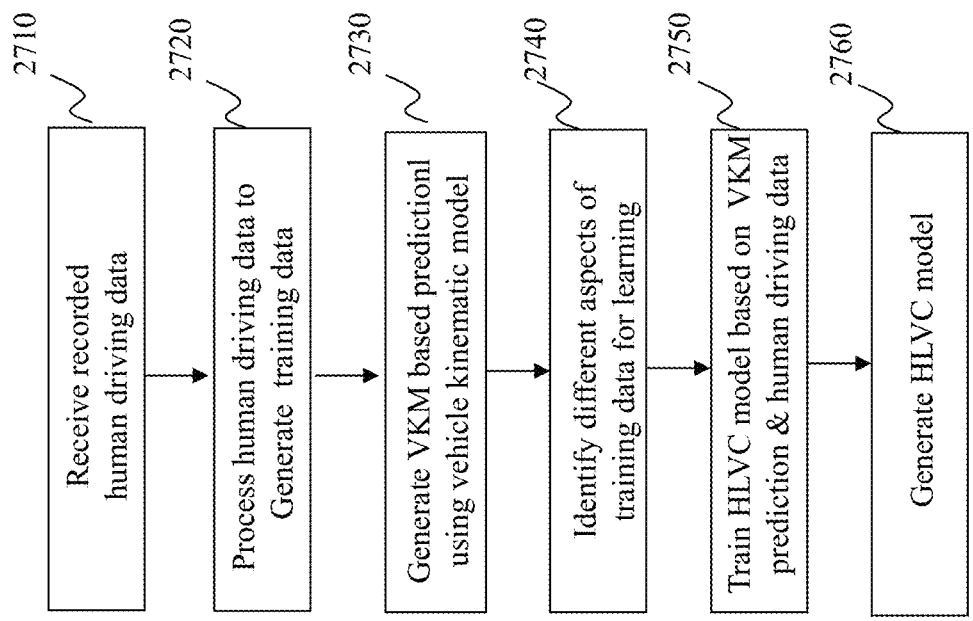
FIG. 27 is a flowchart of an exemplary process of a human-like vehicle control model generator, according to an embodiment of the present teaching.

FIG. 27 is a flowchart of an exemplary process for the human-like vehicle control model generator 2410, according to an embodiment of the present teaching. Recorded human driving data 430 are first received at 2710. The received human driving data are processed, at 2720, to obtain training data. Some of the training data are used, at 2730, to generate VKM based prediction based on the traditional vehicle kinematic model 2310. For the learning and fusion based training, various aspects of the training data are identified, at 2740, and used, at 2750, to train the HLVC model 2330. After convergence, the HLVC model 2330 is created at 2760.

Figure 28:
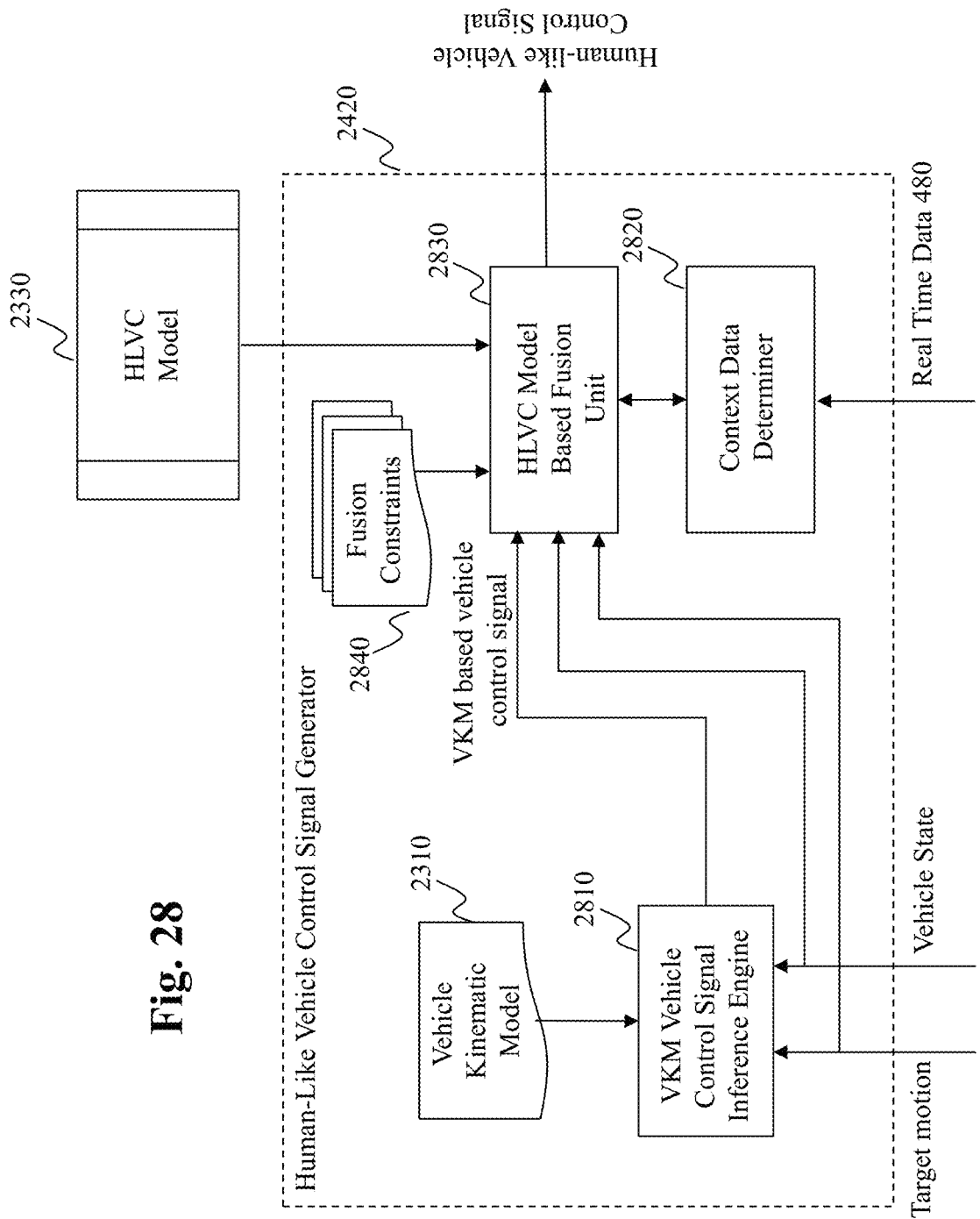
FIG. 28 depicts an exemplary high level system diagram of a human-like vehicle control signal generator, according to an embodiment of the present teaching.

FIG. 28 depicts an exemplary high level system diagram of the human-like vehicle control signal generator 2420, according to an embodiment of the present teaching. As discussed herein, the human-like vehicle control signal generator 2420 aims to generate, for a specified target motion, a human-like vehicle control signal based on the HLVC model 2330 so that when the human-like vehicle control signal is used to control the vehicle, the vehicle exhibits human-like vehicle control behavior. In this embodiment, the human-like vehicle control signal generator 2420 comprises a VKM vehicle control signal inference engine 2810, a context data determiner 2820, and an HLVC model based fusion unit 2830.

In operation, upon receiving a target motion, the human-like vehicle control signal, the VKM vehicle control signal inference engine 2810 obtains the current state of the vehicle and generates a VKM based vehicle control signal based on the vehicle kinematic model 2310. As discussed herein, the use of the traditional approach to generate an inferred vehicle control signal based merely on the vehicle kinematic model 2310 aims at providing initially an inferred vehicle control signal based on purely on mechanical dynamics. To achieve human-like behavior in vehicle control to achieve the target motion, the inferred VKM based vehicle control signal is to be further used as an input to the HLVC model based fusion unit 2830, where the VKM based vehicle control signal is used as the initial inferred result to be fused with the HLVC based approach so that the VKM based vehicle control signal may be adjusted in accordance with the learned HLVC model 2330.

The HLVC model based fusion unit 2830 may activate, upon receiving the target motion, the context data determiner 2820 to obtain any information related to the surrounding of the vehicle. The context data determiner 2820 receives the real time data 480 and extracts relevant information such as environment data or passenger data, etc. and sends to the HLVC model based fusion unit 2830. Based on the target motion, the current vehicle state, context information surrounding the vehicle, and the VKM based vehicle control signal inferred using the traditional vehicle kinematic model 2310, the HLVC model based fusion unit 2830 accesses the HLVC model 2330 based on such input data to obtain a fused human-like vehicle control signal.

As discussed herein, the HLVC model 2330 may be created by learning the discrepancies between VKM model based predictions and the observed information from the recorded human driving data 430. As such, what the HLVC model 2330 captures and learns may correspond to adjustments to be made to the VKM based vehicle control signals to achieve human-like behavior. As discussed previously, as learning process may create overfitting situation, especially when the training data include outliers, to minimize the risks in vehicle control due to adjustment to the VKM based vehicle control signal, the human-like vehicle control signal generator 2420 may also optionally include preventative measures by limiting the adjustments to VKM vehicle control signals based on some fusion constraints 2840, as shown in FIG. 28. In this manner, the human-like vehicle control signal generated as a modified VKM based vehicle control signal can maximize the likelihood as to human behavior yet minimize the risks in vehicle control.

In some embodiments, information about the passenger in the vehicle may also be extracted from real time data 480 and can be used to access personalized HLVC sub-model related to the passenger, which may be a HLVC sub-model for a group that the passenger belongs or a completely personalized HLVC sub-model for the passenger). Using such a personalized HLVC sub-model may allow the human-like vehicle control signal generator 2420 to generate personalized human-like vehicle control signal so that the vehicle control carried out based on it can be not only human-like but also to the personal liking of the passenger.

Figure 29:
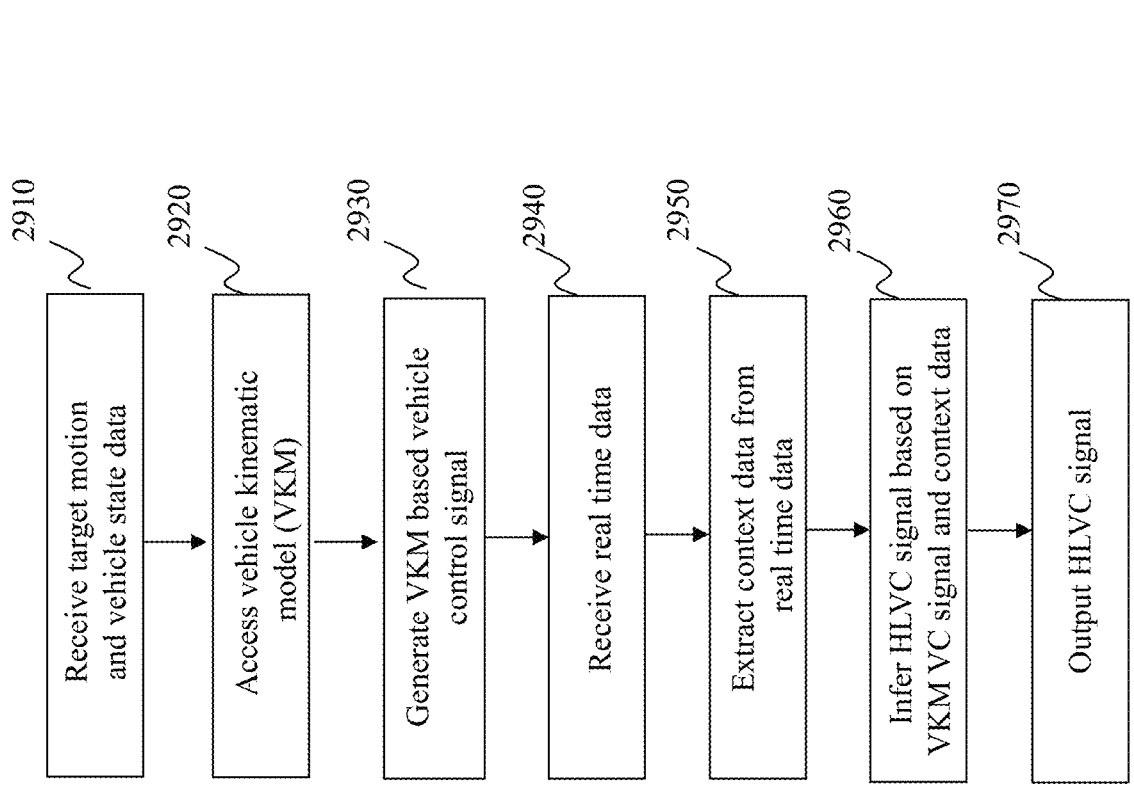
FIG. 29 is a flowchart of an exemplary process of a human-like vehicle control signal generator, according to an embodiment of the present teaching.

FIG. 29 is a flowchart of an exemplary process of the human-like vehicle control signal generator 2420, according to an embodiment of the present teaching. Target motion information and the vehicle state data are first received at 2910. Based on the target motion and the vehicle state, the vehicle kinematic model 2310 is accessed, at 2920, and used to infer, at 2930, the VKM vehicle control signal. Such inferred control signal based on mechanical dynamic model is sent to the HLVC model based fusion unit 2830. To yield a fused human-like vehicle control signal, the context data determiner 2820 receives, at 2940, real time data 480 and extracts, at 2950, relevant information related to the vehicle. Using the context information as well as the VKM vehicle control signal, the HLVC model based fusion unit 2830 infers, at 2960, the human-like vehicle control signal based on the HLVC model 2330. Such inferred human-like vehicle control signal is then output, at 2970, so that human-like vehicle control to achieve the target motion may be carried out in a human-like manner.

Figure 30:
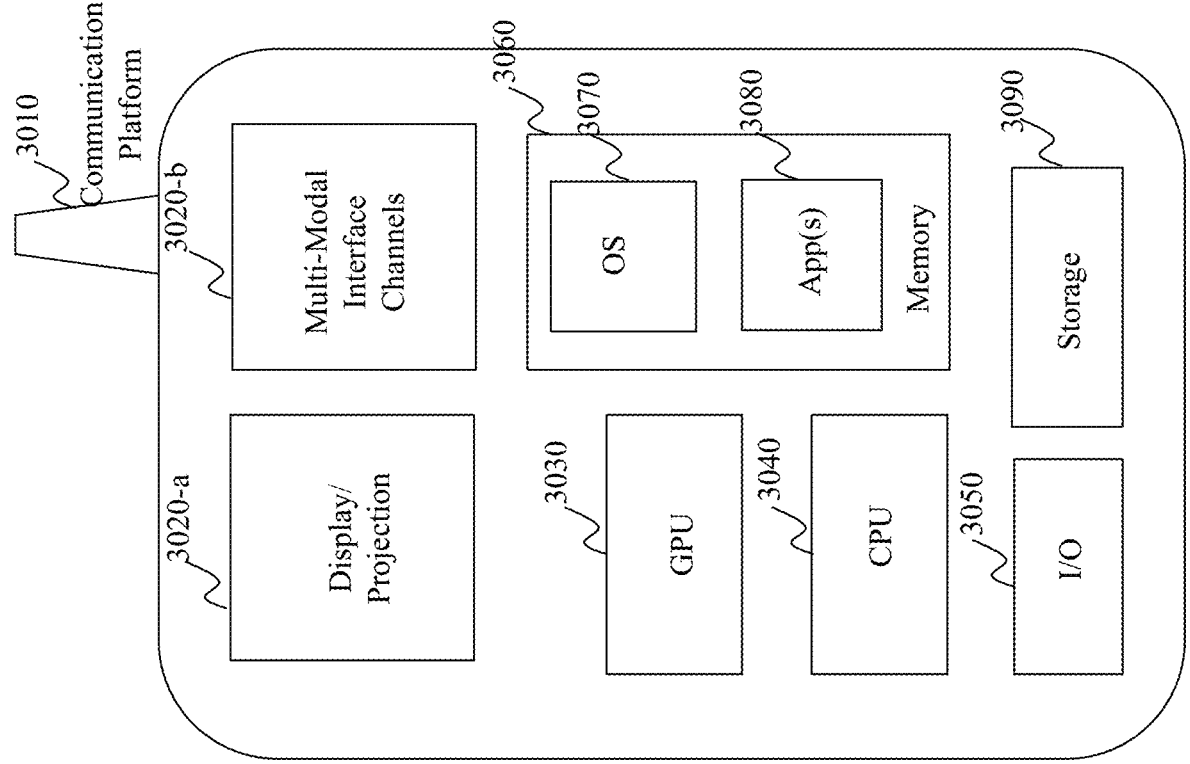
FIG. 30 depicts the architecture of a mobile device which can be used to implement a specialized system incorporating the present teaching.

FIG. 30 depicts the architecture of a mobile device which can be used to realize a specialized system implementing the present teaching. This mobile device 3000 includes, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 3000 in this example includes one or more central processing units (CPUs) 3040, one or more graphic processing units (GPUs) 3030, a memory 3060, a communication platform 3010, such as a wireless communication module, storage 3090, one or more input/output (I/O) devices 3050, a display or a projection 3020-*a* for visual based presentation, and one or more multi-modal interface channels 3020-*b*. The multi-modal channels may include acoustic channel or other media channels for signaling or communication. Any other suitable component, including but not limited to a system bus or a controller (not shown), may also be included in the mobile device 3000. As shown in FIG. 30, a mobile operating system 3070, e.g., iOS, Android, Windows Phone, etc., and one or more applications 3080 may be loaded into the memory 3060 from the storage 3090 in order to be executed by the CPU 3040.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to the present teachings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 31:
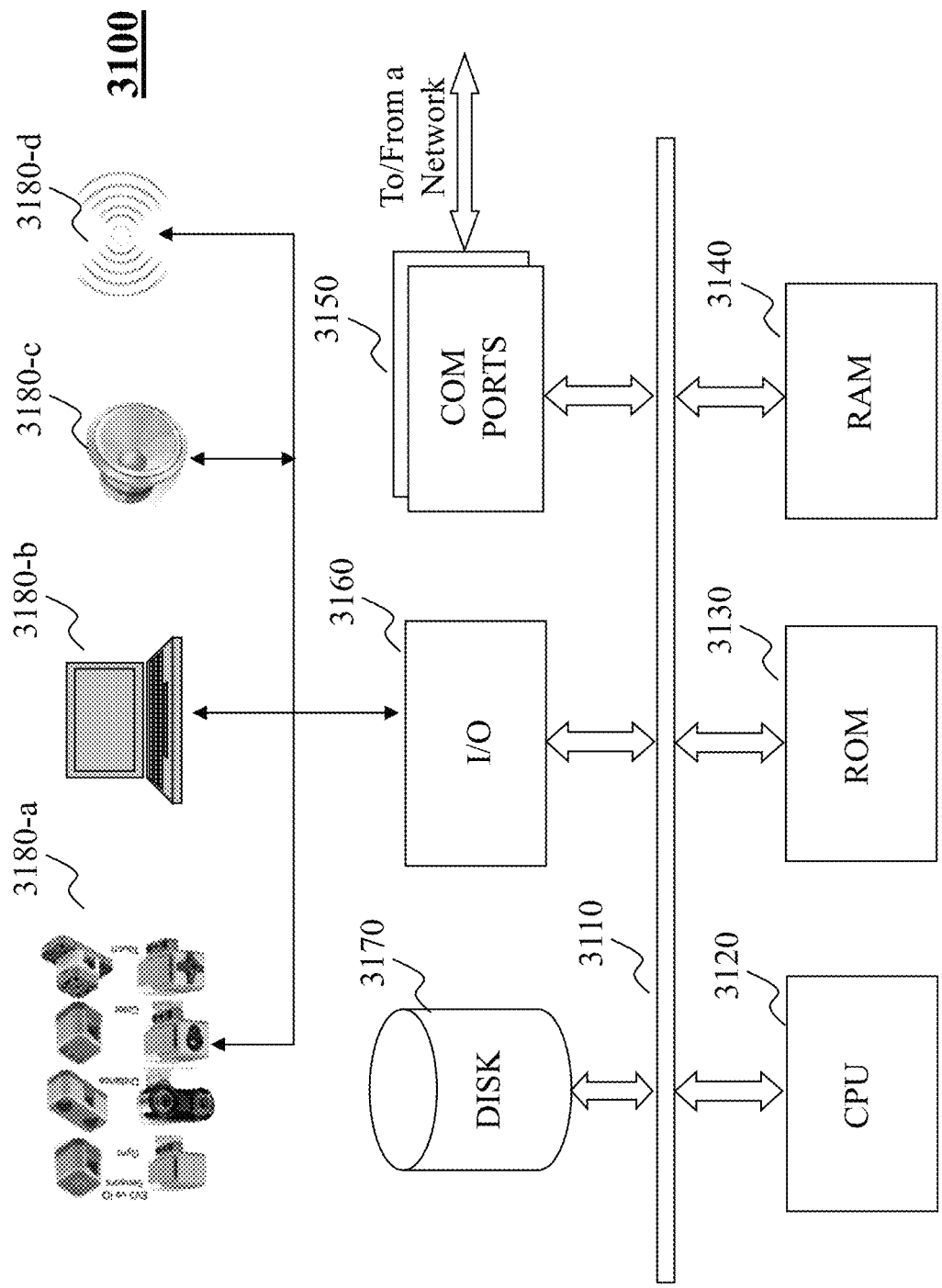
FIG. 31 depicts the architecture of a computer which can be used to implement a specialized system incorporating the present teaching.

FIG. 31 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 3100 may be used to implement any component or aspect of the present teachings, as described herein. Although only one such computer is shown, for convenience, the computer functions relating to the present teachings as described herein may be implemented in a distributed fashion on a number of similar platforms, to distribute the processing load.

The computer 3100, for example, includes COM ports 3150 connected to and from a network connected thereto to facilitate data communications. The computer 3100 also includes a central processing unit (CPU) 3120, in the form of one or more processors, for executing program instructions. The exemplary computer platform includes an internal communication bus 3110, program storage and data storage of different forms, e.g., disk 3170, read only memory (ROM) 3130, or random access memory (RAM) 3140, for various data files to be processed and/or communicated by the computer, as well as possibly program instructions to be executed by the CPU. The computer 2600 also includes an I/O component 3160, supporting input/output flows between the computer and other components therein such as interface elements 3180 in different media forms. An exemplary type of interface element may correspond to different types of sensors 3180-*a* deployed on the autonomous driving vehicle. Another type of interface element may correspond to a display or a projection 3180-*b* for visual based communication. There may be additional components for other multi-modal interface channels such as acoustic device 3180-*c* for audio based communications and/or component 2680-*d* for signaling based on communication, e.g., signal that causes vibration on a vehicle component such as a car seat. The computer 3100 may also receive programming and data via network communications.

Hence, aspects of the methods of the present teachings, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a search engine operator or other enhanced ad server into the hardware platform(s) of a computing environment or other system implementing a computing environment or similar functionalities in connection with the present teachings. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The invention claimed is:

1. A computer-implemented method comprising:
based on sensor data, detecting, by a computing system, a lane that a vehicle is currently occupying;
receiving, by the computing system, data representing a presence of a passenger within the vehicle;
based on a dedicated set of training data for each model, separately training, by the computing device, a) a generic model for a general population and b) a plurality of personalized lane control models, relating to preferences of the passenger, associated with a plurality of driving environment scenarios, each personalized lane control model trained on training data that includes past human driving data relating to lane following and lane changing behavior related to the passenger associated with a corresponding driving environment scenario, the lane changing behavior related to the passenger associated with a corresponding driving environment scenario indicative of a) various speeds with which to lane change to a right lane, b) various speeds with which to lane change to a left lane, and c) various straight line or curved paths with which to lane change to a portion of a right lane or a left lane that is straight,
wherein the training data associated with the passenger is driving data of the passenger and grouped into training data groups, each training data group for training a personalized lane control model associated with a related driving environment scenario,
and wherein the personalized lane control model is further trained based on a personal profile of the passenger to allow the personalized lane control model to further reflect preferences of the passenger;
based on the data representing the presence of the passenger within the vehicle and a current driving environment scenario, selecting, by the computing system, a personalized lane control model related to preferences of the passenger associated with lane planning including lane following and lane changing;
generating, by the computing system, a lane control plan for the vehicle based on the lane that the vehicle is currently occupying and the personalized lane control model, wherein the lane control plan includes lane following and lane changing, and selection of lane following or lane changing is based on at least one of an explicit lane control decision provided by the passenger and an implied lane control decision to enter a lane to perform an action required in the lane;
generating, by the computing system, a signal to cause implementation of the lane control plan at the vehicle; and
in response to the signal, controlling, by the computing system, movement of the vehicle based at least in part on the lane control plan.

2. The computer-implemented method of claim 1, wherein the sensor data includes image data.

3. The computer-implemented method of claim 1, wherein the personalized lane control model is retrieved from a remote computing system.

4. The computer-implemented method of claim 1, wherein the data representing the presence of the passenger within the vehicle includes image data.

5. The computer-implemented method of claim 1, wherein the personalized lane control model is associated with preferences of the passenger relating to at least one of lane change speed and lane change path.

6. The computer-implemented method of claim 1, wherein the personalized lane control model is associated with a population subgroup to which the passenger belongs.

7. The computer-implemented method of claim 1, wherein a driving environment scenario of the plurality of driving environment scenarios relates to lane driving behavior of the passenger associated with at least one of a wet road, night lighting, day lighting, snowy condition, and a crowded road.

8. The computer-implemented method of claim 1, wherein each personalized lane control model is associated with a corresponding personalized lane following model and a corresponding personalized lane changing model.

9. The computer-implemented method of claim 1, wherein the detecting the lane is based on a lane detection model selected from a plurality of lane detection models, each lane detection model associated with at least one of a particular scenario and a particular type of the vehicle.

10. The computer-implemented method of claim 1, wherein the vehicle is operable in an autonomous mode of navigation.

11. A non-transitory computer-readable storage medium including instructions that, when executed by at least one processor of a computing system, cause the computing system to perform operations comprising:
  based on sensor data, detecting a lane that a vehicle is currently occupying;
  receiving data representing a presence of a passenger within the vehicle;
  based on a dedicated set of training data for each model, separately training a) a generic model for a general population and b) a plurality of personalized lane control models, relating to preferences of the passenger, associated with a plurality of driving environment scenarios, each personalized lane control model trained on training data that includes past human driving data relating to lane following and lane changing behavior relating to the passenger associated with a corresponding driving environment scenario, the lane changing behavior related to the passenger associated with a corresponding driving environment scenario indicative of a) various speeds with which to lane change to a right lane, b) various speeds with which to lane change to a left lane, and c) various straight line or curved paths with which to lane change to a portion of a right lane or a left lane that is straight,
  wherein the training data associated with the passenger is grouped into training data groups, each training data group for training a personalized lane control model associated with a related driving environment scenario,
  and wherein the personalized lane control model is further trained based on a personal profile of the passenger to allow the personalized lane control model to further reflect preferences of the passenger;
  based on the data representing the presence of the passenger within the vehicle and a current driving environment scenario, selecting a personalized lane control model related to preferences of the passenger associated with lane planning including lane following and lane changing;
  generating a lane control plan for the vehicle based on the lane that the vehicle is currently occupying and the personalized lane control model, wherein the lane control plan includes lane following and lane changing, and selection of lane following or lane changing is based on at least one of an explicit lane control decision provided by the passenger and an implied lane control decision to enter a lane to perform an action required in the lane;
  generating a signal to cause implementation of the lane control plan at the vehicle; and
  in response to the signal, controlling movement of the vehicle based at least in part on the lane control plan.

12. The non-transitory computer-readable storage medium of claim 11, wherein the generating the lane control plan is based on parameters that are predictive of an operational capability of the vehicle.

13. The non-transitory computer-readable storage medium of claim 12, wherein the operations further comprise dynamically updating the parameters to reflect an updated scenario associated with the vehicle.

14. The non-transitory computer-readable storage medium of claim 11, wherein the data representing the presence of the passenger within the vehicle includes sensor data.

15. The non-transitory computer-readable storage medium of claim 11, wherein the operations further comprise sending the signal to cause implementation of the lane control plan at the vehicle.

16. The non-transitory computer-readable storage medium of claim 15, wherein the sending the signal to cause implementation of the lane control plan at the vehicle includes sending the signal to a vehicle control module of the vehicle.

17. The non-transitory computer-readable storage medium of claim 11, wherein the vehicle is operable in an autonomous mode of navigation.

18. A system comprising:
  at least one processor; and
  a memory operably coupled to the at least one processor and storing instructions to cause the at least one processor to perform operations comprising:
  based on sensor data, detecting a lane that a vehicle is currently occupying;
  receiving data representing a presence of a passenger within the vehicle;
  based on a dedicated set of training data for each model, separately training a) a generic model for a general population and b) a plurality of personalized lane control models, relating to preferences of the passenger, associated with a plurality of driving environment scenarios, each personalized lane control model trained on training data that includes past human driving data relating to lane following and lane changing behavior relating to the passenger associated with a corresponding driving environment scenario, the lane changing behavior related to the passenger associated with a corresponding driving environment scenario indicative of a) various speeds with which to lane change to a right lane, b) various speeds with which to lane change to a left lane, and c) various straight line or curved paths with which to lane change to a portion of a right lane or a left lane that is straight,
  wherein the training data associated with the passenger is grouped into training data groups, each training data group for training a personalized lane control model associated with a related driving environment scenario,
  and wherein the personalized lane control model is further trained based on a personal profile of the passenger to allow the personalized lane control model to further reflect preferences of the passenger;

based on the data representing the presence of the passenger within the vehicle and a current driving environment scenario, selecting a personalized lane control model related to preferences of the passenger associated with lane planning including lane following and lane changing;

generating a lane control plan for the vehicle based on the lane that the vehicle is currently occupying and the personalized lane control model, wherein the lane control plan includes lane following and lane changing, and selection of lane following or lane changing is based on at least one of an explicit lane control decision provided by the passenger and an implied lane control decision to enter a lane to perform an action required in the lane;

generating a signal to cause implementation of the lane control plan at the vehicle; and in response to the signal, controlling movement of the vehicle based at least in part on the lane control plan.

19. The system of claim 18, wherein the operations further comprise detecting the passenger as being present within the vehicle based on sensor data.

20. The system of claim 18, wherein the vehicle is operable in an autonomous mode of navigation.

* * * * *